United States Patent
Agrawal et al.

(10) Patent No.: US 12,438,189 B2
(45) Date of Patent: Oct. 7, 2025

(54) POLYMERIC ION-CONDUCTIVE ELECTROLYTE SHEET

(71) Applicant: Polyceed Inc., Tucson, AZ (US)

(72) Inventors: Anoop Agrawal, Tucson, AZ (US); Lori L. Adams, Tucson, AZ (US); John P. Cronin, Tucson, AZ (US); Susana J. Castillo, Tucson, AZ (US)

(73) Assignee: Polyceed Inc., Tucson, AZ (US)

( * ) Notice: Subject to any disclaimer, the term of this patent is extended or adjusted under 35 U.S.C. 154(b) by 1098 days.

(21) Appl. No.: 17/396,397

(22) Filed: Aug. 6, 2021

(65) Prior Publication Data

US 2021/0408592 A1    Dec. 30, 2021

Related U.S. Application Data

(63) Continuation-in-part of application No. 16/511,155, filed on Jul. 15, 2019, now Pat. No. 11,086,181.

(60) Provisional application No. 62/842,404, filed on May 2, 2019, provisional application No. 62/807,461, filed on Feb. 19, 2019, provisional application No. 62/770,964, filed on Nov. 23, 2018, provisional application No. 62/729,809, filed on Sep. 11, 2018, provisional application No. 62/698,284, filed on Jul. 16, 2018.

(51) Int. Cl.
*H01M 10/0565* (2010.01)
*C08J 5/18* (2006.01)

(52) U.S. Cl.
CPC ............ *H01M 10/0565* (2013.01); *C08J 5/18* (2013.01); *C08J 2375/02* (2013.01); *C08J 2375/04* (2013.01); *H01M 2300/0082* (2013.01); *H01M 2300/0085* (2013.01)

(58) Field of Classification Search
CPC .......... H01M 10/0564–0565; C08J 5/18; C08J 5/20–2293; G02F 1/15; G02F 1/1514–15165; E06B 9/24
See application file for complete search history.

(56) References Cited

U.S. PATENT DOCUMENTS

| | | | |
|---|---|---|---|
| 5,189,549 A | 2/1993 | Leventis et al. | |
| 5,352,504 A | 10/1994 | Boulanger et al. | |
| 5,394,264 A | 2/1995 | Marchese et al. | |
| 5,724,187 A | 3/1998 | Varaprasad et al. | |

(Continued)

FOREIGN PATENT DOCUMENTS

| | | |
|---|---|---|
| EP | 0867752 A1 | 9/1998 |
| WO | 2018009645 A1 | 1/2018 |

OTHER PUBLICATIONS

Office Action issued in counterpart U.S. Appl. No. 18/767,566 dated Dec. 30, 2024. (6 pages).

(Continued)

*Primary Examiner* — Matthew E. Hoban
(74) *Attorney, Agent, or Firm* — Rothwell, Figg, Ernst & Manbeck, P.C.

(57) ABSTRACT

Methods and materials to fabricate electrochromic including electrochemical devices are disclosed. In particular, emphasis is placed on the composition, fabrication and incorporation of electrolytic sheets in these devices. Composition, fabrication and incorporation of redox materials and sealants suitable for these devices are also disclosed. Incorporation of EC devices in insulated glass system (IGU) windows is also disclosed.

19 Claims, 23 Drawing Sheets

(56) References Cited

U.S. PATENT DOCUMENTS

| | | | |
|---|---|---|---|
| 5,985,486 | A | 11/1999 | Giron |
| 6,002,511 | A * | 12/1999 | Varaprasad ........ B32B 17/10174 522/182 |
| 6,160,655 | A | 12/2000 | Fix et al. |
| 6,245,262 | B1 | 6/2001 | Varaprasad et al. |
| 6,266,177 | B1 | 7/2001 | Allemand et al. |
| 6,317,248 | B1 | 11/2001 | Agrawal et al. |
| 6,373,618 | B1 | 4/2002 | Agrawal et al. |
| 6,519,072 | B2 | 2/2003 | Nishikitani et al. |
| 6,560,004 | B2 | 5/2003 | Theiste et al. |
| 6,747,779 | B1 | 6/2004 | Morin et al. |
| 6,767,481 | B2 | 7/2004 | Berneth et al. |
| 6,791,737 | B2 | 9/2004 | Giron |
| 6,816,298 | B2 | 11/2004 | Nishikitani et al. |
| 6,995,891 | B2 | 2/2006 | Agrawal et al. |
| 7,001,540 | B2 | 2/2006 | Kloeppner et al. |
| 7,012,306 | B2 | 3/2006 | Armgarth et al. |
| 7,031,044 | B2 | 4/2006 | Roberts et al. |
| 7,110,157 | B2 | 9/2006 | Beteille et al. |
| 7,579,112 | B2 | 8/2009 | Chiang et al. |
| 7,582,895 | B2 | 9/2009 | Armgarth et al. |
| 7,791,784 | B2 | 9/2010 | Giron et al. |
| 7,855,821 | B2 | 12/2010 | Baumann et al. |
| 7,988,746 | B2 | 8/2011 | Chiang et al. |
| 8,115,984 | B2 | 2/2012 | Agrawal et al. |
| 8,168,326 | B2 | 5/2012 | Chiang et al. |
| 8,182,949 | B2 | 5/2012 | Ohgi et al. |
| 8,206,469 | B2 | 6/2012 | Chiang et al. |
| 8,593,714 | B2 | 11/2013 | Agrawal et al. |
| 8,865,998 | B2 | 10/2014 | Huang et al. |
| 8,992,719 | B2 | 3/2015 | Shang |
| 9,013,777 | B2 | 4/2015 | Frey et al. |
| 9,030,724 | B2 | 5/2015 | Agrawal et al. |
| 9,164,345 | B2 | 10/2015 | Konkin et al. |
| 9,309,274 | B2 | 4/2016 | Van Der Boom et al. |
| 9,482,921 | B2 | 11/2016 | Lamine et al. |
| 9,535,306 | B2 | 1/2017 | Oukassi et al. |
| 9,640,334 | B2 | 5/2017 | Yu et al. |
| 9,738,140 | B2 | 8/2017 | Ash et al. |
| 9,864,250 | B2 | 1/2018 | Garcia et al. |
| 9,990,578 | B2 | 6/2018 | Johnson et al. |
| 10,464,900 | B2 | 11/2019 | Lin et al. |
| 10,824,040 | B2 | 11/2020 | Agrawal et al. |
| 11,086,181 | B2 * | 8/2021 | Agrawal ............... G02F 1/1525 |
| 2003/0039020 | A1 | 2/2003 | Lomprey et al. |
| 2003/0094599 | A1 | 5/2003 | Le et al. |
| 2003/0099884 | A1 | 5/2003 | Chiang et al. |
| 2004/0018431 | A1 | 1/2004 | Gozdz et al. |
| 2005/0213184 | A1 | 9/2005 | Beteille et al. |
| 2007/0148379 | A1 | 6/2007 | Theios et al. |
| 2008/0192407 | A1 | 8/2008 | Lu et al. |
| 2009/0284821 | A1 | 11/2009 | Valentin et al. |
| 2010/0315693 | A1 * | 12/2010 | Lam ..................... G02F 1/0018 359/275 |
| 2011/0051221 | A1 | 3/2011 | Veerasamy |
| 2011/0278170 | A1 | 11/2011 | Chiang et al. |
| 2012/0212794 | A1 | 8/2012 | Giron et al. |
| 2012/0224249 | A1 | 9/2012 | Stenzel et al. |
| 2012/0327499 | A1 | 12/2012 | Parker et al. |
| 2013/0278989 | A1 | 10/2013 | Lam |
| 2013/0286458 | A1 | 10/2013 | Lamine et al. |
| 2015/0306848 | A1 | 10/2015 | Anderson et al. |
| 2016/0124284 | A1 | 5/2016 | O'Keeffe |
| 2017/0119176 | A1 | 5/2017 | Christiansen et al. |
| 2017/0158878 | A1 | 6/2017 | Zheng |
| 2018/0328102 | A1 | 11/2018 | Byker |
| 2019/0233599 | A1 * | 8/2019 | Hamon ................. B32B 27/304 |

OTHER PUBLICATIONS

Fragiadakis et al., "Molecular Mobility, Ion Mobility, and Mobile Ion Concentration in Poly(ethylen oxide)-Based Polyurethane Ionomers", Macromolecules, 2008, 41, 5723-5728 (Abstract only).

Nasirzadeh, K. et al., "Vapor-Pressure Measurements of Liquid Solutions at Different Temperatures: Apparatus for Use over an Extended Temperture Range and Some Data", J. Chem. Eng. Data 2004, 49, 3, 607-612 (Abstract Only).

Hart, R., Selkowitz, S. & Curcija, C. "Thermal performance and potential annual energy impact of retrofit thin-glass triple-pane glazing in US residential buildings." Build. Simul. (2019) 12: pp. 79-86. https://doi.org/10.1007/s12273-018-0491-3.

Maged A. Osman, Vikas Mittal, Massimo Morbidelli, and Ulrich W. Suter, "Polyurethane Adhesive Nanocomposites as Gas Permeation Barrier", Macromolecules, 2003, 36 (26), pp. 9851-9858.

Edwin S. Raj* and Jonathan Booth, "Lowering the Silver Content in Automotive Conductive Pastes", Johnson Matthey Technol. Rev., (2017), 61, (2), p. 156 to 164.

Provisional Opinion and Partial International Search Report cited in PCT/US2019/041777, dated Oct. 9, 2019, 21 pages.

Non Final Office Action cited in U.S. Appl. No. 16/511,174 dated Sep. 12, 2019, 30 pages.

Omnexus Polyvinylidene Fluoride (PVDF): Complete Guide, retrieved from: https://omnexus.specialchem.com/selection-guide/polyvinylidene-fluoride-pvdf-plastic on Oct. 8, 2019.

Khutia "Synthesis and characterization of polyvinyl alcohol/cationic polyurethane binder blend as solid polymer electrolyte" Ionics (2015) 21:3075-3086.

Ebnesajjad "Introduction to Fluoropolymers Materials, Technology and Applications" Elsevier Amsterdam, 2013, pp. 63-89.

Lyoo "Preparation of High Molecular Weight Polyvinylalcohol by Low Temperature Azointiator" Eur. Polym. J. Vol. 33, No. 5, pp. 785-787, 1997.

Dylan T. Christiansen, Aimee L. Tomlinson, and John R. Reynolds, New Design Paradigm for Color Control in Anodically Coloring Electrochromic Molecules, Journal of the American Chemical Society 2019 141 (9), p. 3859-3862.

Jeffrey A. Kowalski, Matthew D. Casselman, Aman Preet Kaur, Jarrod D. Milshtein, Corrine F. Elliott, Subrahmanyam Modekrutti, N. Harsha Attanayake, Naijao Zhang, Sean R. Parkin, Chad Risko, Fikile R. Brushett and Susan A. Odom, A stable two-electron-donating phenothiazine for application in nonaqueous redox flow batteries, J. Mater. Chem. A, 2017, 5, p. 24371-24379.

Corrine F. Elliott, Kate E. Fraser, Susan A. Odom, and Chad Risko, Steric Manipulation as a Mechanism for Tuning the Reduction and Oxidation Potentials of Phenothiazines, The Journal of Physical Chemistry A 2021 125 (1), p. 272-278.

Fengkun Chen, Jie Zhang, Hong Jiang, and Xinhua Wan Colorless to Purple—Red Switching Electrochromic Anthraquinone Imides with Broad Visible/Near-IR Absorptions in the Radical Anion State: Simulation-Aided Molecular Design, Chem. Asian J. 2013, 8, 1497-1503.

Data from Covestro: tpu.covestro.com/en/Technologies/Properties/Permeability, downloaded on Jul. 6, 2018 from https://www.tpu.covestro.com/en/Technologies/Properties/Permeability, 1 page.

Hegedus, "Rutile Titanium Dioxide and its use in Polymer Systems", Air Vehicle and Crew Systems Technology Department (Code 6062), Naval Air Development Center, Report N. NADC-89008-60, AD-A206 787, Jan. 5, 1989, 19 pages.

Sun et al., "Room-Temperature Molten Salts Based on the Quaternary Ammonium Ion", J. Phys. Chem. B 1998, 102, pp. 8858-8864.

Office Action dated Sep. 20, 2024 issued in corresponding U.S. Appl. No. 18/766,117. (21 pages).

* cited by examiner

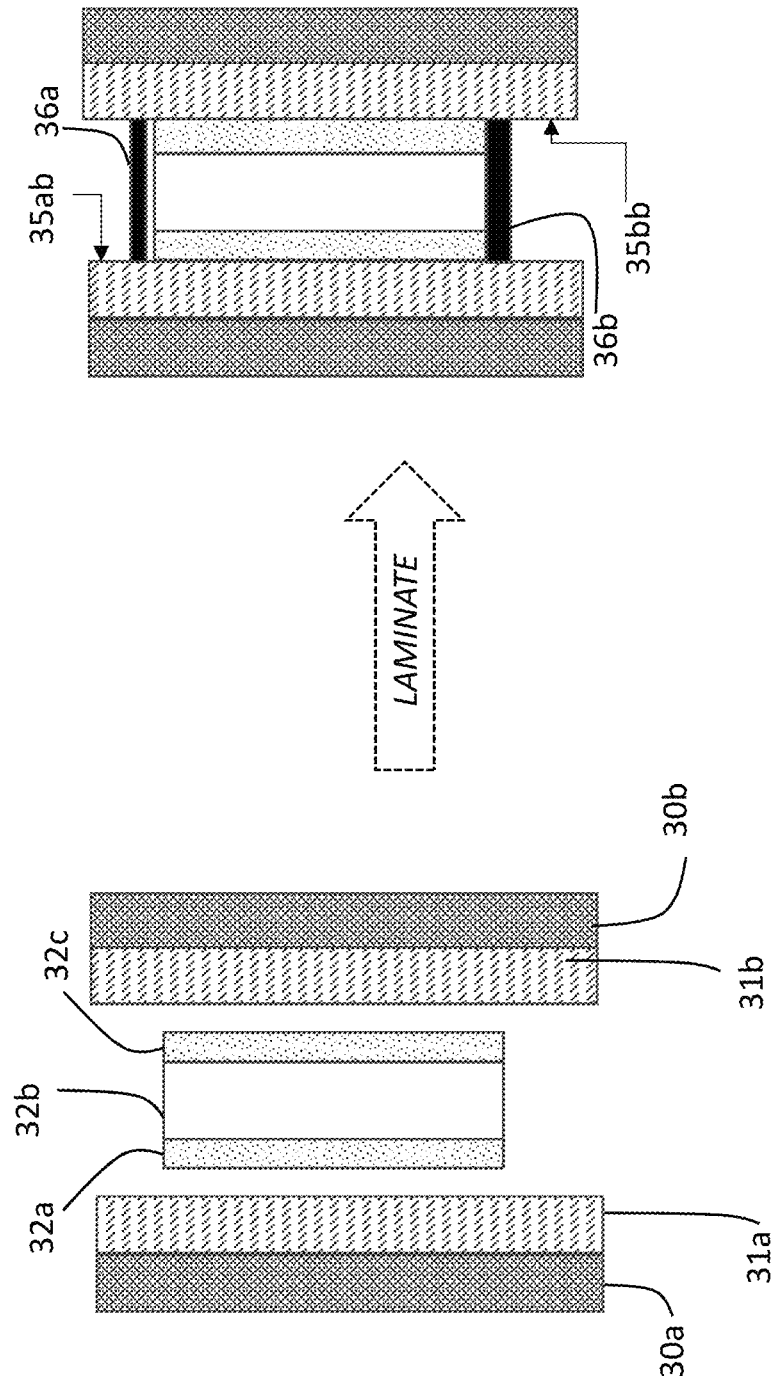

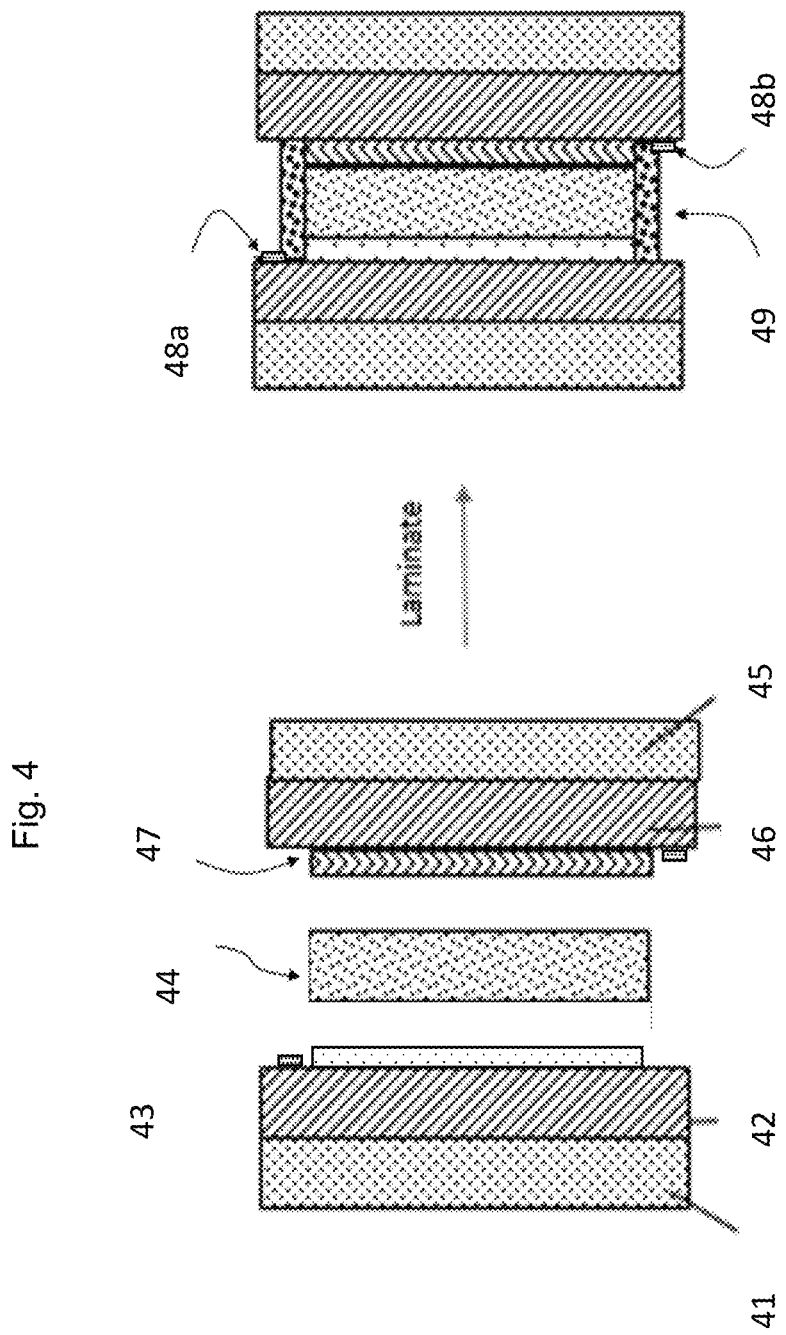

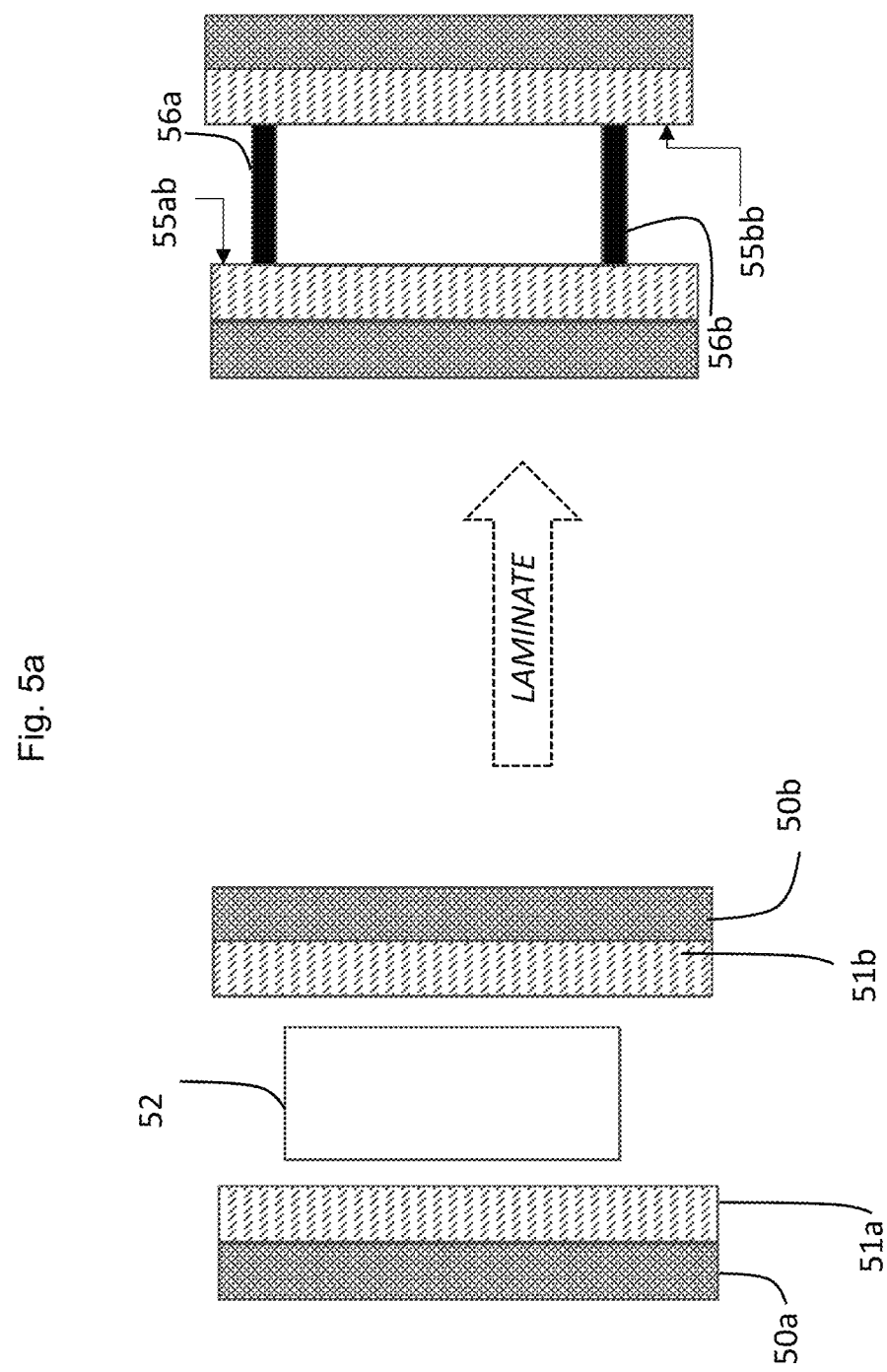

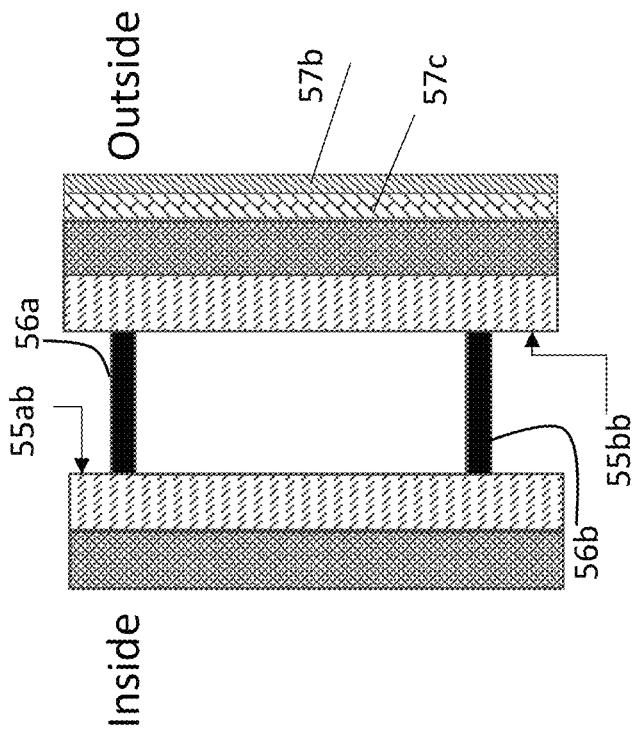
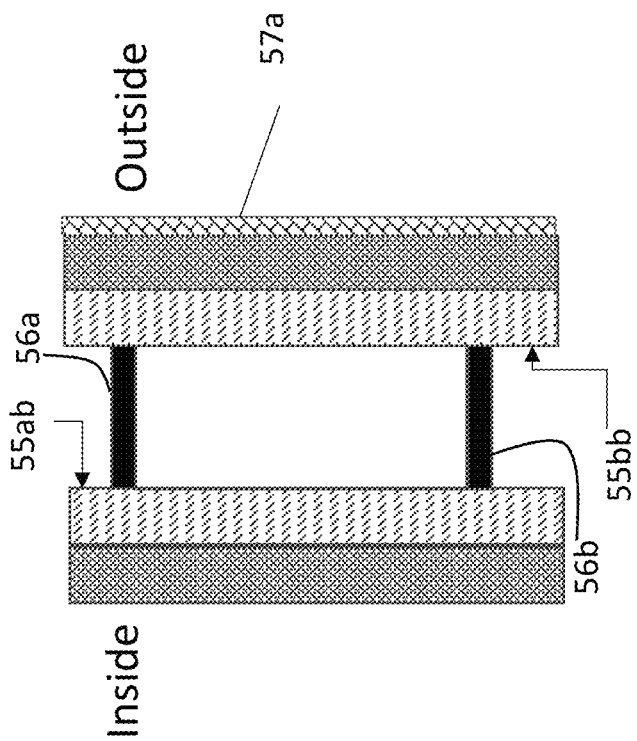
Fig. 5b

POLYMERIC ION-CONDUCTIVE ELECTROLYTE SHEET

CROSS-REFERENCE TO RELATED APPLICATIONS

This application is a continuation-in-part of U.S. application Ser. No. 16/511,155, filed Jul. 15, 2019, which claims priority to U.S. provisional application Ser. No. 62/698,284, filed on Jul. 16, 2018; U.S. provisional application Ser. No. 62/729,809, filed on Sep. 11, 2018; U.S. provisional application Ser. No. 62/770,964, filed on Nov. 23, 2018; U.S. provisional application Ser. No. 62/807,461 filed on Feb. 19, 2019, and U.S. provisional application Ser. No. 62/842,404, filed on May 2, 2019, the disclosures of which are incorporated herein by reference in their entireties.

FIELD OF THE INVENTION

The present invention relates to polymeric compositions for use in variable light transmission (and reflective) devices (including electrochromic devices for use in transportation, buildings and consumer products), their use in windows systems, and their use in other electrochemical devices such as batteries (including secondary batteries) and actuators.

BACKGROUND OF INVENTION

Variable transmission devices are used to make "smart glass" or "smart windows" where the light transmission or reflection characteristics of a window are changed by electronic switching. These devices may be used for variable transmission windows for use in buildings and transportation, displays and automotive mirrors for controlling reflectivity. When used in construction of buildings and in transportation, these windows result in energy efficient envelopes by regulating the solar energy penetration through the windows. The invention will be principally illustrated as it applies to electrochromic devices (which are electrochemical in nature), but many aspects of this may be used for any type of variable transmission/reflective devices, and other electrochemical applications.

SUMMARY OF THE INVENTION

The present disclosure includes an electrochemical device having a first substrate with a conductive coating; a redox layer in contact with the conductive coating; and an electrolyte layer comprising a first polymer wherein the electrolyte layer is in contact with the redox layer, the electrolyte and the redox layer both further comprising a plasticizer and a salt, wherein:
  (i) the electrolyte and the redox layer contain the same plasticizer; and
  (ii) the concentration of dissociable salt based on plasticizer amount is similar in concentration in the redox layer and the electrolyte, and
  the redox layer further comprises (a) a second polymer material, (b) a redox agent and (c) electrically conductive particles.

The present disclosure includes an electrochemical device, comprising an electrolyte layer comprising a first polymer and a first plasticizer wherein the electrolyte layer is in contact with a redox layer comprising a second polymer and a second plasticizer, wherein the first and the second plasticizers are the same; and at least one monomer component of the first polymer and at least one monomer component of the second polymer are miscible with the first plasticizer and the second plasticizer.

The present disclosure includes an electrochemical device comprising: a first substrate with a conductive coating and a second substrate with a conductive coating; a first redox layer in contact with the coating on the first substrate; a second redox layer in contact with the conductive coating on the second substrate; an electrolyte layer in contact with the first and second redox layers and sandwiched between the two substrates; a sealant located at the perimeter of the device that seals the redox layers and the electrolyte from the environment, wherein the sealant comprises a thermoplastic polymer selected from at least one of polyurethane and polyurea which further contains crosslinkable groups capable of crosslinking by addition polymerization.

The present disclosure includes an electrochemical device comprising: a) a redox layer comprising a first composition; b) an electrolyte layer comprising a second composition, wherein the said redox layer and the electrolyte layer are bonded together by a polymeric network which permeates both the said layers.

The present disclosure includes a method of making an ion-conductive polymer film for an electrochromic device, wherein the method comprises: mixing one or more monomers capable of forming a thermoplastic polymer, a plasticizer, an optional salt which, if present, is soluble in the plasticizer, a UV stabilizer, and a polymer-forming catalyst to form a mixture; polymerizing the mixture to obtain a formulation containing a thermoplastic polymer; and extruding or casting the formulation to form said ion-conductive film. In those formulations where electrochromic dyes and redox species are present, these are also added prior to polymerization so that these can be mixed intimately while the components are in the liquid state. Another method of making the ion-conductive sheet is to produce the thermoplastic polymer and then to compound it on an extruder or any other device with a liquid composition containing a plasticizer, an optional salt which, if present, is soluble in the plasticizer, a UV stabilizer, and, optionally, dyes and redox species. The UV stabilizer and some of the components may also be added prior to the polymerization of the thermoplastic polymer, and others are compounded later as discussed above.

The present disclosure includes a polymeric ion-conductive electrolyte sheet comprising: i) thermoplastic polymer formed using at least three monomers; ii) a melting point or a flow point in excess of about 90° C. and less than about 170° C.; and iii) optical haze less than 5%.

The present disclosure includes a polymeric ion-conductive (electrolyte) sheet comprising: i) a thermoplastic polymer; and ii) a monomer, wherein the said monomer is capable of polymerizing into a second polymer which is crosslinked.

The present disclosure includes a polymeric ion-conductive (electrolyte) sheet comprising: a thermoplastic polymer, wherein the thermoplastic polymer further comprises available polymerizable groups, and wherein the thermoplastic polymer has a melting point or a flow point in excess of about 60° C. and less than about 170° C.

The present disclosure includes a polymeric ion-conductive sheet comprising i) a thermoplastic polymer selected from one of polyurethane, polyester, polyurea, polycarbonate, or a combination thereof and ii) further comprising at least one of non-electronically conductive nanoparticles and surface modified non-electronically conductive nanoparticles, wherein the polymeric ion-conductive sheet has an optical haze of less than 5%.

The present disclosure includes a device comprising an electrochromic electrode layer and a counterelectrode layer sandwiching an electrolyte layer wherein a polymeric network permeates through the electrolyte layer and at least one of the electrochromic electrode and the counterelectrode.

The present disclosure includes a perimeter sealant for an electrochromic device comprising a melt processable block copolymer, wherein (a) a first phase of the block copolymer has lower permeability to air and water and (b) a second phase of the block copolymer determines its flow or melting point which is in excess of 100° C. and (c) the first phase has a volume fraction that is greater than that of the second phase.

The present disclosure includes an insulated glass unit (IGU) comprising an electrochromic (EC) element which is (a) capable of reversibly varying the Solar Heat Gain Coefficient (SHGC) of the said IGU from about a range between 0.25 and 0.55 down to a range between 0.03 and 0.15 and (b) has a low-emissivity (Low-E) coating and (c) the said IGU has a thermal resistance (R value) of greater than 5.

The present disclosure includes an insulated glass unit (IGU) comprising a glass electrochromic element and (a) a privacy glass element capable of reversibly changing its optical state from clear to opaque due to application of an electrical voltage, (b) has at least one glass surface having a low-emissivity (Low-E) coating, and (c) has a thermal resistance (R value) of greater than 5.

The present disclosure includes an insulated glass unit (IGU) comprising an electrochromic (EC) element which is (a) capable of reversibly varying the Solar Heat Gain Coefficient (SHGC) of the said window from about a range between 0.25 and 0.55 down to a range between 0.03 and 0.15 and (b) a VIG element and (c) the said IGU has a thermal resistance (R value) of greater than 5.

The present disclosure includes a method of forming an electrochromic device, comprising: providing a first coated substrate; providing a second coated substrate; and laminating a pre-formed polymeric electrolyte sheet between the first and second coated substrates, which wherein the pre-formed polymeric electrolyte sheet comprises at least one polymer, at least one plasticizer and at least one electrochromic dye, which are dispersed throughout the sheet. For those devices where the entire redox activity in the device is derived from the dyes, typically more than one dye is used. One of these dyes is a cathodic dye, one is an anodic dye (unless anodic and the cathodic dyes are bridged into a single molecule). In some other embodiments more than two dyes are used to control color, e.g., one cathodic and two or more anodic, or vice versa, or several anodic and several cathodic dyes, etc.

Other features and characteristics of the subject matter of this disclosure, as well as the methods of operation, functions of related elements of structure and the combination of parts, and economies of manufacture, will become more apparent upon consideration of the following description and the appended claims, all of which form a part of this specification.

BRIEF DESCRIPTION OF FIGURES

FIG. 3 illustrates schematics and formation of an EC window device, according to some of the embodiments of the present invention;

FIG. 4 illustrates an EC device and its construction according to some of the embodiments of the present invention;

FIG. 5a illustrates an EC device and its construction according to some of the embodiments of the present invention.

FIG. 5b illustrates an EC device in a non-IGU window configuration.

DETAILED DESCRIPTION

Figure 1:
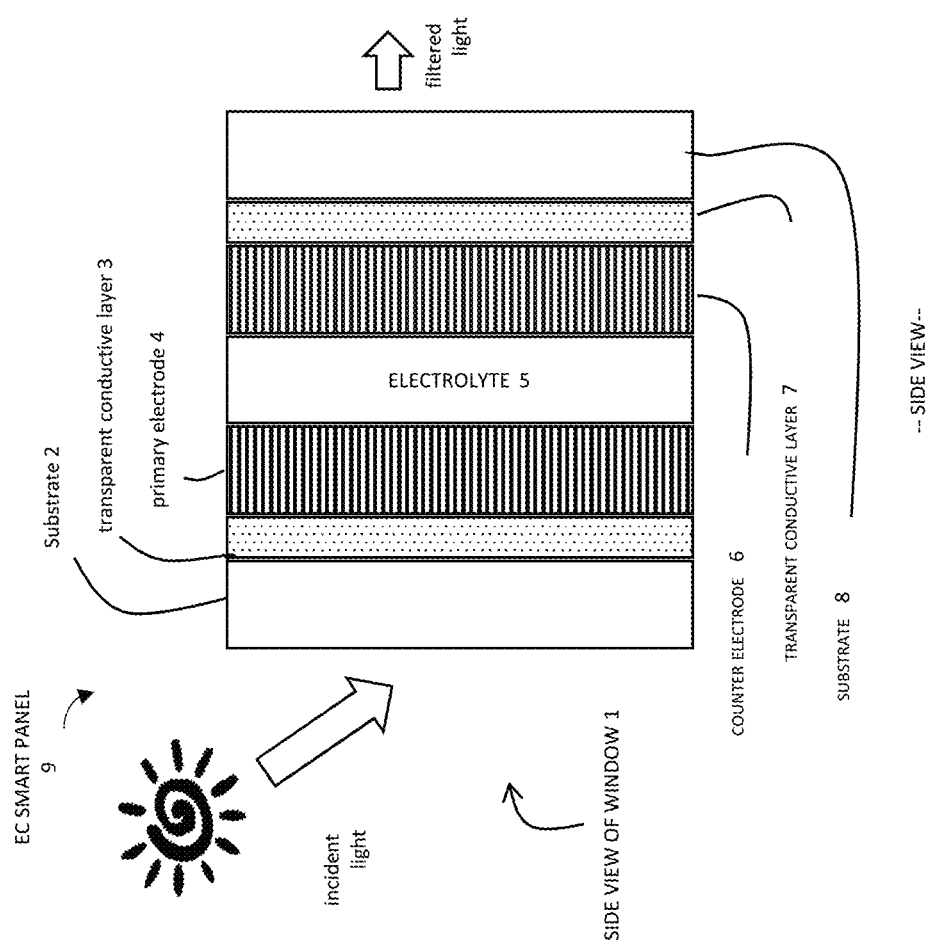
FIG. 1 illustrates schematics of an electrochromic (EC) panel for use in a smart window.

While aspects of the subject matter of the present disclosure may be embodied in a variety of forms, the following description is merely intended to disclose some of these forms as specific examples of the subject matter encompassed by the present disclosure. Accordingly, the subject matter of this disclosure is not intended to be limited to the forms or embodiments so described.

The singular forms "a," "an," and "the" include plural referents unless the context clearly dictates otherwise.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.01 to 2.0" should be interpreted to include not only the explicitly recited values of about 0.01 to about 2.0, but also include individual values and sub-ranges within the indicated range. Thus, included in this numerical range are individual values such as 0.5, 0.7, and 1.5, and sub-ranges such as from 0.5 to 1.7, 0.7 to 1.5, and from 1.0 to 1.5, etc. Furthermore, such an interpretation should apply regardless of the breadth of the range or the characteristics being described. Additionally, it is noted that all percentages are in weight, unless specified otherwise.

In understanding the scope of the present disclosure, the terms "including" or "comprising" and their derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps. It is understood that reference to any one of these transition terms (i.e. "comprising," "consisting," or "consisting essentially") provides direct support for replacement to any of the other transition term not specifically used. For example, amending a term from "comprising" to "consisting essentially of" would find direct support due to this definition.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein. For example, in one aspect, the degree of flexibility can be within about ±10% of the numerical value. In another aspect, the degree of flexibility can be within about ±5% of the numerical value. In a further aspect, the degree of flexibility can be within about ±2%, ±1%, or ±0.05%, of the numerical value.

Generally herein, the term "or" includes "and/or."

As used herein, a plurality of compounds or steps may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Furthermore, certain compositions, injuries or conditions, steps, or the like may be discussed in the context of one specific embodiment or aspect. It is understood that this is merely for convenience, and such disclosure is equally applicable to other embodiments and aspects found herein. Prior disclosures failed to recognize how to use redox layers which contain plasticizers and dissociable salts, in combination with specific electrolytes and how certain chemistries of electrolytes may be manufactured at scale. Further, prior disclosures did not teach how copolymers should be used to make such electrolytes, how their interaction with other ingredients such as plasticizers and salts is controlled, and how the desired properties such as ion conductivity and optical properties are achieved. Prior disclosures did not address the problems with electrochemical devices where the redox layers have very different compositions, or the solutions found by the present inventors regarding matrix materials and processing profiles which need to be combined to achieve a high degree of interfacial compatibility between the layers. Prior disclosures failed to address the compositions and properties of electrolytes required so that such sheets may be manufactured, transported, and eventually processed into and used in window devices for use different climatic and weather conditions. Prior disclosures failed to provide practical means or examples where such layers are incorporated into devices. Thus, it is difficult for a person of ordinary skill in the art to understand or predict the difficulties or problems which need to be resolved to provide compatibility between the electrolyte and redox layers from a processing, functional and durability perspective. Prior disclosures failed to provide details of layer compositions, forming such layers and then incorporating them in devices. Prior disclosures failed to provide insight into compositional details of redox layers and electrolytes so that these could be made compatible and durable. Prior disclosures failed to disclose methods to form such layers and incorporate them in devices so that these can be manufactured at scale. Further, prior disclosures failed to address the various configurations of window systems where EC elements may be used to provide superior insulation and dynamic transmission control over the solar spectrum.

An object of this invention is to form a low-cost, high performance and durable electrochromic (EC) devices for windows used for architectural and transportation and consumer electronic applications. These applications also include overhead windows such as skylights and sunroofs. The EC devices may be configured using a selection of certain material compositions for use as electrodes, electrolytes and sealants. There are also a variety of manufacturing methods disclosed herein enabling their fabrication.

Another objective of the invention is to disclose certain polymeric ion-conductive (electrolyte) compositions to accomplish this task.

Yet another objective of the invention is to disclose polymeric electrode materials which undergo reversible reduction or oxidation (collectively called redox), particularly as used in electrochemical devices including electrochromic devices.

A further objective is to provide perimeter sealants to protect these devices from the atmospheric elements.

This invention focuses on electrochemical devices in general, and in particular on electrochromic devices. The focus is on both methods of fabrication and material composition of the polymeric electrolyte layers, redox layers and perimeter sealants which are used in these devices and the device itself.

In a device it is important to have good adhesion and compatibility between the redox layer and the electrolyte, so that resistance to ion transport at this interface is low. When both of these layers (redox and the electrolyte layer) contain plasticizers and ionically dissociated (or solvated) salts, and the ions from these are the source of mobile ions, it is important that when such layers come in contact a good balance of these components is to be maintained in these layers while the device is functional over its lifetime. For this, it is preferred that the plasticizer composition and the salt type in both layers is similar, second, there is preference that the salt concentration in the plasticizer within these layers be also similar, that is within 10%. It is desirable that this similarity is maintained in each of the layers at the time of device fabrication, or at least this is achieved any time after the device has been fabricated and an equilibrium is established by exchange of plasticizers and the salt between the two layers.

Plasticizers are low molecular weight liquids (usually in the range of 85 to 600 daltons) which remain liquids in the temperature range of the device operation, and do not react with the layers they are in to provide high mobility to the ions, and also have a large electrochemical window in which they are stable and do not undergo redox activity when the electrochromic device is colored or bleached. Further, when salts are added to the system containing these plasticizers, to provide ion-conductivity, it is desirable that such salts should be soluble in this plasticizer so that they can dissociate into ions. A plasticizer for an electrochromic device may contain more than one material. It is desirable to also have other components be miscible in the plasticizer which include, e.g., UV stabilizers.

One of the redox layers in these devices may comprise conductive nanoparticles including carbon nanotubes (CNTs) and redox materials. These CNTs may be single walled, double walled, triple walled or multiwalled, although the first three types (or predominantly their mixtures) are preferred for electrochromic devices so that optical transmission is high. The conductive particles are present in a concentration so that they are percolated and provide electronic conductivity through the redox layer thickness. The polymers used for the redox layers and the electrolyte layers may be any including fluoropolymers, however, in this invention one particular focus is on polymers formed by reacting isocyanates with proton reactive compounds (e.g., polyurethanes formed by reacting isocyanates and polyols and polyureas formed by reacting isocyanates with polyamines). The redox materials in the redox layer are preferably tethered to the polymeric matrix (covalently attached) or bonded to the conductive particles or both. This stops the redox agents from being transported into the electrolyte layer. In general, since these devices are made by sandwiching a preformed electrolyte film, it is desirable that a thermoplastic electrolyte film is used that is laminated between two coated substrates to form the device. The device contains at least one polymeric redox layer coating on one of the substrates.

It is important that the polymers used in the electrolyte film and the redox layer themselves be compatible with the plasticizers. One way to ensure this is to have at least one of the monomers used to form these polymers be soluble in the plasticizer (or in other words be miscible, about in the same proportion as used in the device, i.e., that they have similar solubility characteristics). For example, if these layers are formed using urethanes, then at least one of the monomers used to form the urethane is soluble in the plasticizer (i.e., this solubility is determined before the monomer reacts and forms the urethane). In particular, it is desired that the polyol used to form the soft segments in the thermoplastic urethane in the electrolyte film be soluble in the plasticizer (i.e., miscible), and further, the same or a different polyol with similar solubility characteristics (and in a specific embodiment with a similar molecular weight) be used in the redox layer.

Those polymers which are used as perimeter sealants in these devices should have no or very low solubility and permeability to any of the components used within the device, particularly the plasticizer. If polyurethanes are selected for perimeter sealants then the monomers used to form them should not be miscible or form homogenous solutions with the plasticizers. The devices of this invention may have multiple sealants with different compositions and processability profiles with low moisture permeation to improve the reliability. For example, in addition to the sealants described here butyl sealants may also be used, which are known for low moisture and air permeation.

The thermoplastic electrolyte sheets and the redox layers used to fabricate these devices may also form covalent bond during the device processing step when the electrolyte sheet is being incorporated into the device, i.e., between 1 second to 120 minutes, 5 seconds to 90 minutes, 10 seconds to 60 minutes, 30 seconds to 30 minutes, 1 minute to 15 minutes, including any range of time in the disclosed ranges, after the electrolyte sheet has been incorporated. One method to accomplish this is by using a different reaction mechanism as compared to the one used to form the urethanes for these layers. This may be achieved by incorporating groups in the urethane forming monomers, which could be polymerized during device processing using addition polymerization. Such polymerization may be activated by heat or radiation. The sealants used for perimeter seals may also be cross-linked using addition polymerization once the sealants are in place within the device structure. The sealants may also have additives (in particular inorganic additives) to reduce their permeability to not only components migrating out from within the device but also to stop moisture and air from entering into the device.

The use of EC devices is described for fabricating high energy efficiency insulated glass unit (IGU) window systems. These windows have high thermal insulation and also desirable range of solar heat gain coefficient. Further, they provide good visibility and also protect the occupants from undesirable glare. These windows may also have other electrooptical elements (such as glass panels which comprise liquid crystalline materials and change from being clear to hazy by applying an electrical stimulus so as to provide privacy on demand.

The EC devices of this invention may also be formed on flexible substrates, which may then be used for retrofit applications for windows of buildings and for transportation (vehicles, buses, trains, planes, boats, etc.).

EC Device Construction

For architectural use, EC devices or window panels may be incorporated as one of the two or three glass panels into dual or triple pane integrated glass units (IGUs). These IGUs are used in energy efficient building envelops. For interior panels where the panels provide a certain level of privacy, it is not necessary to utilize IGU type constructions. For transportation, EC windows may be incorporated either way depending on the requirements. These windows are also called "smart" windows.

The EC panel or EC glass for use in windows are multilayered structures formed using one or two transparent substrates. In one typical construction formed by taking two transparent substrates, such as glass or plastic, and depositing an electrically conductive and transparent coating on one side of each of the substrates; these materials are referred to as transparent conductors (TCs). Depending on the details of the EC device, optional coatings called redox layers are deposited on these TCs. With the substrates positioned in a parallel configuration, and with the coated sides facing each other, a polymeric electrolyte is sandwiched between the coated substrates. The perimeter is sealed to encapsulate the redox layers and the electrolyte. A coloration potential is applied at the conducting coatings of the opposing substrates which alters the color of the system, i.e. of the color change takes place in redox coatings and/or the electrolyte.

FIG. 1 illustrates a side-view of an EC panel having a multi-layer structure formed using two substrates.

The side-view of EC smart panel 9 of smart window 1 is configured with two opposing substrates 2, 8, having layers therebetween. For a window application, the substrates 2, 8 are transparent glass or plastic. In the illustrated example, both substrates 2, 8 have a transparent electronically conductive (TC) layers 3, 7, respectively. Other layers include layers 4, 6, the EC layer and counter electrode respectively, both considered as redox layers as they undergo reduction and oxidation as discussed below. Between the electrodes 4, 6, is an ion-conducting (electrolyte) material 5. When an electric potential is applied between conductive layers 3 and 7, the redox layer in contact with the negative terminal (e.g., layer 4) reduces, while the layer in contact with the positive terminal (e.g., layer 6) oxidizes. In addition, the layer being oxidized releases ions (such as lithium ions, $Li^+$) which are transported through the electrolyte layer 5 into the reducing layer. In addition, the electrons released are transported on the other side through the external powering circuit. This redox activity results in an optical color change or electrochromic activity. When the voltages are reversed, or the circuit is shorted between the two conductive layers 3 and 7, then this reaction is reversed with a reversal in optical properties and the previously reduced and oxidized layers oxidizing and reducing simultaneously. In this example, the electrode 4 is formed of an electrochromic (EC) material; and the counter electrode 6 may also be formed from a material which does not have electrochromic properties or an EC material which may be different from the one used in EC layer 4. In the latter case, the EC material of the counter electrode 6 has complementary electrochromic properties to those of the EC electrode 4. Which means if the EC layer 4 darkens (or changes its optical state from a more transmitting state to a less transmitting state) due to reduction (i.e., insertion of cations and electrons from the conductive electrode adjacent to it) then simultaneously layer 6 also colors because of oxidation.

FIG. 5a shows another type of EC device construction where all of the redox materials (e.g., electrochromic dyes) are incorporated in the electrolyte. Electrochromic dyes are redox materials which are reversible and undergo a change in color or optical absorption when their redox state changes (i.e., color change occurs when these are oxidized or reduced and further, their oxidized or the reduced states can be reversed to the original state). One or more of these redox species may be covalently attached to the matrix polymer of the electrolyte, or all of them may be free to move within this layer. Such EC device using the current disclosure is made by laminating this electrolyte layer between a pair of conductive substrates or substrates coated with conductive layers where at least one of them is transparent, and for windows all substrates (e.g., glass or plastic) and conducting layers (e.g., indium-tin oxide, fluorine doped tin oxide, etc.) are transparent. Conventional EC devices have been made by introducing a liquid electrolyte containing all of these dyes and components between a cavity formed using two substrates with conductive coatings where these coatings face within the cavity. This cavity is sealed at the perimeter. The cavity is then filled with the liquid through a hole in the substrate or in the perimeter sealant used to form this cavity which is then sealed after filling. In some devices about less than 15% monomer and suitable catalysts are incorporated in this liquid, so that after filling this liquid can be solidified (after solidification 85% or higher is still the liquid phase, e.g., the plasticizer and the dissolved components which usually includes UV stabilizer and the electrochromic dyes). Usually, these solids are gels with almost no mechanical strength (i.e., about less than 0.01 MPa). The monomer content (same as polymer content) is kept less than 10% of this liquid formulation as the sealant at the perimeter of the preformed cavity does not shrink, whereas the interior of the device would as this polymerization takes place. This can cause stress at the boundary of the sealant and the electrolyte solid causing delamination during use. In the above devices the monomers may be acrylates; isocyanates and polyols to form urethanes, etc. where at least one of the monomers has a functionality greater than 2. The disclosure here such as it relates to certain dyes, color control, UV stabilizers and UV stabilization mechanisms results in substantial improvements to conventional devices and increases their performance and adaptability to many more applications.

The EC pane or device in one embodiment comprises several components: The polymeric ion-conductive electrolyte layer, a pair of redox electrodes at least one of which has electrochromic properties, perimeter sealant and busbar conductors, which are discussed in detail below.

Polymeric Ion-Conductive (Electrolyte) Layer

Since the ion conductive layer 5 (FIG. 1) is in contact with the two redox layers 4 and 6 and exchanges ions with them, its contact to these layers is important. There are other mechanical properties which are also important. Particularly for window applications, electrolyte layer 5 when solid in certain embodiments, may also provide safety properties to the window so that if the glass (substrate) breaks, its pieces are kept well adhered to this (electrolytic) layer rather than to fall off and cause injury. Safety glazing is tested by passing the projectile impact test ANSI Z97.1 from Accredited Standards, Committee (Vienna, VA). In addition, the glass substrates used for EC panels may be strengthened and or tempered. The electrolyte should have good adhesion to the substrates/coatings it is in contact with both for electrochemical activity and mechanical integrity. Adhesion of the electrolyte to a substrate or a coating thereon can be measured using ASTM D3167 test method which is a 90-degree peel test value. Peel properties are also important in obtaining electrolytic laminates, which can provide properties to the laminate for passing the impact safety test—ANSI Z97.1. In one embodiment a peel strength between the electrolyte and the substrate (or to the transparent conductor or to the redox coating) should be greater than about 1 N/mm, where the width of the film being peeled is measured in mm and the force in Newtons. In another embodiment it should be greater than 2 N/mm and in another embodiment greater than 5 N/mm. In yet another embodiment the peel strength is less than about 30 N/mm. Strength, elongation and thickness of the electrolyte are also important to provide improved laminate properties against impact, and in general failure under temperature extremes. In one embodiment, Strength and elongation may be measured using ASTM D412 method. The range of strength is from about 0.5 MPa to 50 MPa, and elongation from about 100% to 1,000%. In one embodiment, the hardness of the film is from about Shore A 20 to Shore D 40. For sound control properties a dampening of sound waves in a frequency range of about 20 to 20,000 Hz is desired, and for comparative materials typically, dampening is measured at about 2,000 Hz and this should be attenuated in a range of about 20 to 40 dB.

The ion-conductive layer is constructed out of transparent polymers to provide transparency and structural/safety properties and other ingredients so that these have good adhesion to the materials it is in contact with, good ion-conductive properties, UV and thermal stability. For example, for most battery applications the transparency and the UV stability of this layer are not important. The total ion-conduction of the electrolyte depends on the intrinsic conductivity of the ion conductor layer, its area and its thickness. In other words, total conductivity in S for a unit area (one square cm), the ion-conductivity of the layer would be its inherent or specific ion-conductance in S/cm divided by the thickness of the film in cm. For practical window devices in a size of about 30×30 cm or larger (or larger than 900 sq cm). A range of the electrolyte layer thickness is from about 100 microns to about 1,000 microns, in another embodiment the electrolyte thickness is from 50 microns to about 1,500 microns.

It is desirable that at room temperature (25° C.) the ion-conductance of these films (for one square cm area) in the thickness used is higher than $10^{-5}$ S. In another embodiment this should be higher than $10^{-4}$ S. Usually, the desire for increasing conductivity in electrolytic layer will be restricted by the desire to have increasing rigidity which is important for structural properties, thus for most devices total conductivity at room temperature (25° C.) will be in the range of $10^{-2}$ S to $10^{-4}$ S. This means that the specific ion-conductance of a film in a thickness of 100 microns (0.01 cm) with this range of conductance will correspond to a value of $10^{-4}$ to $10^{-6}$ S/cm. In another embodiment the specific ion-conductance of the electrolyte should be in a range of $5 \times 10^{-3}$ to $10^{-7}$ S/cm at room temperature (nominally 25° C.).

The conductivity of ion conductors decreases with temperature; thus compositions should be selected so that their conductivity should not reduce by more than a factor of 10 as compared to room temperature when the temperature drops to 0° C. and in another embodiment the factor of 10 reduction should materialize only when the temperature drops to -10° C. For superior low temperature performance, the Tg (glass transition temperature) of the plasticized polymer should be about 20° C. or lower as compared to the lowest temperature at which the windows would be switched. The lowest switching temperature in one embodiment is 0° C., in another embodiment -20° C. and yet in another embodiment -40° C. This can also be controlled by selecting the type of plasticizer. Thus, in one embodiment, the plasticizers may be liquids which have solidification point (Tg or melting point) below the lowest switching temperature. Further, other constituents being the same, for polymeric ion-conductors ion conduction could be varied by changing its thickness and the plasticizer amount and lithium ion concentration. In some aspects, lithium ions are provided by the solvated salt. In some aspects, the salt concentration may range from about 0.05M to about 3M based on the plasticizer content and in another embodiment from about 0.1M to about 1M or about 0.5M to about 2M, including but not limited to e.g., about 0.2M, 0.3M, 0.4M, 0.5M, 0.6M, 0.7M, 0.8M, 0.9 M, 1 M, 1.1 M, 1.2 M, 1.3 M, 1.4 M, 1.5 M, 1.6 M, 1.7 M, 1.8 M, 1.9 M, 2 M, 2.1 M, 2.2 M, 2.3 M, 2.4 M, 2.5 M, 2.6 M, 2.7 M, 2.8 M, or 2.9 M. If the higher molarity of salt is being used to gain the performance at specific low temperature where the device needs to be switched, it has to be checked that the salt is still solvated at that temperature. Further, those thermoplastic polyurethanes (TPU) compositions are preferred which, without the plasticizer and the salt, have a low Tg. In one embodiment this Tg should be below 0° C. and in another embodiment below -20° C. (negative 20° C.).

The optical clarity of the films should be high and optical haze must be low. Since, many of these ion-conductive films may have a texture on their surfaces for ease of removing entrapped air bubbles in processing, these properties are only measured when these films or electrolytes are laminated between two substrates. The optical properties including haze of the electrolyte film are measured by laminating the electrolytic sheet between about 2.3 mm thick clear soda lime glass (with standard iron content ~0.1%) and then measuring haze and transmission properties. The haze in the electrolyte for windows in vertical configuration should be lower than 2%, and in another embodiment lower than 1%. For overhead windows such as skylights and sunroofs, higher haze in the electrolyte can be tolerated, up to 5%. The transparency of these laminates formed between a pair of clear soda-lime glass in a thickness of 2.3 mm should be in excess of 65%, and in another embodiment equal to or greater than 85%. Haze may be measured by using a standard test method ASTM D1003 and clarity by measuring transmission at the peak of photopic eye response which is at about 550 nm.

The ion-conductive properties may be imparted to polymeric compositions by the polymers themselves which may have ionic groups, but in many instances, this is imparted by adding plasticizers which are compatible with the polymeric matrix in which metal ion salts are dissolved (such as lithium metal salts). Some examples of plasticizers are propylene carbonate, γ-butyrolactone, tetraglyme, sulfolane, monofluoroethylene carbonate, difluoroethylene carbonate, esters with molecular weights of less than 300, hydrophobic ionic liquids, and so forth. These may also be added in any proportion (i.e., one or a mixture of two or more plasticizers) as long as they are compatible with the system. In one embodiment which uses the solid electrolyte based on thermoplastic polymers, the ratio by weight of the polymer to the plasticizer is in the range of 4:1 to 1:4. Some examples of lithium metal salts with electrochemically stable anions and which dissolve and dissociate into anions and cations in plasticizers are triflate ($CF_3SO_3^-$), imide ($N(CF_3SO_2)_2^-$), beti (($C_2F_5SO_2)_2N^-$), methide ($CF_3SO_2)_3C^-$), tetrafluoroborate ($BF_4^-$), hexaflourophosphate ($PF_6^-$), hexafluoroantimonate ($SbF_6^-$), bis(fluorosulfonyl)imide ($N(FSO_2)_2^-$), hexafluoroarsenate ($AsF_6^-$) and perchlorate ($ClO_4^-$). In those devices where no EC layers need to be intercalated with lithium, the cation may be an organic cation such as ammonium (or also see ionic liquids which may be used instead which are also salts of large anions and cations). Typically, the weight content of plasticizers in polymeric films for use as electrolytes may vary between about 10 to 80%, and 10 to 70% in another embodiment and yet in another embodiment between 20 to 50%; e.g., if the weight of the plasticizer used is 20 parts and weight of the polymer is 80 parts then that is considered as the plasticizer content of 20% as calculated below:

$$\frac{20 \text{ (plasticizer)} \times 100}{20 \text{ (plasticizer)} + 80 \text{ (polymer)}}.$$

The above ratios only suggest the proportionality of the plasticizer and the polymer, and do not include weights of other additives such as salts, UV stabilizers and redox/dye materials. The type of polymers preferred for the ion-conductive materials are either single or multiphase thermoplastics. This is to impart enough structural strength to the layer and still have the chain flexibility to provide adequate ion conduction. For example, block thermoplastic polymers will provide multi-phase structure where certain part of the polymer chain (hard segment) will form phases or domains which melt at high temperatures and are not solubilized by the plasticizer. An example of this will be thermoplastic polymers such as those formed by reacting an isocyanate monomer with another monomer containing reactive proton atoms, such as alcohols, phenols, amines and carboxyl groups—such as thermoplastic polyurethanes (TPU) formed by a reaction between isocyanate and alcohols. Polyurethane polymers may also include urea, allophanate, carbodiimide, uretidinedione, and other linkages in addition to urethane linkages. Other examples of block copolymers for electrolytic use are fluorinated polymers. Fluorinated polymers have regular repeat unit blocks in their polymeric chain structure which crystallize and hold the amorphous forming regions of the polymeric chains from slipping away. This plasticizer is mostly contained in the amorphous regions. For optical applications such as EC devices the size and concentration of the crystalline regions or that of domains formed by hard segments is small enough (generally less than about 400 nm, and in another embodiment less than about 100 nm) so that these are invisible and do not cause optical haziness.

Another example of a copolymer that may be used for thermoplastic electrolytes are materials belonging to a general class of polyvinylacetals. This category comprises of many polymers, one of the prominent copolymer in this class is polyvinylbutyral (PVB). In one method polyvinylacetate is hydrolyzed (to convert some of the acetate groups to the hydroxyl groups and some of these hydroxyl groups are converted to an aldehyde (e.g., vinyl butyral in PVB). Thus, PVB will contain polyvinyl acetate, polyvinyl alcohol and polyvinylbutyral. In one embodiment vinyl acetate percent is from 0.01 to 5%, vinyl alcohol from 12 to 35% and vinyl butyral from 45 to 75% (all percentages by weight).

The TPUs form hard and soft phases where the soft phases are compatible with the plasticizers and the hard phases hold the polymer shape (or act as physical crosslinks or binding points for the polymeric chains) in the temperature range of use, in other words the Tg of the hard phases is typically higher than the use temperature, in one embodiment Tg of these phases is higher than 90° C. and in another embodiment higher than 100° C. and yet in another embodiment higher than 115° C. Since these electrolytes are thermoplastics and processed by lamination these hard phases should melt, and in one embodiment their melting point should be lower than 185° C., in another embodiment lower than 170° C. and in another embodiment lower than 150° C. The TPUs are formed by reacting a diisocyanate with two polyols (both with a functionality of two), one with a short molecular weight (or chain extender typically having a molecular weight of about 62 to 400) and the other a more flexible longer chain with a higher molecular weight (usually 600 to 3,500). These polyols react with the diisocyanate to form the TPU, and according to the theory blocks of predominantly diisocyanate and the chain extender form the hard phase while the reaction of predominantly diisocyanate and the flexible polyol forms the soft phase. Thus, the TPU is selected where the plasticizer has high compatibility with the flexible polyol. In addition, for those applications requiring good UV stability, such as window applications, aliphatic isocyanates are selected. A few commercial bifunctional aliphatic isocyanates are isophrone diisocyanate (IPDI), methylene-4-4'di(cyclohexane isocyanate) (HMDI) and hexamethylene diisocyanate (HDI). For applications where ions are present and redox activity takes place in electrodes in contact with the electrolyte film, it is preferred that the polyols used in the electrolytes are based on polyesters and polycarbonates, although in some situations, polyether-based polyols may also be used. Polyesters include lactone-based polyols such as those made using ring opening polymerization of γ-butyrolactone, γ-valerolactone, δ-valerolactone and ε-caprolactone. The polyols for soft segments themselves may be made not by using just one di-acid and one diol, but rather using one or more di-acids with one or more diols, so that these polyols themselves represent random copolymers including those which have branches (e.g., a polyol may be formed from adipic acid and using the following three diols in various proportions 1.6-hexanediol, 2,2-dimethyl-1,3-propanediol and 1,2-propanediol). This allows a greater flexibility in the finished urethane with the desired properties in terms of plasticizer compatibility, hardness, glass transition temperature and mechanical strength and toughness requirements of the urethane. As another example polyols for soft segments derived from lactones may contain more than one type of lactones, or even a mixture of lactones di-acids and diols, and may even have different molecular weights.

The preferred TPUs should be hydrophobic to minimize the water uptake in case electrolytic films containing these polymers are briefly subjected to ambient conditions during processing. A desirable moisture content ceiling in these films is about 0.1% by weight, and a lower number of 0.01% is preferred. In these thermoplastic films the NCO index is generally between 90 to 102 and in another embodiment between 95 to 100. NCO index is 100 times the ratio of the number (or moles) of isocyanate groups used to form the urethane as compared to the total number (or moles) of hydroxy groups present both in the flexible polyol and the chain extender. To promote good adhesion to substrates, thermoplastic polymers with slight excess of hydroxyl groups are sometimes used, i.e., the NCO index is lower than 100. The reactions to form these urethanes is carried out under stirring conditions and also the temperature is usually raised with increasing polymerization so that the mixture does not solidify before the reaction is completed. In one embodiment, during the polyurethane preparation the temperature is raised above the melting/flow point of the finished polymer.

In a variation of the above process, the chain extension diol is replaced by a diamine. Since the diamine and the isocyanate react faster (and form a polyurea bond) as compared to the isocyanate-hydroxyl reaction forming the urethane bond, this method forms a more uniform hard segment polymer chain sequences, largely comprising the chain extender and the isocyanate only, prior to the reaction with the soft segment forming polyols. In this case the NCO index is then defined by 100 times the total isocyanate groups divided by the total of the hydroxy and the amine groups. Thus, the advantage of this method is the ability to carry out one pot synthesis, but having the advantages of a two-step reaction where in the first step only the isocyanate and the chain extender are mixed and reacted, and in the second step the soft segment forming polyol is added.

Further, to reduce the uptake of moisture during processing, part of the plasticizer content may also be hydrophobic. The plasticizer may be a mixture of different plasticizers and may include 5 to 80% of hydrophobic plasticizer by weight (based on the total plasticizer weight). When using hydrophilic plasticizers, such as propylene carbonate, γ-butyrolactone, tetraglyme, sulfolane, monofluoroethylene carbonate, difluoroethylene carbonate, hydrophilic esters with molecular weights of less than 300, one may mix these with hydrophobic liquids, which may be hydrophobic esters and/or also hydrophobic ionic liquids. Aliphatic esters are preferred so that they have lower propensity to degrade in the UV. Some examples of such ionic liquids are salts of quartenary ammonium cations of pyridinium, pyrrolidinium, pyridazinium, pyrimidinium, pyrazinium, imidazolium, pyrazolium, thiazolium, oxazolium, and triazolium. These may have various substitutions or substituents, such as H, F, phenyl and alkyl groups with 1 to 15 carbon atoms. Rings may even be bridged. Saturated rings such as pyrrolidinium are preferred for superior UV stability for clear systems and they also tend to have superior electrochemical stability range. The anions of these salts are typically fluorine containing such as triflate ($CF_3SO_3^-$), imide ($N(CF_3SO_2)_2^-$), beti (($C_2F_5SO_2)_2N^-$), methide ($CF_3SO_2)_3C^-$), tetraflouroborate ($BF_4^-$), hexaflourophosphate ($PF_6^-$), hexafluoroantimonate ($SbF_6^-$), bis(fluorosulfonyl)imide ($N(FSO_2)_2^-$) and hexafluoroarsenate ($AsF_6^-$). Of these, imide, beti bis(fluorosulfonyl)imide and methide anions are able to provide hydrophobicity. An example of a hydrophobic ionic liquid is 1-butyl-3-methyl pyrrolidinium bis(trifluoromethanesulfonyl)imide (BMP). When in an electrolyte ionic liquids and lithium salts are used, in some embodiments the anion for both is similar.

In addition, for window applications the plasticizers (or mixtures) are preferred which in one embodiment have a boiling point in excess of 50° C. as compared to the highest use temperature, and in excess of 100° C. in another embodiment. For example, the EC panels in the windows in the darkened state under sunny and intense solar conditions could reach temperatures of about 50° C. higher as compared to the outside ambient air temperatures. For example, a window used in climates where the outside air temperatures may get as high as in the vicinity of 45 to 50° C. with full sun, the window temperature in the darkened state can be close to 100° C., thus the minimum boiling point of the plasticizer (or of the mixed plasticizer) used should be 150° C. in one embodiment and 200° C. in another embodiment. Further these films (containing all ingredients including polymer and the plasticizers) should have a solidification point of the mobile phase (freezing point of the mobile phase or glass transition point of the complete electrolyte formulation) of at least the lowest use temperature it is subjected to, and in other embodiments at least 10 to 20° C. below the lowest use temperature. As an example, mobile phase is defined as the phase containing the soft segments and the plasticizer. For example, if in a region a window is subjected to −40° C. of ambient outdoor temperatures, then the solidification or the glass transition point of the mobile phase should be at least the same and, in some embodiments, even about 10° C. to 20° C. lower, i.e., −50° C. to −60° C. In many cases since electrolyte films will be incorporated into the device by lamination, it is important that the vapor pressure of the additives is low so that these do not outgas when vacuum is applied in the process to degas or deaerate during lamination.

Although the above disclosure is extensive in terms of thermoplastic electrolytes, these electrolytes may also be crosslinked. Crosslinking is carried out during or after the devices are processed. This may be done by crosslinking the polymers or by the polymerization of monomers with a functionality greater than 2.

UV Stabilizers, Other Additives and their Incorporation into the Electrolytes

A method of making compositions of electrolytic TPU is to take the liquid plasticizer component and dissolve the UV stabilizer, the salt (lithium salt), adhesion promotors and viscosity modifiers. If the formulation also calls for redox materials and dyes for the electrochromic action, these may also be added to the above liquid mixture at this time. To these are added the polyols, and the polymer forming catalyst(s) so that a liquid mix is obtained and is then homogenized prior to the addition of the isocyanate. The isocyanate is then added and reacted with the polyol by heating this mix so that a solid electrolytic TPU melt is obtained. In one embodiment the UV stabilizer in the quantity added should be soluble in the plasticizer and the salt solution, and in another embodiment, it must be soluble in the complete formulation which is being used to form the plasticized polymer. For crosslinked electrolytic compositions starting with monomeric compositions, the UV stabilizers may also be added at the monomeric stage so that they can be mixed uniformly.

The weight fraction of the UV stabilizer is in the range of 0.1 to 10% of the total weight of the plasticized polymer (sheet). Any types of UV stabilizers and their mixtures may be used as long as they are compatible with the system, particularly soluble in the plasticizer and the salt solution. UV stabilizers include benzophenones, benzotrizoles, triazines, cyanoacrylates, hindered amines and non-basic hindered amines. Some examples of UV stabilizers useful in the current electrochromic devices are Uvinul 3000™, Uvinul 3035™, Uvinul 3040™, Tinuvin 1130™, Tinuvin 109™, Tinuvin 249™, Tinuvin 171™, Tinuvin 292™, Tinuvin 234™, Tinuvin 312™, Tinuvin 326™, Tinuvin 328™, Tinuvin 477™, Tinuvin 479™, Tinuvin 765™, UVINUL D-50™, UVINUL D-49™, UVINUL 400™, TINUVIN P™ and Uvinul 3027™, Tinuvin Carboprotect™, all available from BASF (Wyandotte, MI). These UV stabilizers may be used by themselves in a particular device or several may be used together depending on the type of polymer and plasticizers used, wavelength coverage needed and electrochemical range of the device. Use of several UV stabilizers is desired, generally from different classes (UV absorbers based on benzophenones, cyanoacrylates, oxanalides, benzotriazoloes, triazines and hindered amine light stabilizers, as examples) as they have different protection mechanisms and their combinations result in synergistic effects.

Typically, the UV stabilization for most applications is needed when polymeric and electrochromic materials are subjected to the wavelengths of 290 nm and more as the solar radiation on earth's surface does not have much intensity below 290 nm. Although there is no limitation on the wavelengths lower than 290 nm for UV protection, the UV stabilization must protect the devices from wavelengths of 290 nm to the upper limits as stated below. In one embodiment, the concentration of the stabilizer is adjusted so that in the desired electrolyte thickness there is protection from the optical radiation up to wavelengths of 380 nm. In one embodiment this means that the absorbance of any optical radiation going through this cell (or the electrolytic medium) should be at least 1 at 380 nm and the same or higher down to 290 nm and the absorbance decreases beyond 380 nm. This means that for this device there is an absorbance edge at 380 nm with a height of at least one absorbance unit (A=1). In another embodiment an absorbance edge height is at least 2 absorbance units at 380 nm (A=2) and yet in some other embodiments an absorbance edge height is 4 (A=4) at the desired wavelength.

It was surprisingly discovered that in many of the EC devices, the EC materials may have optical absorbance which are more red-shifted as compared to the UV stabilizers. Thus, UV coverage protection imparted by UV stabilizers should be such that its UV absorption edge is more red-shifted as compared to the edge of the EC materials it is protecting (both in the colored and the bleached states). This results in better UV protection of the electrochromic materials and hence the device. For example, where certain organic electrochromic materials are used (e.g. electrochromic dyes), they may have strong absorption in the UV region, this absorption is typically different in the bleached and in the colored state. These materials have strong optical absorption in the region of 290 to 380 nm and sometimes extending into the visible region of up to 425 nm. As the UV absorption falls rapidly when approaching the visible region (or sometimes a bit into the visible region), it almost looks like an edge (cliff) when absorption is plotted against the wavelength.

At the wavelength where its absorbance starts falling and reaches 1, is defined as the absorption edge of that material. This edge is measured in a concentration in which the EC material is used in the device, e.g., in the electrolyte or in a layer, and the thickness of this layer. In many cases, this absorption edge of the EC materials is usually below 380 nm and in other cases it may be extended into the visible as far as about 425 nm. Conversely, the absorption rises rapidly as the optical absorption is measured starting from the visible region as one proceeds into the UV region. For some EC materials the absorption edge in the bleached state may red-shift or blue-shift by up to 25 nm when they are colored or go to a different optical state. Another way of visualizing the UV absorption edge is the region where a rapid rise of the optical absorbance while traversing from the visible into the UV region. This edge (absorption vs. Wavelength) is not vertical but has a slight negative slope. As discussed below, the optical absorption edge is defined using absorbance (optical density) numbers. This works well when clear substrates are used to measure absorption. Some examples of these clear substrates are TEC15™, TEC10™ TEC7™ and Half-Wave and full-wave indium/tin oxide coated clear soda-lime glass. When clear substrates are used the absorbance in the visible region for clear materials is usually in the range of about 0.1 to 0.2 (or an average of about 0.15 is taken as baseline absorbance in the visible region), a rapid rise in absorbance by 0.85 units at the edge to reach a value of 1 is significant. For mirrors, absorption is measured in reflection and the surface (or the substrate) through which the light enters and exits has to be clear.

In those instances, where highly colored substrates are used there are a couple of options. The absorbance edge can be measured by making devices with clear substrates to determine the edge of the electrolytes and the EC materials which need to be protected. For example, the absorbance edge can also be measured for those devices where the high absorbance is not due to the substrates, but the absorbance is coming from using highly absorbing (colored) electrolytes or the EC materials. One alternative is to correct for the high visible baseline absorption (being labeled here as baseline absorption, i.e., the baseline from which this edge or the cliff rises) and then to that add 0.85 absorbance units. For these devices, lowest absorbance between the wavelengths of 380 and 480 nm is measured (called baseline absorbance in the visible region for this sample) and then 0.85 absorbance units to get to an equivalent of absorbance of 1 (A=1). As an example, when an EC device shows a minimum absorbance of 1.9 in this region (380 to 480 nm), then the absorbance for the UV edge would be 1.9+0.85=2.75 which would be equivalent to A=1 as defined in this disclosure and similarly, an absorbance of 3.75 would be equivalent to A=2. This edge has to be rising from the visible region (longer wavelengths) into the UV region (shorter wavelengths).

One example of an EC material class, where the UV absorption edge extends into the visible to almost 400 to 420 nm are viologen salts (or viologen dyes) in the colored state. These materials are used in EC devices as cathodic EC materials. As an example, for several viologens the optical absorption edge is at about 390 to 400 nm in the bleached state and this may move to 400 to 420 nm in the colored state. As an example, for an EC device with viologen in the colored state, this means that the UV protection should be provided so that with the UV stabilizer has an absorption edge that is at least equal to or more re-shifted to the viologen in the colored state. This would provide UV protection to the EC devices both in the bleached and the colored state. This means that this level of UV protection covers the edge of the EC material, so that any radiation in this region is preferentially absorbed by the UV stabilizer and not as much by the EC material. In another embodiment, the absorption edge of the UV stabilizer should extend towards the longer wavelength (red-shifted) by about 5 nm or more and in yet another embodiment this shift should be 10 nm or more past the edge of the EC material. The absorption edge of the EC device is measured without any UV stabilizer in the electrolyte or an outside protective film. The absorption edge of the UV stabilizer is measured in a concentration that it would be present in the device, and the thickness in the layer it is present in, preferably without any EC dyes or EC materials. In one embodiment the absorption edge of the UV stabilizers used in an EC device should be 400 nm or more at A=1 for an electrolyte thickness of 600 μm or lower thickness in the device, In another embodiment the absorption edge of the UV stabilizers used in an EC device should be 395 nm or more at A=2 for an electrolyte thickness of 600 μm or lower thickness in this device. In another embodiment, for thicker electrolytes, its equivalency to the above embodiments may be calculated in the following way, where different thickness cells are made and wavelengths at which A=1 and A=2 is established. A linear curve through this is extrapolated to 600 μm and wavelengths at which A=1 and A=2 will occur is estimated.

For an EC material having an absorption edge of 390 nm against which it needs to be protected, The UV stabilizer should have an absorption edge of about the same or having the absorption edge at higher (red-shifted) wavelengths. This excess may be 5 nm, 10 nm or more in different embodiments. Thus, the absorption edge of the UV stabilizer should be 390 nm, 395 nm or 400 nm or more according to the above embodiments. This also means that a film or cover that is provided external to the EC device (bonded to the EC device or placed outside the EC device) for providing UV protection, should also have an absorption edge that meets the wavelength or exceeds the wavelength of the absorption edge of the EC device according to the above embodiments. with this absorption edge will have a lower transmission below the absorption edge as one moves into the UV, and will have higher transmission as one moves towards the visible. In case external films and covers are used, in one embodiment the optical transmission at the optical edge should be about 10 times less compared to the optical transmission at 550 nm. The external films may also provide UV blocking by reflecting the UV or annihilating the UV by a stack of thin films due to interference.

For the purpose of this disclosure, a specific absorbance level is selected as discussed herein along with an associated wavelength, if no specific absorbance is mentioned then this edge is taken at an absorbance value of A=1 at the rising edge of the absorption when traversing from the visible to the UV region.

In another embodiment, the UV stabilizers used for protecting the EC devices should have an absorption edge measured at an absorbance of 1 (A=1) at 395 nm or more in one embodiment, 400 nm or more in another embodiment, 410 nm or more in another embodiment, and may reach about 430 nm. One way to measure the optical edge is by preparing the electrolyte (liquid or solid) without the UV stabilizer and placing it between two substrates in the intended thickness (generally from about 20 to 1,500 microns) and measuring the absorbance as a function of wavelength in the region of about 290 to 480 nm and the absorption edge can be determined as the absorbance rises in the UV region. The substrates may be clear substrates coated with transparent conductors to be used with the intended device (e.g., glass with 2 to 40 ohms/square transparent conductor, such as ITO or TEC15™, TEC10™ glass) or may have other coatings. This measurement is made when the EC device is bleached to determine the optical absorption edge. The same measurement is repeated in the colored state and the UV absorption edge is determined. The absorption edge which is more red-shifted from these two is taken as the reference edge and the UV stabilizer should provide a UV absorption edge which is at least the same, but preferably even more red-shifted as disclosed earlier. Further, the measurement of the absorption edge is repeated with the UV stabilizer added to the electrolyte in a concentration intended for the device in the bleached state. The UV absorption edge of the UV stabilized device should be red-shifted as compared to the non-stabilized device in both the bleached and the colored states. The external protection in a device may be used in addition to stabilizing the electrolytes or without stabilizing the electrolytes. Examples on the use of external polymeric films that are available commercially and are adhesively bonded to the external surfaces of an EC cell are presented in US patent application with a Ser. No. 17/226, 238 filed on Apr. 9, 2021. In another embodiment, use of UV stabilizers is disclosed which, when present in the EC devices in a concentration, provide at least an absorbance of one (A=1) at 400 nm.

In another embodiment in any EC device containing dyes (e.g., viologens) as an EC material along with the UV stabilizers the absorption edge in the bleached state at A=1, must be 400 nm or more and yet in another embodiment 405 nm or more and in a further embodiment 415 or more. The dye(s) may be present in the electrolyte or in a separate electrode. This is because in the colored state, the colored viologen edge at A=1 will shift at or beyond these numbers and the device will not be UV protected. Similar numbers for A=2 will 396 nm, 399 nm and 409 nm respectively. All of these numbers are for the bleached state. In the claims if no value for absorbance is stated, then A=1 is assumed. For transmissive devices these numbers would be valid for devices with electrolyte thickness of 600 μm or less and for reflective devices 300 μm or less (as in the latter case the light travels twice in the electrolyte). For thicker devices these numbers may be calculated and reduced to these thickness equivalents as discussed elsewhere in this disclosure.

When red-shifted UV stabilizers are used that have significant absorption above 390 nm, these products may appear slightly off color and may have a faint yellow-brown appearance which can be moderated by using a glass that appears blue or has a higher transmission in blue. This glass may be used as one of the substrates on which a transparent conductor is deposited, or it may be placed in parallel to the EC element in a window. In the latter case it may be laminated to the EC element, or if an IGU construction is used then it may have a low-e coating and used to form an IGU unit with the EC element. Some examples of such glass are Arctic Blue and Eclipse Advantage Arctic blue (from NSG, Toledo, OH).

Examples of external protection are shown in FIG. 5b. The device in FIG. 5b (i) and (ii) is the same which is shown in FIG. 5a, with the same description of the elements other than the following differences. FIG. 5b (left panel) shows that the device is protected by an outside polymeric film 57a which is bonded to the substrate coated with transparent conductor 55bb. The UV agent with the desired UV blocking properties may be present in the polymeric film or/and in the adhesive used to bond to the device. The film may have other UV absorbers or hard coats, etc., to impart other desired properties. In this figure relative configuration of the film to the outside (of the building) and inside facing directions are shown. The EC device may or may not be a part of an IGU configuration, but its relative directionality will be as above. The film 57 a may be bonded to the substrate 55bb after assembling the EC device or prior to the EC device assembly. This film may also provide safety characteristics where upon glass breakage, the broken pieces are retained by the film. FIG. 5b (right panel) also shows another way of providing the UV protection, and also can provide additional impact safety and acoustic damping characteristics. Here a similar device as in FIG. 5a is laminated using a lamination polymeric film 57b using a substrate 57c to the outside of the device. Film 57b may provide the UV protection (i.e., has the desired UV stabilizers or UV blocking additives), and 57c is another substrate (polymeric or glass). Film 57b is for example selected from polyvinylbutyral (e.g., UA01 from Sekisui, Japan), ethyl vinyl acetate, polyurethane TPU or any other material. The lamination may be done to the substrate 55bb prior to assembling the EC device or after. It should be noted that these devices may be transmissive (e.g., windows) or reflective like rear-view automotive EC mirrors, however, in both cases light has to transmit through the element (cover or the electrolyte) which has the UV properties disclosed above. For mirrors the transmission of light through this medium is twice. Once as the light enters the device and traverses through these mediums containing the UV stabilization, reflects from a reflector (which may be part of one of the electrically conductive coating on the substrate), and travels back out of the medium to an outside observer.

In one embodiment to form the TPU electrolyte, the isocyanate and the polyol forming the hard segment (or the chain extender) is first reacted to form a prepolymer before adding the mixture containing the polyol for the soft segment. Prior to the polymerization of this liquid monomeric composition to form the TPU the other ingredients which include the plasticizers, UV stabilizers, other additives (see below) including redox materials and EC dyes (if present) are also added. These additives may be mixed together in the plasticizer prior to their addition to the monomers. For TPU the monomers may be added together or in in any sequence. In one method the isocyanate and the chain extender are added and reacted and then the polyol for the soft segment is added. This method of forming the thermoplastic electrolytes, where additives are added in the monomeric stage may be used with any other thermoplastic compositions which are not even TPU, and this method ensures a high degree of mixing. These electrolytes may be then be formed into sheets for incorporation into the EC devices. In one method the polymerized compositions are pelletized and then formed into sheets by extrusion.

In yet another embodiment the thermoplastic polymer is synthesized (TPU or another polymer), and then the plasticizer with the other additives is blended into the TPU by using standard compounding processes. After compounding these may be formed into sheets directly, or pelletized and then formed into the sheets by extrusion in a separate step.

In yet another method a solvent is used to dissolve all of the materials including the polymers. These solutions are cast as films and solvent evaporated (and ensure that the processing conditions employed do not result in excessive plasticizer loss), and the resulting solid films are then used for lamination for preparing the EC devices.

Various other additives may be incorporated into the thermoplastic urethane to impart particular properties. These include adhesion promoters, leveling agents, tackifiers which impart a tackiness to the resinous surface at moderately elevated temperatures (for example, at about 80° C.) viscosity modifiers and even dyes and colorants which impart permanent coloration in case it is required that the bleached state transmission of the EC devices is low or has a particular hue without having to adjust the same by selecting a substrate with a specific transmission or color. Examples of adhesion promoters include silanes such as glycidyl oxypropyl trimethoxy silane, gamma-aminopropyl triethoxy silane, 3,4-expoxycyclohexylethyl trimethoxy silane and amino trimethoxy silanes; leveling agents (e.g., cellulose esters) and tackifiers (e.g., phthalic acid type polyester resins). Examples of viscosity modifiers include fumed silicas, and for electrolytes hydrophobic silicas are preferred. Typical BET surface area of fumed silicas for use here is about 100 $m^2/g$ to about 300 $m^2/g$ (e.g., Aerosils R972, 974, R812 from Evonik (Parsippany, NJ). When used, the additives should be present in amounts which do not adversely affect other desired properties of the thermoplastic polyurethane or the electrochromic properties (cyclability, degradation in weatherability, change in redox potentials, etc). Generally, these additives can be used in amounts within the following ranges, in parts by weight based on 100 parts of the thermoplastic polyurethane, about 0.1 to about 0.5 part of adhesion promoter; about 0.1 to about 2 parts of leveling agents; about 0.5 to about 5 parts of a tackifier; and about 0.1 to 2 parts of the viscosity modifier.

The plasticized polymer as obtained above is then processed into sheets by extrusion or calendaring, or plasticized polymer is cooled and pelletized so that these can be extruded later into films. These electrolytic sheets when formed should be immediately protected by release films and then rolled up and stored in sealed containers flushed with dry inert gas (nitrogen, argon, etc.) for transportation, and storage until used. This avoids excessive exposure to the ambient where it may take in excessive moisture and/or air. There may be variations of the sequence of addition of the polyols and isocyanates, i.e., one may first add the chain extender polyol followed by isocyanate and then the soft segment forming polyol. These materials may be made using either of the methods, however, a preferred method is where the compounding is done of the ingredients prior to the final polymerization step, i.e., before forming the TPU.

The thermoplastic electrolytes formed using this disclosure may also be processed by 3d printing or additive manufacturing as described briefly below and extensively disclosed in PCT patent application entitled "Improved Method to Fabricate Laminate Devices Using Printed Interlayers" published as WO2021/112912, filed on Apr. 21, 2020; the disclosure of which is incorporated herein by reference. In this case, the 3-d printed pattern is deposited in a single layer (i.e., a single pass) or as multiple layers (using multiple passes). In one embodiment the electrolyte is deposited on one of the substrates (coated with transparent conductor and other EC or redox layer if present in the device) by 3d printing process which involves depositing (or extruding) a string or a pattern of molten material (also called a bead) on the substrate. This is generally done in parallel adjacent lines which have a diameter in the range of about 50 to 1,500 microns depending on the desired thickness of the finished electrolyte layer. This pattern may be a single layer or multiple layers formed on top of the previous layer until the desired thickness or build is obtained. These beads and/or lines of material are laminated by lowering a second coated substrate and using heat and pressure in subsequent lamination process to make these to flow so as to coalesce to form a layer of uniform thickness of the electrolyte between these substrates. The perimeter sealant (if thermoplastic and described later in this disclosure) may also be formed by this process on the same substrate and then these materials are sealed and assembled in the same lamination step. As a variation, if the electrolyte is formed in several layers, optionally, the layer composition and layer thickness may also be varied. As an example, to form a multilayer laminated device as disclosed in U.S. Pat. No. 8,115,984 (Agrawal et al.), which is incorporated by reference in its entirety, the first electrolytic layer may have an anodic dye, the second layer may be only an electrolytic composition and the third electrolytic layer may have a cathodic dye, which upon lamination will provide a multilayer device where the electrolyte layer separates the anodic and the cathodic layers.

The windows of this disclosure may also be recycled at the end of their life using the principles taught in published US patent application 2020/0016641 (Agrawal), which is incorporated by reference in its entirety. The substrates are separated from the electrolyte and processed to recover useful components.

Further, in making the TPUs, the mole % of the polyol monomer providing the soft segment (based on the moles of isocyanates used) is usually in the range of about 30 to 70%, and the balance is the polyol providing the chain extender part. More than one soft segment and/or hard segment polyols may be used. Polyols containing sulfur may be used to increase the refractive index of the polymer so that it may be matched closer to the electrodes and substrates to keep optical reflections from the interfaces low. An example of a sulfur containing polyol for chain extender is 2,2'-[sulfanediylbis(benzene-1,4-diyloxy)]diethanol.

Another class of materials may be employed in making these prepolymers are ionomers, where the anion is part of the polymeric backbone and the cations are alkali metal ions (such $K^+$, $Na^+$ and $Li^+$). The formulations containing ionomers may still be mixed with the plasticizers and additional lithium salts to provide adequate ionic conductivity. One way of making an ionomer is to use polyols which have acid groups, but the latter do not participate in the reaction with the isocyanates while the prepolymers are formed. Later these prepolymers are reacted with strong bases such as lithium hydroxide to exchange the protons on the carboxylic acids with lithium. When weak carboxylic acids are used in the above process, their salts with lithium are quite prone to being moisture sensitive. In presence of water, lithium could be again replaced by protons raising the pH (due to the formation of LiOH) and reducing the lithium ion conductivity and causing electrochemical instability and irreversibility. Another alternative method is to start with salts of strong acids (such as sulfonic acids), as these are stable and do not interact with moisture to form bases. Salts such as 5-Sulfoisophthalic acid monolithium salt and dimethyl 5-sulfoisophthalate sodium salt are used. One mole of these salts are chain extended by using two moles of diols to form a larger monomer, catalysts such as dibutyltin oxide are used (e.g., in a concentration of 0.05 wt %). Any volatile byproducts are removed. The polyols used are preferably those which are used for the soft segments so that these may easily interact with the plasticizers and the additional salts if used to provide ionic conductivity. These are then used to replace all or part of the soft segment polyols which are then reacted with aliphatic diisocyanates and the chain extender polyols and the additives to form the thermoplastic TPUs as described above. When sodium salts are used to make the above polymers, then using a dialysis procedure these may be later exchanged with lithium ions (either after the formation of larger monomer or the complete polymer).

In a very different use of ionomers in these electrolytes, one may even use a sodium salt for making an ionomer which ends up in the hard segment and form strong ionic bonds, i.e., it is first chain extended using diol for hard segment which does not have any interaction (or low interaction) with the plasticizer. The objective here is to raise the softening or the melting point of hard domains so that the polymers may be used for windows which see elevated temperature for long periods of time. Generally, the thermoplastic urethanes with aliphatic isocyanates without ionomers may be used to about 85 to 90° C. for continuous use. Thus, this is a method to extend the use temperature of thermoplastic ionic polymer with aliphatic isocyanates so that it has a melting point (softening or the flow point) in excess of 90° C., 100° C. or in another embodiment in excess of 120° C. In another embodiment this temperature must be lower than about 170° C., so that the film may be laminated at temperatures less than about 200° C. This allows these polymers to sustain higher temperatures during use without the use of crosslinking. In this case sodium or even bivalent ions such as zinc may be used to form the high temperature usable ionomeric polymers. It must be noted that in this case the ionic conductivity is not through the hard domains formed of ionic materials, but the soft segments which are compatible with the plasticizer.

The thermoplastic TPU in the electrolyte sheet may also be crosslinked as these sheets are being processed into the EC devices. Polymerization to form the crosslinks uses a different mechanism during the lamination process. For example, crosslinking is by addition polymerization as compared to the formation of the TPU which is formed by condensation polymerization. The addition polymerization may be triggered at a different temperature or even by light depending on the type of addition polymerization catalyst and chemistry which is used. One way of obtaining such TPUs, which are capable of going through this type of polymerization, is to incorporate polymerizable unsaturations in the TPU. This can be done by forming a TPU so that it is predominantly isocyanate terminated or has unreacted isocyanate groups hanging of the TPU polymer chains. These groups are further reacted with mono-polyols which have also have addition polymerizable groups (e.g., free radical, anionic or cationically polymerizable group) as described below. The TPUs with such reactive ends may be optionally mixed with more monomeric crosslinkers which also have unsaturated groups and polymerize with themselves and/or also with the unsaturated groups located in the TPU polymer chains. For this type of reaction, typical molecular weight of the TPU in the formulation is about 3,000 to 200,000. Since it is desired that such a system be produced in a sheet form so as to incorporate the electrolyte sheet by lamination and then crosslink, the molecular weight of the TPU will be more in the range of about 20,000 to 200,000, and in some applications from about 30,000 to 70,000. If the molecular weight of the TPU is low (more in the range of about 3,000 to 20,000) then one may make liquid formulations which solidify by addition polymerization without adding any removable solvent. The latter scheme is more useful for the formation of redox coatings and will be discussed in the next section.

TPU's with even higher UV stability for use as electrolytes may also be formed using fluorinated polyols (for use as soft segments) reacted with the aliphatic isocyanates as described above. The chain extenders may be the same or these may also be fluorinated diols. Examples of commercial fluorinated polyols for soft segments include Lumiflon™ materials available as solids or in solution form from AGC Chemical Americas (Exton, PA). Lumiflon™ materials are based on low molecular weight copolymers of fluoroethylene and vinyl ether (FEVE) chemistry, where largely the fluouroethylene and vinyl ether moieties alternate.

The TPU's with unsaturated polymerizable moeities can be made in the following manner. In the first step the diisocyanate, chain extender (a diol) and the flexible diol (all monomers) are first reacted so that the TPU is formed. In this step excess diisocyanate is used so that the TPU is terminated by the isocyanate groups. Alternatively, TPU is formed first using the usual ratios of diols and diisocyanate, and then additional diisocyanate is added in a following step so that all the TPU chains are end capped with the isocyanate groups. A person skilled in the art can do these calculations to get the starting molar ratios of the monomers and order of mixing. To isocyanate terminated TPU, this is added a compound that will react with the isocyanate and provide a polymerizable unsaturation. For example, one may add either a monofunctional hydroxy or amine compound (or another type of compound with reactive proton) comprising radically polymerizable unsaturation (or unsaturated groups such as vinyl groups). Some examples of such hydroxyl compounds are polyalkylene glycol or polyester glycol mono methacrylates, polyalkylene glycol or polyester glycol mono acrylates (e.g., see Ebecryl 117 from Allenx (Alphretta, GA)). This results in a TPU terminated with unsaturated ends which are able to polymerize by addition polymerization. As a reminder typically, the reaction between an isocyanate and the reactive proton containing monomer is considered a condensation reaction or condensation polymerization, whereas when the unsaturations at the end of the TPU are opened up to polymerize that type of reaction is called addition reaction or addition polymerization. Typically in a condensation reaction, two monomers react with each other and then two of the pre-reacted monomers further react and keep growing in that fashion. Further, in most condensation reactions, small molecules that are generally volatile are formed, which are removed (e.g., water, carbon dioxide, methanol, ethanol, etc., typically materials with a boiling point less than about 120 C). Formation of urethane by reacting isocyanate and a polyol is one of the few exceptions in condensation polymerization where no volatile material or removable material is formed, but the polymer chain growth is as described above. In addition polymerization, an active end is formed which keeps adding monomers by opening of rings or unsaturations nearby and no volatile or removable material is formed.

To tailor the desired strength, stiffness, elasticity and to extend the temperature range of use to higher temperatures, the dual cure type of mechanism may be employed which eventually ends in crosslinking. To the TPUs obtained above, reactive diluents may also be added to provide more stiffness and strength so that these electrolytes can be used at higher temperatures as compared to the purely thermoplastic electrolytes. Some examples of reactive diluents are acrylates and methacrylates such as, butanediol dimethacrylate, ethoxylated pentaerythritol tetraacrylate, hexanediol dimethacrylate, hexanediol diacrylate, lauryl methacrylate, 2-phenoxyethyl methacrylate and 2-phenoxyethyl acrylate.

These electrolytic sheets are typically preformed and contain TPU with reactive ends along with plasticizers, salts, viscosity control additives, tackifiers, levelling agents, UV stabilizers, adhesion promotors, reactive diluents and other electrolytic ingredients, catalysts or initiators to promote reactions of the unsaturated groups. These formulations may be liquid at room temperature or solid (thermoplastic) depending on the amount and the molecular weight of the TPU and also the loading of the viscosity modifiers, reactive diluents and other electrolytic ingredients. As discussed earlier, the liquid formulations at room temperature are more useful for redox coatings as discussed in the next section.

Depending on the nature of the catalysts/initiators selected for addition polymerization of the unsaturations, these may be polymerized using heat (thermal polymerization) or light (photo polymerization). The thermoplastic electrolytic formulations have a solidification point (or a flow point) in a range of about 100 to 140° C. so that their films can be formed and the unsaturations are not reacted. These films can be easily transported without losing their form, and release papers may be placed between the sheets or within the roll. However, the thermal catalyst and/or initiator is so designed that during lamination they reach a higher temperature to activate the addition polymerization and cause crosslinking. Alternatively, the catalyst may be a photocatalyst which is activated during lamination processing by subjecting the laminate to appropriate radiation. The advantage of pre-formed thermoplastic electrolyte sheets, which are crosslinkable during device assembly, is their ability to withstand higher temperatures during use in the device as discussed below. As discussed later, when such polymerization is conducted, then depending on the composition of the coatings/substrate it is in contact with, this may crosslink across the interface to form covalent bonds. Another advantage of such sheets is that they may flow at a lower temperature during processing, but since they will be crosslinked later, and they can withstand higher temperatures during use without losing their solid form. Devices containing such thermoplastic sheets may flow at temperatures as low as 60° C. and as high as 170° C. for processing prior to forming the crosslinks.

Another way of preparing polymers with reactive groups is by attaching those monomers which polymerize by ring opening, such as cationic polymerization (please note that this type of cationic polymerization is also included within the category of addition polymerization). As an example, after obtaining the thermoplastic prepolymer (or a polymer) with a unreacted isocyanates as described above, these can be reacted with materials that are monofunctional with respect to the reactive protons and have terminal rings (for example, Trimethylolpropane oxetane (TMPO) available from Perstorp Holding AB (Sweden) as Curalite™OX). These rings are opened during polymerization. These may be further mixed with reactive diluents (e.g., cycloaliphatic epoxies) and chain transfer agents (polyols) and catalysts such as Lewis acids (e.g., Irgacure 270 from BASF, Germany) to create crosslinkable formulations which may be photopolymerized during lamination process. An attractive aspect of such materials is good adhesion to a variety of substrates.

Another way to use unsaturated or any other addition-type polymerizable moieties in the thermoplastic electrolytic composition is to take an approach similar to an interpenetrating network (IPN). To the electrolytic composition an acrylic, a methacrylic monomer or a ring opening polymerization or any other addition-type polymerization monomer is added as a plasticizer along with the appropriate catalyst such as a photoinitiator if this polymerization is to be activated by UV or light radiation.

For example, UVEKOL A and UVEKOL S15 from Allnex (Alpharetta, GA) are urethane acrylates which have a long wavelength UV photoinitiator already incorporated in them or the acrylates listed above. For use in aliphatic TPU matrices, it is desirable to use aliphatic urethanes terminated by acrylate (includes methacrylate groups). Some of the other exemplary urethane acrylates available from Allnex are: Ebecryl 1271, 230, 231, 284, 8405 and 8402. These may also be mixed amongst themselves and/or with lower viscosity reactive diluents to change the flow properties for processing and the properties of the final material. Some of the reactive diluents are 1,6-hexanediol diacrylate (HDDA) isobornyl acrylate (IBOA) trimethylolpropane triacrylate (TMPTA) trimethylolpropane triacrylate (TMPTA). The reactive diluents are usually added in about 0 to 50% by weight of the urethane acrylates listed above.

Typically, these materials may be present in a concentration range of about 2-25 phr by weight (parts per hundred) based on the thermoplastic polymer forming the lamination sheet. The polymerization reaction involving these groups is activated only after the electrolyte sheet is formed. In one embodiment it is activated after the polymer sheet is incorporated or being incorporated into the end-device. When the electrolyte is a polyurethane (including thermoplastic urethane) this monomer may be a urethane oligomer which is terminated at one or at both ends with an addition-type polymerizable group as discussed in previous paragraphs. The monomer may be branched and have more than two ends which are modified with these groups. In one embodiment, the urethane oligomer may be made using the same components as the thermoplastic polymer (e.g., the same aliphatic isocyanate and the polyol used for soft segments) so that it is compatible with the thermoplastic urethane, and then terminating them with the polymerizable groups. The molecular weight of this material may be any, but typically will be in a range of about 800 to 6000. Thus, when this addition polymerization is carried out, the newly formed polymer penetrates the polymer sheet it is present in. The addition polymer may form a linear, branched or a crosslinked structure. Since the original thermoplastic polymer sheet and the polymer formed by polymerizing this material penetrate each other on a molecular level and are entangled, these are termed as IPNs. As discussed in the EC electrodes and Counterelectrodes section below this type of system has many advantages, particularly when this concept is also used in the EC electrodes and the counterelectrodes along with their use in the electrolytes. Also, as discussed earlier this type of structures may also provide higher thermal stability and other property advantages.

The electrolyte sheets of this invention may also be reinforced by incorporating surface functionalized nanoparticles. The nanoparticles mainly comprise of inorganic materials such as metal oxides (including mixed metal oxides). These nanoparticles are not electronically conductive and may even be porous. Their incorporation helps in increasing the mechanical properties (increased strength and/or modulus) of the electrolyte film (or sheet) at a given temperature or increase its temperature performance where the sheet would be usable in devices at higher temperatures. Some of the oxides are of silicon, aluminum, zirconium, titanium, tantalum and mixtures containing one or more of these oxides. Since these sheets are clear, it is desirable that the size of the nanoparticles, their concentration, and their refractive index be such so that scattering of the light is minimized. For the avoidance of doubt, as used herein, the terms nanoparticles and surface modified (or surface functionalized) nanoparticles in electrolytes or sealants, additives such as fumed silica are not considered as such nanoparticles. While additives such as fumed silicas may be added to the nanoparticles and surface modified (or surface functionalized) nanoparticles to modify viscosity, thixotropicity or other properties along with the non-conductive nanoparticles (which may be surface modified), they are not considered nanoparticles and surface modified (or surface functionalized) nanoparticles. In one embodiment the desired size of the nanoparticles is less than about 100 nm, in another embodiment less than about 30 nm and in yet another embodiment greater than about 4 nm. In another embodiment, the concentration of the nanoparticles (by weight in the electrolyte sheet) is less than about 5%, in another embodiment less than about 1% and in another embodiment more than about 0.01%. In another embodiment the refractive index of the metal oxide use should be less than about 2.5 and in another embodiment the refractive index of the oxide is less than 2, yet in another embodiment less than about 1.7 and in a further embodiment RI would be greater than 1.4. As an example, one may mix several metal oxides within a nanoparticle to obtain the desired refractive index. The strength of the film with nanoparticles at a given temperature may be increased by about 10% to 500% as compared to a film without these particles. Similarly, the increase in use temperature may be raised from about 5° C. to about 50° C.

These nanoparticles are surface functionalized (which means that their surfaces are modified by attaching organic polymers or monomers so that these nanoparticles are compatible with the polymeric matrix used in the electrolyte. These functionalization agents may be chemically bonded or physically attached to the nanoparticles. Further, these functionalization agents may by physically compatible with the polymeric matrix or may have groups which react with the polymer. For example, if the matrix of the electrolyte is a polyurethane, a similar polyurethane may be used for surface modification of the particles so that the particles are compatible and easy to disperse uniformly. The molecular weight of the surface functionalization agent may be greater than about 60 in one embodiment and greater than about 200 in another embodiment and greater than about 2,000 in yet another embodiment the molecular weight of the functionalization agent is less than about 50,000. In another embodiment one may use a monomer with an isocyanate or a hydroxyl end group which could react with the polymeric matrix (i.e. with the hydroxyl group or the isocyanate of the polyurethane matrix respectively).

The nanoparticles may be added along with the other ingredients, i.e., along with the incorporation of the salt and the plasticizer, or these are added later. These nanoparticles may also be added prior to the polymerization reaction of the matrix polymer. In one embodiment all of the monomers (e.g., in case of polyurethanes—polyol, isocyanates, reaction promotion catalyst), plasticizer, the salt, UV stabilizer and the nanoparticles are added together and mixed and then the polymer is formed. Also, as disclosed above if this formulation contains the monomer for addition polymerization and the catalyst (such as photoinitiator) it is preferred that all of this is mixed in prior to polymerization i.e., the formation of polyurethane. This monomer must be compatible that is soluble in the formulation. After polymerization, the material is pelletized and formed (extruded or cast) into films or sheets. In another embodiment the nanoparticles are added to the electrolyte pellets, melt blended and then formed (extruded or cast) into sheets or films. These sheets and films are incorporated into the devices by lamination process If these sheets have monomers which react by the addition polymerization, these may be activated by temperature/pressure being used lamination process and/or by subjecting the laminated device to a radiative source (e.g., UV) depending on the type of catalyst used.

Thermoplastic block copolymers may be used for electrolytic laminatable sheets. For example, block copolymers of polyvinylidene fluoride and fluorinated ethylene propylene may also be used for this purpose. Commercial examples of such polymers are e.g. Solef 21216, Solef 5130 both available from Solvay (Thorofare, N.J.)). These polymers may be made into electrolytic sheets for lamination by incorporating compatible plasticizers, UV stabilizers and lithium salts and other additives as discussed earlier within this section.

In many devices, the temperature of the devices may exceed 85° C. during operation, and thus TPU films need to withstand temperatures higher than 90° C. during use for long periods of time (several hours). In another embodiment the use temperature of the devices may be 100° C. or higher, particularly when colored to the dark state under very bright solar conditions where the outdoor temperature is also high. A desired processing temperature during lamination is between about 120 to 200° C. Thus, the ion-conductive materials should be able to flow between these temperatures while they are being integrated into the end products such as EC devices.

An important consideration during lamination process is deareating so that bubbles are not trapped. However, at the same time the plasticizer or other additives added to the electrolyte film or to any layer (see next section on EC electrodes and counterelectrodes) should not be degassed to an extent where this process will result in bubble formation from the loss of these materials which in addition may cause unpredictable or poor performance of the device. In order to avoid and/or reduce this the vapor pressure of these additives (unless they are bound in the film) should be lower than about 1 KPa or preferably lower than 0.05 KPa during the degassing part of the lamination process, and further the time for degassing needs to be optimized. As an example, during the lamination process, once the film is placed between the two substrates the degassing under reduced pressure (e.g., may be carried out at room temperature), and then the lamination press pressure is applied to clamp down on the film prior to heating the laminate to an elevated temperature to cause a partial melt of the electrolyte film and to bond properly to the substrate. Further the laminate may be cooled by about 20-70° C. or more (dependent on material properties and flow characteristics), prior to releasing the pressure. For most part, the reduced pressure used during degassing, should preferably be higher than the vapor pressure of the additive vapor pressure. For example, electrolytes and coatings containing propylene carbonate (PC) are preferably degassed at reduced pressures of 0.005 KPa or higher at 25° C., as the vapor pressure of PC at this temperature is about 0.003 KPa (Nasirzadeh, K., et al, J. of Chemical and Engineering Data, Vol 50(1) (2005) p 26-28).

EC Dyes, Electrodes and Counterelectrodes

Both or any one of the electrodes, i.e., EC electrodes 4 or the counterelectrode 6, as shown in FIG. 1, may also comprise an electrolytic composition (i.e., ion-conductive composition) and at least one redox material. In addition, these redox layers should also have some electronic conductivity (unless the redox materials themselves provide electronic conductivity) to be able to exchange the electron with the conductive layers 3 and 7 and transport the electrons from/to the redox sites located throughout this layer. Since many UV stable organic redox materials are not electronically conductive, this property is introduced by adding inert particles which are electronically conductive. For clear windows it is preferred that these particles do not produce any haze or unobjectionable coloration. Thus at least one of their dimensions (diameter, length, width) should be less than about 100 nm, preferably less than about 20 nm. For batteries where there are no optical constraints one may use opaque graphites and other carbonaceous materials in high concentrations and/or larger sizes as long as they have the desired surface area or nanopores for the needed charge capacity. EC devices with the redox materials and the conductive particles are discussed in U.S. Pat. No. 8,593,714, published patent applications WO/2018/009645 and WO/2018/128906) and in U.S. Nonprovisional application Ser. No. 16/231,909 filed on Dec. 24, 2018, and Ser. No. 16/259,195 filed on Jan. 28, 2019; the contents of which are incorporated herein by reference in their entireties. The conductive particles should be electrochemically inert in the range of device operation, meaning these should not oxidize or reduce when the redox material in the device oxidizes or reduces. Some of these inert materials are electronically conductive metal oxides (e.g., indium-tin oxide, antimony-tin oxide) and carbon and graphite nanoparticles including carbon nanotubes, etc. When these materials are added in the layer, the metal oxide may not match the refractive index of the layer matrix and carbon nanoparticles may be dark, which may result in optical haze and reduction of optical transmission respectively. By limiting their concentration and/or their particle size, coatings with reduced or non-noticeable optical haze and high optical transparency may be obtained. However, the minimum concentration of the conductive nanoparticles should be above the percolation threshold. One may increase the concentration of the carbon particles much above the percolation threshold if devices need to be produced with lower bleached state transmission. In addition to the conductive nanoparticles the reinforcing nanoparticles (of non-conductive metal oxides, and preferably surface functionalized) as described earlier for electrolytes may also be used in this layer.

As discussed in more detail below, polymeric material used for the electrolyte may have a similar or a different composition compared to the polymer used in the redox layer. Similarities and differences are discussed in more detail below so that these layers should still be able to develop good adhesion and low resistance to the ion flow across their interfaces.

Figure 2:
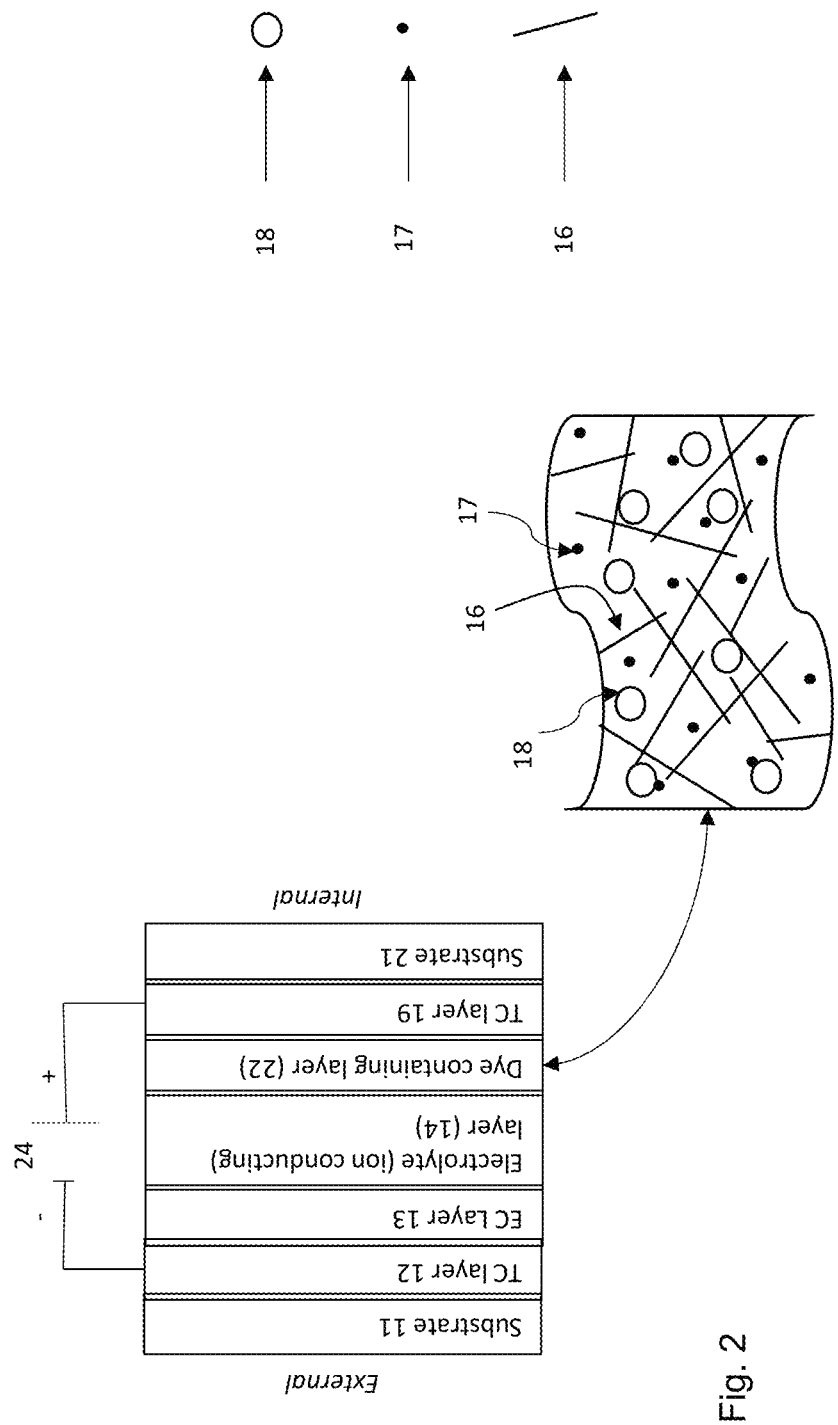
FIG. 2 illustrates a specific EC device according to some of the embodiments of the present invention.

An example of an EC device is shown in FIG. 2 where the electrochromic dye containing layer 22 is the redox counter electrode held together with a polymeric binder. This layer has redox species as a redox dye 18, lithium salt 17 dissolved in this layer and conductive particles 16. This layer is solidified using a polymeric composition, i.e., this matrix polymer acts like a binder to keep all the components together. Typically, the redox material may be present as particulates (e.g., metal oxide particles with redox and/or electrochromic properties) which have adhesion towards the matrix or molecular species (e.g., an electrochromic dye) which is covalently bound to the matrix polymer and/or to the conductive particles or some other large species within this layer so that it does not migrate out of this layer. Generally, this layer also has a plasticizer which is able to dissolve the salt (e.g., lithium salt). In one embodiment, the plasticizer should also be capable of independently dissolving the redox material, so that it and the dissolved salt are able to interact readily within this layer.

FIG. 2 schematically shows a percolated network of electronically conductive particles 16 along with the dye molecules 18. The ion-conducting layer 14 (or electrolyte layer), is proximate the dye containing layer 22. The conductive particles 16 may be nanotubes, nanorods, nanodiscs, nanoparticles of any shape and so forth. The nanoparticles have at least one dimension which is less than 100 nm. In case the redox layer is a salt, then in one embodiment the salt is added as a separate species and is soluble in the polymer and/or the plasticizer, and in another embodiment its cation is tethered to the conductive particles or to the polymer network or some other larger particles. In another embodiment the anion of the dye (if the dye is a salt) should be similar to the anion of the lithium salt. For all devices for use in window applications, where electrochromic dyes are used as redox agents, the use of bridged dyes is preferred due to their superior UV stability. Bridged dyes are discussed below.

Another type of device is shown in FIG. 5a, where two substrates 50a and 50b are coated with conductive layers 51a and 51b respectively. For a window device these substrates and the conductive coatings are transparent. A preformed electrolyte (ion-conductive) sheet is 52 which is laminated between these substrates to form the device. The electrolyte layer in addition to the other ingredients (polymer, plasticizer, salt, UV stabilizer, etc.), also contains one or more redox (reversible) species, and usually these are electrochromic dyes that change color when their oxidation state is changed. These electrolytes will include at least one anodic and one cathodic dye. This means one of the dyes when reduced at an electrode colors (cathodic, or electron accepting) and one of the dyes when oxidized at the other electrode (anodic, or electron donating) also colors. In general, several dyes are mixed to get a desired color (or absorption in visible and the near-infrared (NIR) range) as dyes typically have a narrow absorption range. These mixtures could be one cathodic and more than one anodic, or several cathodic and one anodic or several of both kinds. To get a good electrochromic coverage in the entire visible range, a number of dyes are used that darken at different wavelengths, from a practical perspective about three to five electrochromic dyes are sufficient if they are selected properly. Thus, to obtain more accurate colors at least three dyes are contained in the electrolyte or at least two dyes in an electrolyte for a device where the electrolyte with EC dyes contacts an EC coating. In some cases, one or more of these dyes may be attached to the polymer. In one embodiment these redox species are bridged dyes that is a dye having a group that has anodic EC properties and a group that has cathodic EC properties, i.e. two dyes with different EC properties within a single molecule. Bridged and non-bridged compounds may be present in the same electrolyte. This is counted as two dyes if one keeps a count of the number of anodic and cathodic dyes present in an electrolyte. The bridged dyes could have several types of anodic or cathodic groups tied together or have a combination of anodic and cathodic structures in the same molecule. For example, covalently bonded molecular combinations of ferrocene-viologen, phenazine-viologen and phenothiazine-viologen, phenothiazine-anthraquinone, phenothiazine-cyano acrylic acid, thiophene-viologen, phenazine 1-phenazine 2, etc. In these bridged dye examples, viologen part is cathodic and the other parts are anodic. Published PCT application WO/2018/128906, U.S. Pat. Nos. 6,767,481; 6,519,072; 6,560,004 and 6,816,298 for more examples of these dyes and these publications are incorporated herein by reference in their entireties). The bridged dyes may have ionic character or may not have ionic character. Ionic character means that the dye has cationic or anionic group in the molecule which is charge compensated by anion(s) or cation(s) respectively. As an example, the dye may have a viologen based cathodic dye (bipyridial cation) which is charge balanced by an electrochemically stable anion (see examples of such anions in this document where Li salts with such anions are discussed).

These dyes may be free to move in the electrolyte layer of FIG. 5a, and when voltage is applied across the two conductive layers then these migrate to the respective electrodes and oxidize and reduce. These dyes may also be attached to the polymer matrix of the electrolyte. However, it is preferred if at least one dye is not attached to the polymer and is able to move within the electrolyte layer. Incorporation of redox and/or dye species in the electrolyte layer imparts both electrolytic properties and electrochromic properties in a single laminatable layer. As described below these dyes may have reactive groups (e.g., hydroxyl) which may be attached to isocyanate monomers if used for forming the polymer matrix. The total concentration of the dyes is typically in a range of about 0.01 to 2 M, based on the plasticizer concentration. When the bridged dyes with anions and salts (including ionic liquids) are present, then in one embodiment their anions may be the same as the anions of the other salts present in the electrolytic layer.

Since the electrochromic activity kinetics in dye containing electrolytes is dependent on the ease of the dye movement in the electrolyte layer (for the dye(s) that are not attached covalently to the matrix), it is important that at least one of the mobile dyes have a molecular weight of less than about 500.

FIGS. 5a and 5b schematically also represent a type of device, where the electrolyte is introduced into an empty cavity formed by the two substrates with conductive coating and sealed at the perimeter. The electrolyte is introduced as a liquid containing a solvent in which are dissolved are the EC dyes (e.g., anodic and cathodic dyes), UV stabilizers and other ingredients such as monomers, polymerization catalysts and polymers, etc. This electrolyte is introduced through a hole in the substrate or the sealant which is then plugged. The monomers if present may be polymerized after filling. When mirrors are made using this method, one of the conductive coatings also has reflective properties or a reflective coating is placed on the outside surface of one of the substrates (not shown).

Figure 14:
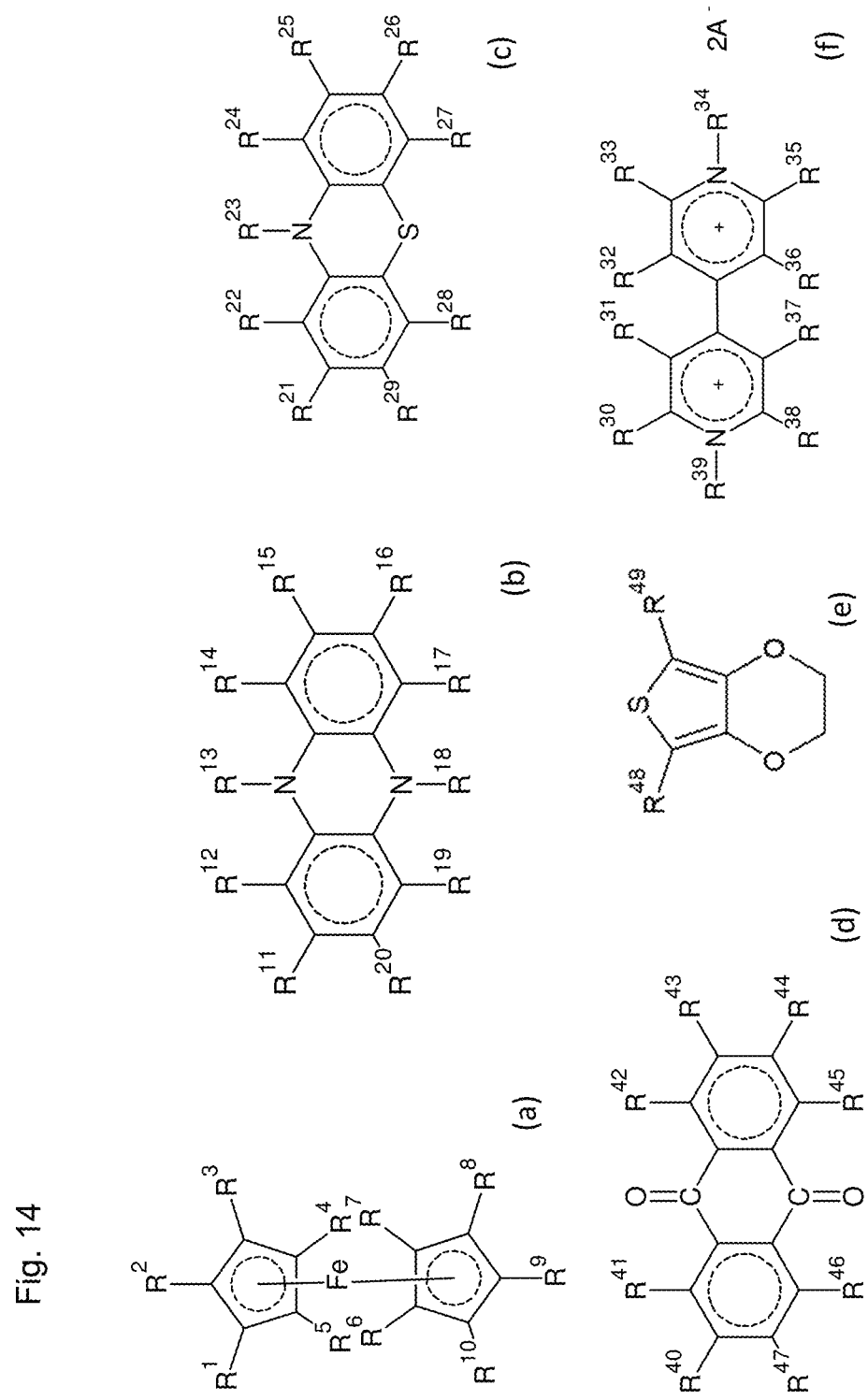
FIG. 14 shows chemical structures of select EC dyes.

FIG. 14 shows structures (a)-(f) of some of the dye structures which may be used in these devices. As discussed, the wavelength at which absorbance A=1 is noted will have to be adjusted for the background absorption if it is high to arrive at an equivalent of A=1. FIG. 14 (structure a) shows a ferrocene-based EC dye which is anodic (or a redox species). Substituents $R^1$ through $R^{10}$, may be same or different. For stabilizing the ferrocenes against temperature and UV, particularly its cation in the oxidized state at least one of the hydrogens in each of the two cyclopentadiene rings is substituted by an electron donating group. In another embodiment this could be at least two of the hydrogens in each of the cyclopentadiene rings. In another embodiment all of substituents from $R^1$ to $R^{10}$ may be substituted. Some examples of electron donators in one embodiment are alkyls including linear and branched alkyls. In another embodiment, some examples of specific alkyl electron donating groups are methyl, isopropyl, tertiary butyl, neopentyl. Some specific ferrocenes with such substituents are decamethyl ferrocene, where all of these ($R^1$ through $R^{10}$) are substituted by a methyl group, 1,1',3,3' tetratertiarybutyl ferrocene where $R^1$, $R^3$, $R^8$ and $R^{10}$ are substituted with tertiary butyl group. One or more of the groups ($R^1$ to $R^{10}$) may be substituted with groups that may bridge the ferrocene dye with other moieties such as viologens to form bridged anodic/cathodic dye structures, to other groups to impart specific functionalities such as attachment of reactive groups to attach to polymeric matrices (e.g., acrylate groups), salts or other structures to increase solubility in specific solvents, etc. The substituents in the above embodiments have a small change in the optical absorption of these molecules in the visible range when they are oxidized, but they do impact the redox potential and solubility as mentioned above. As discussed later, sometimes certain types of dyes/redox materials are added in their oxidized states as a reversible oxidizers, a class of which are ferrocenium analogs of the above structures.

FIG. 14 (structure b) shows a structure of a phenazine EC dye which is also anodic. In one embodiment, $R^{13}$ or $R^{18}$ are selected from alkyls branched or straight chain (some examples are methyl, ethyl, propyl, butyl, isopropyl, tertiarybutyl, 2ethyl hexyl, 2 ethyl butyl, 2butyl hexyl and neopentyl) to stabilize the oxidized ion. Typically, these alkyl groups have 1 to 20 carbon atoms. One of these alkyls, e.g., butyl, hexyl, etc, may be used as a bridge to attach to cathodic dyes such as viologen or attached to a reactive group or a salt like structure to attain the purposes discussed above for ferrocenes. When alkyls are used as bridges in one embodiment the number of carbon atoms in the bridge are 2 to 8. The substituents $R^{12}$, $R^{11}$, $R^{20}$, $R^{19}$, $R^{14}$, $R^{15}$, $R^{16}$ and $R^{17}$ are hydrogen or other groups with electron withdrawing or electron donating properties. These impact the color of the dyes in the bleached state and also the color of these dyes in the oxidized or the colored state. Further, the substitution (other than hydrogen) is generally made on $R^{11}$, $R^{20}$, $R^{15}$ and $R^{16}$. Some of the electron withdrawing groups of interest are cyano (—CN), F and fluorinated alkyls linear or branched (e.g., —$CF_3$, $CHF_2$, and $CH_2F$), and in an embodiment the electron donating groups are alkyls including linear and branched alkyls and alkoxy groups (generally containing 1 to 20 carbon atoms). Some examples of specific alkyl electron donating groups in an embodiment are methyl, isopropyl, tertiary butyl, neopentyl, and for alkoxy these are methoxy and ethoxy. The placement of these substituents and their intensity of electron withdrawing and donating character influences the color (or optical absorption characteristics) of these dyes in the colored state and in the bleached (neutral) state. These are selected so that the neutral state is not colored in the visible region (400 to 700 nm) or has low coloration. These substituents also have influence over solubility in the electrolytic medium and the redox potential, both of which are important for selection in the device. The redox potential is selected so that all of the EC dyes present in the medium provide the desired electrochromic activity at the EC device powering potential. Thus, tailoring of the color of the dye in the colored state by using various substitutions and their positions allows a number of these to be used in the same device so that the color of the device itself can be selected as desired.

FIG. 14 (structure c) shows a phenothiazine EC dye which also gives anodic coloration. $R^{23}$ has similar substituents as for $R^{13}$ for phenazines disclosed above. The substituents $R^{22}$, $R^{21}$, $R^{29}$, $R^{28}$, $R^{24}$, $R^{25}$, $R^{26}$, $R^{27}$ are selected respectively in the same way as explained above for the following substituents for phenazine $R^{17}R^{12}$, $R^{11}$, $R^{20}$, $R^{19}$, $R^{14}$, $R^{15}$, $R^{16}$ and $R^{22}$.

FIG. 14 (structure d) shows an anthraquinone molecule that may be used as a cathodic compound. $R^{41}$ to $R^{47}$ are substituents that may be changed as discussed earlier which have electron donating or electron withdrawing properties to change both their color and the redox potential.

FIG. 14 (structure e) shows a thiophene molecule that may be configured as cathodic or anodic compounds. In one embodiment $R^{49}$ is an alkyl group as discussed earlier having 1 to 20 carbon atoms and may be branched or linear as discussed for phenazines. In addition, this may also be used a s bridge to link another electrochromic molecule or an energy receptor to from a donor acceptor compound using an alkyl bridge with 2 to 8 carbon atoms. $R^{48}$ may be to a phenyl group which may have further substitutions. For example, electron donating or electron accepting groups may be attached to one or more of the 3, 4 and 5 positions of the phenyl group. The various, electron donating and accepting groups are the same which are discussed above to change their redox potential and their color.

FIG. 14 (structure f) shows a viologen molecule which colors cathodically. $R^{38}$ and $R^{39}$ are typically selected from alkyls as discussed above. These alkyls may be linear or branched and selected from the same set that has been discussed earlier for phenazines. Similarly, one of these may also be used as an alkyl with C2 to C8 to form a bridge to an anodic compound or an energy receptor to form a donor acceptor compound. $R^{32}$ to $R^{35}$ and $R^{33}$ to $R^{38}$ may be also selected from hydrogen, alkyl and aryl groups, or attached to the energy receptors.

The EC devices employing electrolytic compositions with electrochromic dyes, will have low mobility in the electrolyte due to high solids content, this impacts the coloration and the bleaching, kinetics, but impacts the latter more significantly. This can be addressed by the addition of reversible oxidizers, which demonstrate only a low degree of coloration in going through different oxidation states. These are typically included in molar concentrations that are about 5 to 100 times less than the molar concentration of the EC dyes that are added typically in their neutral states. One example of this are ferrocenium salts (e.g., ferrocenium cations with anions such as triflate ($CF_3SO_3^-$), imide ($N(CF_3SO_2)_2^-$), beti (($C_2F_5SO_2)_2N^-$), methide ($CF_3SO_2)_3C^-$), tetrafluoroborate ($BF_4^-$), hexaflourophosphate ($PF_6^-$), hexafluoroantimonate ($SbF_6^-$), bis(fluorosulfonyl)imide ($N(FSO_2)_2^-$), hexafluoroarsenate ($AsF^-$) and perchlorate ($ClO_4^-$)). The dicyclopentadiene rings may have electron donating substituents as mentioned earlier for ferrocenes, such as decamethylferrocenium, tetratertiarybutyl ferrocenium, etc. Some other examples of reversible oxidizers are found in U.S. Pat. No. 6,266,177 which is included herein by reference. In one embodiment the anions used in these materials, or any EC dyes added (e.g., viologen salts), ionic liquids or other salts are the same while in other embodiments different anions may be used.

As discussed in more detail below, in one embodiment the plasticizer type and the salt type (even if the plasticizers and salts are mixture of several components) should be the same in the polymeric redox layer and in the electrolyte layer (e.g., in respective layers 22 and 14 in FIG. 2). This reduces the tendency for migration of these components from one layer to the other.

It is important that the salt and the plasticizer type in the electrolyte layer (layers 5 and 14 of FIGS. 1 and 2 respectively) and the redox layers (e.g., layers 6 and 22 in FIGS. 1 and 2 respectively) be the same. In addition, in one embodiment, these should be present in a quantity so that when these are in contact within the device, there is little tendency for these ingredients to migrate from one layer to the other and starve one of these layers of these ingredients and reduce the layer performance. In general, since the electrolyte layer is thicker this may have a larger impact on changing the concentration of these ingredients in the redox layer. In one embodiment, the plasticizer content in both layers should be such so that when these are put in contact with each other, a natural equilibrium is maintained so that there is no net migration of the plasticizer from one layer to the other. In addition, in another embodiment, when the polymeric compositions between the two layers are similar, the molar concentration of the salt based on the plasticizer in each layer should be about the same, so that salt concentration also remains in an equilibrium between these two contacting layers. In case UV stabilizers soluble in the plasticizers are added, then it is desirable that these are still present in the layers in an effective concentration after lamination. If these are added both in the electrolyte and in the redox layers, then in one embodiment their type and concentrations based on the plasticizer content would be similar in these layers.

The electrolyte layer 14 has to have good adhesion with the EC layer 13 and the Dye layer (i.e., the redox layer) 22 (e.g., in FIG. 2) or the conductive surface (see FIG. 5a). In some embodiments, the EC layer comprises only of an inorganic electrochromic metal oxide or a mixture of various metal oxides, such as tungsten oxide or tungsten oxide containing lithium oxide and/or also containing nickel and vanadium oxides, etc. In such cases the electrolytic layer should have a high tackiness towards such layers and may have materials to promote good adhesion with metal oxides that are stable under the electrochemical performance range of the device and also stable towards UV and heat. In some cases, there may be an additional ion-conductive layer (not shown in FIG. 2) between the electrode 13 and the electrolyte layer 14 to promote one or several of the following features as long as it conducts the ions from the electrolyte to the EC layer. This layer may serve one or more of these several purposes, it may have better adhesion to both the EC layer and the electrolyte layer, lower ionic resistance at the interface and prevent undesirable reactions caused by UV radiation between the semiconductor metal oxide (EC oxide layer) and the electrolyte interface. This layer having lithium ion conductive properties is discussed extensively in the references listed earlier in this section.

In another embodiment the EC layer 13 may also comprise a polymeric electrolytic type of composition with a redox material and electronically conductive particles as is layer 22. In one embodiment, the polymer binder used in layers 13 and 22 should be compatible or be the same. The EC layer 13 would then have an EC dye that is complementary to the dye used in layer 22.

The electrolyte may comprise a thermoplastic polyurethane (TPU), and the polymer in the dye (or redox) containing layers may be a TPU or a crosslinked polyurethane. In order to provide similarity and good adhesion to all these layers, in one embodiment the chemistry of the plasticizer compatible polyol used in the soft segment of the electrolyte layer TPU should be the same or similar to the chemistry of one of the polyols used in the dye (redox) containing layer(s).

Similarity of polyol chemistry means that these polyols and the plasticizer (or in plasticizer with salt dissolved in it) in the unpolymerized state should be miscible. They could be chemically identical with the same molecular weight, or more generally compatible. In one embodiment compatible means that the polyols should be completely miscible with one another. In another embodiment the polyols should be completely miscible with the plasticizer and/or the plasticizer salt solution selected for the system. In yet another embodiment, the polyols in the plasticizer should have their solubilities within a factor of three (by weight) of each other, i.e., if one polyol has a solubility of 300 g of polyol/liter of plasticizer, then the other polyol should have a solubility between 100 to 900 g/liter of the plasticizer. In another embodiment compatibility means that the polyols should have their solubilities in the plasticizer or the plasticizer containing salt within a factor of 1.1 by weight of each other.

The dye containing redox layer may use an isocyanate with a functionality greater than two, preferably greater than 2.5 and more preferably greater than three and use a proton reactive monomer material compatible with the one used in the electrolyte. In a preferred embodiment the same diol as used as the one used for the soft segment in the electrolyte TPU layer. This layer after coating deposition would crosslink and form a solid. Some examples of aliphatic isocyanates with a functionality greater than three are available from Covestro Inc (Pittsburgh, PA) under the tradename Desmodour N.

The use of urethane chemistry (or in general use of isocyanates reacted with proton reactive compounds) for redox layer is highly versatile and can be adopted so that it is compatible with electrolyte chemistry. When electrolytes using fluorinated polymers are used in the devices, the active layer may also be made with such materials so that the compatibility (including adhesion) between the redox layer and the electrolyte is good. In this situation, fluorinated polyol for soft segment may be used (as a replacement for all or part of the regular hydrocarbon polyol in the formulation) for the dye containing redox layer in order to provide better compatibility with the electrolyte layer. Examples of commercial fluorinated polyols include Lumiflon™ materials. For solvent free coatings, solid polyols may be dissolved in a desired plasticizer or another polyol (e.g., chain extender which may or may not be fluorinated) and then the CNTs and other ingredients are incorporated.

A crosslinked redox layer with dye (redox agent) bonded to the polymeric matrix may be prepared as discussed below. The redox materials are synthesized with reactive proton groups (e.g., hydroxyl groups). This innovation is illustrated throughout on using those molecular redox agents (e.g., bridged dyes) which have only a monofunctional reactive group, however, that is not necessary, and redox agents with multiple reactive groups may also be used. When redox activity in the layer is provided by redox particles (e.g., of inorganic materials such as metal oxide, such as tungsten oxide nanoparticles) these may be surface functionalized (chemically reacted or physically attached) with compounds having pending reactive proton reactive groups such as hydroxyl groups.

In one embodiment the hydroxyl groups of the redox material (dye or other materials) is first reacted with the isocyanate that is then used for further polymerization for the formation of the polymeric network. In one embodiment the molar ratio of the isocyanate groups to the reactive hydroxy groups on the redox material should be selected so that after the reaction with the dye, the remaining (unreacted isocyanate groups) functionality of the isocyanate is still equal or greater than 2. When functionality of the isocyanate is 2, only linear polymer is formed, unless a polyol with a functionality of greater than 2 is used. In other embodiments this residual functionality of the isocyanates is greater than 2.5 and 3 respectively. This ensures that there are enough residual isocyanate groups which can still effectively participate in the urethane network formation. This pre-reacted isocyanate may be optionally mixed with unreacted isocyanate, and in that case the functionality can be calculated as a molar average, i.e., by using the following formula: $(M2*F2+M1*F1)/(M1+M2)$ where M2 are the moles of reacted isocyanate molecules and F2 is the residual (unreacted) isocyanate functionality of the reacted isocyanate, M1 are the moles of unreacted isocyanate molecules and F1 is the functionality of the unreacted isocyanate. This is then mixed with the polyol to make a coating formulation which is coated on the substrate and cured.

More specifically, a method to accomplish the above task to make a complete formulation for the redox layer with covalently attached redox species may be carried out as following:

(a) Mixture A is prepared by dissolving/mixing the lithium salt, ingredients such as UV stabilizers, adhesion promoting agents, flame retardants, colorants and solvents if used, etc., in the plasticizer (b) Mixture B is prepared by mixing the isocyanate with the reactive dye and a reaction catalyst. The catalyst to promote the reaction between the isocyanate and the reactive group is added, this may be an organometallic catalyst such as dibutyltin dilaurate, or tin free catalysts such as K-KAT XK-614, K-KAT XK-604 from King Industries (Norwalk, CT). This mixture is reacted, if necessary heat may be used to promote this reaction. Even after the reaction a number of isocyanate groups are left which have not reacted as discussed earlier.

(c) Mixture C: Dispersing conductive nanoparticles in polyol (d) Mixing the above components "A" and "C" and then adding component "B" to make the coating formulation.

To this viscosity control additive if used is also mixed with component A or is added to the final mixture, such as hydrophobic fumed silica as mentioned earlier. The coating formulation is deposited and cured. Curing is carried out in dry conditions and preferably under a blanket of inert gas (such as nitrogen, argon) at elevated temperature to speed up the process. Several modifications to this method and mixture sequences may be implemented.

As discussed for the electrolytic layer, the coating may also be modified so that it has groups and materials which can be polymerized or cured by radiation (e.g., microwave or optical radiation such as UV, visible light or IR radiation). If the purpose of the microwave and the IR radiation is only to increase the temperature, then the chemistry described in the earlier paragraph may be used and one may add additives which will absorb or increase the susceptibility for the desired infrared or the microwave wavelength more effectively. For photocuring, using UV or other optical or gamma radiation, the formulation may be modified so that first a compound or a non-crosslinked prepolymer is made by reacting the dye and the isocyanate where these compounds still have unreacted isocyanate groups. The isocyanate groups in the prepolymer are reacted with another compound which has both reactive protons and has a group with polymerizable unsaturation or rings which could be opened. Examples of such compounds with reactive proton hydroxy groups with unsaturations and polymerizable rings were discussed in the earlier section (e.g., glycol mono methacrylates and trimethylolpropane oxetane). To tailor the desired strength, stiffness, elasticity, extend the temperature range of use to higher temperatures and a reaction rate one may also optionally add reactive diluents to the above mixture as also discussed earlier. An advantage of photocuring is rapid processing speeds. When polymerizable rings are used, then as chain transfer agents dendrimer type polyols may be used for providing superior processability, viscosity management and properties of cured coatings. For example, dendritic polyols with different functionalities are also available from Perstrop under the tradename of Boltorn™.

For example, the dyes may be made with a reactive end such as an acrylic or a methacrylic end which may be cured into the matrix. As an example, UVEKOL™ and Ebecryl™ materials and reactive diluents discussed in the previous section may be used as the main polymer into which the conductive particles are dispersed. These are then mixed with the non-reactive plasticizers, salts, UV stabilizers, dyes with the reactive ends and appropriate photoinitiator (UVEKOL materials already come packaged with a photoinitiator) and then deposited on a the desired substrate and polymerized to form this layer.

In yet another novel approach, one may covalently bond the electrolyte layer to the redox containing layer. For example, the electrolytic TPU is made into a solid film which could be laminated but also has incorporated into its structure polymerizable groups (unsaturated groups or groups which polymerize cationically by ring opening) along with a catalyst (thermal or photocuring). Also, the redox layer is processed and solidified by polymerizing the isocyanate/polyol groups, however, the redox formulation also has polymerizable unsaturated groups along with a catalyst. This is similar in concept to B staging or by partial curing where only part of the system has polymerized. Once the device is assembled, i.e., the redox coatings are deposited and partially cured, and the partially cured electrolyte is laminated, the whole assembly is either subjected to a higher temperature or to photonic radiation (e.g., UV or light) where the polymerization of the unsaturated groups is initiated at the same time in all the layers. It is expected that monomers in each of the layers will polymerize providing additional strength and/or temperature resistance to these layers but also the monomers at the interface of the layers will polymerize and form covalent bonds linking the layers (i.e., the electrolyte layer and the redox layers). In order to promote interlayer polymerization the same monomers may be used in both layers or they may have a high reactivity with each other.

The above shows how the use of multiple polymerization mechanisms in a system may be used to first create the polymers in each of the layers (redox and the electrolyte layers) and then another polymerization system to create the bonds between different layers during device assembly. The multiple polymerization illustrated above involves a condensation (urethane formation) and an addition processes (ring opening or polymerization of a vinyl group), but one may use any two types of polymerization methods, e.g., both may even be condensation but involve different isocyanate/reactive proton reactions which may require different temperatures and perhaps different catalysts.

Another way to use unsaturated or any other addition-type polymerizable moieties in the coating composition is to take an approach similar to an interpenetrating network (IPN) as discussed earlier for the electrolytes. To a coating composition which could be solidified by removal of a solvent or thermally polymerized (first polymerization), an acrylic or a methacrylic monomer or any other addition-type polymerization monomer is added along with an appropriate catalyst, a photoinitiator if this reaction is to be carried out by radiation, such as UV. The polymerization reaction (second polymerization) involving these groups is activated only after the coating is deposited and the first polymerization has been done. In one embodiment second polymerization is activated after the coating is incorporated or being incorporated into the end-device. For example if the end device is made by laminating an electrolyte sheet, the second polymerization of these groups is activated after this step or during lamination. The coating may comprise of a thermally cured urethane formed by first polymerization and this monomer may be a urethane oligomer which has addition-type polymerizable group(s). In one embodiment, this urethane oligomer may be made using the same components as the coating polymer formed by first polymerization. For example, the same aliphatic isocyanate and/or the polyol used in first polymerization may also be used here. As a specific example this polyol may be taken and its ends are modified with the polymerizable groups so that it is compatible with the thermally cured urethane formed by first polymerization and does not phase separate. In any case the monomer for addition polymerization must be soluble with the other ingredients of the coating formulation prior to the coating formation. The molecular weight of this material may be any, but typically will be in a range of about 800 to 6000. Thus when this polymerization is carried out, the structure of the polymer in the thermally cured urethane (first polymerization) is penetrated by the polymer formed by addition polymerization (second polymerization). Since the original thermally cured polymer (or dried after removing the solvent) and the polymer formed by this polymerization penetrate or permeate each other on a molecular level and are entangled, these are termed as IPNs. Examples of the type of photopolymerized urethane acrylates and the reactive diluents if used are the same as provided in the electrolyte section (see for example, the products from Allnex). These may also be used in the a weight proportion of about 2 to 25 phr of the coating resin formed by first polymerization. This type of system has many advantages, particularly when this concept is also used in the electrolytes. In one embodiment the same monomer (or combinations) for second polymerization is used in both so that when the second polymerization is carried out in an assembled device, the network formed is across the interface of the electrolyte and the coating resulting in a high adhesion or a molecular stich across this interface. That is the redox layer has a composition (first composition) different from the composition of the electrolyte layer (second composition), however they are bonded together covalently by a polymeric material which permeates both of these layers, and in one embodiment this polymeric material is crosslinked (or is a network). In another embodiment this polymer is formed after the redox layer and the electrolyte layer have been formed and are in contact with each other. In yet another embodiment this polymer is formed by radiation polymerization (e.g., photo or UV initiated polymerization). This type of formation of interlayer covalent bonds may be used in devices where an electrolyte layer is embedded between or laminated between two adjacent redox layers, and all of the three layers are then stitched by forming this type of polymer network. The redox coating formulation may also have silanes with acrylic/methacrylic groups which may also polymerize with this network and also form a bond to the oxide based transparent conductor on which such coatings are deposited.

Multilayer Films and their Use

The polymerization mechanisms to crosslink thermoplastic polymers as described above may be used to another great advantage as will be discussed to process devices shown in FIG. 3. This figure illustrates EC devices according to some embodiments containing multilayer electrolytic compositions. This EC device has two opposing substrates 30a and 30b, which are respectively coated with TC layer 31a, 31b. In this case a pre-formed multilayer electrolyte film has three layers 32a, 32b, 32c. The layers 32a and 32c have redox materials incorporated, where at least one of these redox materials has electrochromic properties. For example, if layer 32a has cathodic EC dye then layer 32c will have an anodic material, which may also have complementary EC properties. Multilayer electrolytes may also comprise of two layers, where one of the redox layers, i.e., the EC layer or the counterelectrode is deposited on the substrate as explained in the earlier sections, and the remaining redox layer is formed as a layer on the electrolyte film. The redox layer (e.g., a bridged dye) on the electrolyte film may have both anodic and cathodic properties as discussed earlier, but if the layer 32c is cathodic then only anodic part of the dye will be active. In one embodiment, use of bridged dyes is superior because of their enhanced UV stability.

As used herein, the phrase "complementary electrochromic properties" that it is desirable for an electrochromic device to include two electrochromic materials, with "complementary" electrochromic and electrochemical properties: That is, the first electrochromic material should undergo a colorless to colored transition oxidatively, while the second electrochromic material should undergo the same color transition reductively. Furthermore, the materials are electrochemically complementary so that one provides for a source and a sink of electrons within the same system, so that electrolytic decomposition of the solvent or the supporting electrolyte is prevented. In this way, one realizes double the optical effect per electron transferred, since two materials change color to a more highly colored (darker) state simultaneously. This "complementary counterelectrode" technology is, accordingly, the approach of choice. Preferred complementary electrodes are those which transition to the colored in different optical regions (i.e., have different colors or show color absorption peaks at different optical wavelengths which differ by at least 100 nm in one embodiment and by 200 nm in another embodiment. U.S. Pat. No. 5,189,549, is incorporated herein by reference.

Continuing with FIG. 3, the central layer 32b does not have redox materials. The dyes or the electrochromic materials in the layers 32a and 32c are immobilized to reduce or eliminate their migration into layer 32b. In a system embodiment layers 32a and 32c contain conductive particles in a percolated concentration or higher.

The device (FIG. 3) is made by laminating the multilayer electrolyte and sealing the perimeter 36. The device is connected electrically by connecting electrical leads at the transparent conductor exposed at the perimeter as shown by 35ab and 35bb.

In one method, the multilayer film may be made using coextrusion, where all three layers are extruded simultaneously (e.g., see U.S. Pat. No. 8,115,984). The two outer layers comprise of the redox material and the conductive particles, where all three are made essentially using largely the same polymer (e.g., TPU which means using the same polyol monomers for the soft segments, even the hard segments) and the same plasticizer and the salt which may be present in similar concentrations. The isocyanate may be the same, but in the redox layers there is an added reactive component to ensure that the redox species is part of the polymeric network. However, in preparation of the polymer for the outer layers an additional diisocyanate is introduced which already has an attached redox agent. This type of diisocyanate is prepared by first taking an isocyanate with a functionality greater than 2, but any functionalities in excess of two are first pre-reacted with the dye (or the redox agent). Incorporation of this type of isocyanate-redox compound allows the redox material to be a part of the polymer so that it is covalently attached to the matrix.

In a further refinement, the dye and a diol are reacted to yield a modified diol as discussed below. Modified diol is prepared for example by reacting a dye with an isocyanate. However, after the reaction the dye reacted isocyanate molecule has a residual functionality of two. One mole of dye reacted isocyanate is then reacted with two moles of soft segment forming diol. So that a pre-polymer is formed where the dye will be in association with the soft segment of the final polymer. This allows dye to be predominantly in contact with the plasticizer and the salt. This modified diol along with any additional diols (the chain extender and additional soft segment diol if needed) is then reacted with the standard diisocyanate to form the TPU for this layer. As discussed in the electrolyte section, ionomers may be incorporated in hard segments wherein the latter provide increased thermal stability for continuous use.

In another variation the redox agents are synthesized with monofunctional isocyanate groups rather than the hydroxyl groups. In this case these may be reacted with a polyol with a functionality greater than two so that any hydroxyl functionalities in excess of two are reacted, which will then yield a diol which can then be incorporated in a TPU formulation by reacting with a diisocyanate and a chain extender.

All the TPUs in all the three layers (or the two layers, as the case may be) are further modified as explained in the earlier section to have polymerizable groups (such as unsaturations and ring opening groups). These may also be mixed with additional reactive diluents as discussed earlier. All these polymers are thermoplastics and may be extruded as a trilayer film as discussed above comprising layers 32a, 32b and 32c. As this film is incorporated in the device by lamination with the substrates with conductive coatings, the addition polymerization scheme is triggered (see previous section) so that superior covalent bonding occurs between the three layers and to the conductive coating on the substrates.

Perimeter Adhesives

Devices where a pre-formed film of an electrolyte is laminated between the substrates such as shown in FIG. 3 or shown as in FIG. 4 result in devices with a layer structure as shown in FIGS. 1 and 2. FIG. 5a also shows an EC device where the redox species are incorporated in the electrolyte layer. It is also essential that these devices are sealed at the perimeter so that the ambient elements such as moisture and oxygen in air does not interact with the redox electrodes and the electrolytes, i.e., these elements are sealed and protected from moisture and air/oxygen. The sealants are not shown in FIGS. 1 and 2, but it is intended that all such devices will be sealed at the perimeter, and the substrates protecting them in the planar regions.

The seal in FIG. 3 is shown as 36a and 36b, which is the same seal going all around the perimeter. In FIG. 4, the seal in the laminated device is shown as 49. FIG. 4 shows how to form the devices shown in FIGS. 1 and 2. The substrates 41 and 45 are coated respectively with conductive layers 42 and 46. For transparent window devices these are transparent conductors. Layer 43 is the EC layer and layer 47 is the counterelectrode where these are brought together by sandwiching the electrolyte 44. The edge busbars are 48a and 48b, to which the electrical connections are made. These busbars are only shown along one edge, but they may also be placed around the complete perimeter. These busbars are slightly or fully covered by the sealants in the encapsulated device after lamination. When conductive tapes are used as these busbars, they may extend past the substrate edge to which electrical connections could be made. The sealant also may be extended to the very edge of the substrates and flow and fill-in any voids between the busbar and the opposing substrate. In FIG. 3, perimeter busbars are not shown for simplicity, however, busbars are very important in devices to ensure fast kinetics (coloration and bleach speeds) and also to keep the optical change uniform while changing. In FIG. 5*a*, the perimeter seals are shown as 56*a* to encapsulate the electrolyte from the edges. The busbars are attached to the conductive coatings on the substrates at 55*ab* and 55*bb*.

Busbars are conductors with low electrical resistance, made of conductive metal tapes, conductive metal containing frits (e.g., silver frits) and conductive adhesives with a surface conductivity of about 100 times or more as compared to the transparent conductors used. Typically, the surface resistance of the transparent conductors is in the range of about 1 to 50 ohms/square, and these busbars are in the range of about 0.00001 to 0.01 ohms/square to ensure minimum potential drop in them as they carry the current to the device. In order to assemble the device shown in FIG. 3 or 4, prior to lamination, busbars are placed on the perimeter of the substrates. These may be metallic tapes (e.g., Type 3007, 3011 from 3M company located in St. Paul, MN), conductive adhesives or silver frits (e.g., see Raj et al, Johnson Matthey Technol. Rev., 2017, 61, (2), 156). If tapes are used, these tapes have conductive adhesives so that current from the copper tape is transferred to the transparent conductor through the conductive adhesive. In the final device, the thickness of the electrolyte exceeds the thickness of the tape/busbar so that there is no hindrance in lamination or possibility of forming an electrical short between the two substrates. The busbar is spatially separated from the redox layers and the electrolyte by the perimeter adhesive. The perimeter adhesive may be squeezed and may also overlap the busbar completely or partially to provide additional electrical insulation so that there is reduced risk of developing a short between the two substrates. An insulating coating or a layer may be placed on top of the busbars to avoid any shorts with the opposing substrate, or the TC layer is removed from the opposing substrate.

For EC devices, the redox coatings are removed or not deposited in the perimeter region of the window area in a width of typically about 1 to 3 cm from the substrate edge. This region is used both for the perimeter sealant and the busbar. The busbars are located within this region close to the substrate edge either all around the perimeter or along at least one edge of the substrates (usually along the longer edge). The width of the busbar is about 0.2 to 1.5 cm and do not touch the redox layers or the electrolyte. This width along with the sealant has to be accommodated within the perimeter region (typically about 1 to 3 cm) designated for these components. Depending on the materials and the types of busbars used, their thickness varies between about 10 to 150 µm. An advantage of placing the busbar along one edge of the substrate or around the partial perimeter is that the busbars are not lined up on top of each other. This allows thicker busbars to be used (which provides higher conductivity), and if needed their width could be decreased to make the edge slimmer. Busbars placed all around the perimeter of the device have an advantage of applying power from all four sides of the window which increases the speed of transition (coloring and bleach speeds), however, since the busbars at the perimeter will stack up, their thickness combined should be lower than the electrolyte thickness. Further either the perimeter sealant or another non-conductive coating or a material needs to separate the two to avoid electrical shorts. To further increase the speed of transition internal busbars may also be used as described in U.S. Pat. No. 6,317,248, however that increases the cost of device fabrication.

To prepare the devices, the substrates are first coated with a TC. Depending on the materials used the edge busbar is applied prior to the redox (or EC) coating deposition or after these coatings are deposited. However, either the perimeter region where the busbar and the perimeter seal would be present, is either masked prior to the deposition of redox coatings or the coating process only coats the desired area avoiding this perimeter region or the coating is removed from this region after deposition. The electrolytic sheet is cut and placed on top of the redox layer of one of the substrates and its size is slightly smaller than the area occupied by the redox layer to allow for its expansion when squeeze pressure is applied during lamination so as to cover the entire redox coating area or leave a small perimeter region (like a ring) of the redox material that will be covered by the perimeter adhesive. The adhesive is dispensed as a hot melt, or as a viscous paste or applied as a tape to one of the substrates occupying the region between the redox layer and the busbar, and it may also overlap the busbar as long as the total thickness of the busbar and the adhesive on top of the busbar will not impose any edge delamination stress (i.e., the edges are not thicker as compared to the interior of the laminated window) and excess adhesive will flow out or is metered precisely for no overflow but come to the substrate outside edge.

During lamination the adhesive will also squeeze (i.e., spreads out or expands laterally), thus enough allowance should be given to accommodate this so as to form almost a seamless joint (no gap) between the adhesive and the electrolyte. The adhesive may even overlap the redox layer edges by a fraction of a mm or even by a few mm. During lamination vacuum is pulled to remove any trapped air and moisture or other volatiles before the two substrates are contacted or before the lamination pressure is applied. The electrolyte film and the adhesive film may have a surface texture to efficiently remove any trapped gases by applying a vacuum so that no bubbles are formed during lamination. As explained earlier, in applying this vacuum one has to consider the vapor pressure of any plasticizers in the electrolyte. After evacuation, pressure and heat is applied on the outside of the two substrate to form this laminate. Based on the size and geometry of the substrates, one can pre-determine the expansion of the perimeter sealant and the electrolyte so that these are sized properly and just enough lateral gaps are left when these are placed so that these materials desirably form seamless edges at the designated boundaries after the lamination squeeze.

The adhesives (sealants) for perimeter sealing may also be formed using the reactive polymers which are crosslinked during device fabrication as was the case for some of the redox coatings and the electrolytes. The sealant may be dispensed as a liquid, e.g., hot melt where the polymer is still in a thermoplastic format, and after dispensing it is cured into a thermoset using a further polymerization reaction. This polymerization reaction occurs during lamination, triggered by a different temperature and/or pressure or even by radiation. The sealants do not have any plasticizers and lithium salt, and it is highly desirable that these be formed of polymer materials that are hydrophobic and have low oxygen and moisture permeability and are not compatible with the plasticizer found in the electrolyte or in the redox layer. In one embodiment the perimeter sealants have a thermal expansion coefficient which is similar to that of the electrolyte in the temperature range of use. Generally, this means that the average thermal coefficient in the range of −40 to 100° C. should be within 25% of the sealant and the electrolyte for most applications. In another embodiment, the glass transition temperature (Tg) of the soft segment of the polyurethane electrolyte (if used) should be similar to the soft segment of the sealant polyurethane, or at least the Tg of the sealant should be below the lowest use temperature.

The sealants are formed of materials with known low air and moisture permeability, such as polyisobutylene, polyacrylonitrile, polyvinylidene chloride, etc., which may also be optionally crosslinked during or after processing of the device. Sealants may also be formed using block copolymers, such as triblock copolymers where the central block is one of the low permeability polymers (e.g. polyisobutylene) and the end blocks are those materials which phase separate into domains and provide the mechanical properties (e.g. polystyrene, acrylic). The melting point (or the upper use temperature) of these materials is determined by these domains. The block length in these copolymers are is adjusted so that the volume occupied by the low permeable material exceeds 50%, and in another embodiment exceeds 70%, so that it forms the continuous phase with isolated discrete domains embedded in the continuous phase.

The perimeter adhesive may be formed of a thermoplastic polymer having a reaction between isocyanate and a reactive proton monomer (e.g., polyurethanes and polyureas) with a reactive group as discussed earlier. The reactive groups include unsaturations and polymerizable rings) which may be used for polymerization after the adhesive is deposited as discussed in earlier sections. This polymerization typically results in crosslinking. For, example a TPU may be formed by reacting an isocyanate with a mixture of diols (a chain extender diol and a soft segment forming diol). Unlike in the electrolyte the soft segment forming diol should have none or little appetite to be soluble in the plasticizer or the solution of the plasticizer and the salt so that these sealants will have no tendency to absorb these and/or cause them to migrate outside. In addition, the perimeter adhesive may have a higher durometer hardness as compared to the electrolyte sheet so that it has high barrier properties and superior strength and structural properties. The solubility of these polyols (i.e., in the monomeric state) in the plasticizer at room temperature should be lower as compared to those used in the redox or the electrolyte layer or not be soluble in the plasticizer. A better way is to ascertain that the absorption of the plasticizer in the crosslinked polymeric sealant should be below 5% and, in another embodiment, below 1% and yet in another embodiment below 0.1% by weight. These may even be chosen from those hydrophobic diols which show low permeability to moisture and oxygen. In addition, since the sealant may be covered by a window frame, then these may be made using aromatic isocyanates and be of any color or opaqueness including black or dark colors. In one embodiment, the sealant should have superior thermal stability (and mechanical properties) as compared to the electrolyte in order to be able to provide good structural and barrier characteristics at temperatures exceeding at least 25° C. above the upper use temperature, and in some embodiments at least 50° C. above the upper use temperature. In some aspects, the melt or the flow temperature of the sealant should be at least 100° C., e.g., about $110^{-250°}$ C., about 125 to about 175° C. Properties, such as higher durometer hardness, superior structural stability and lower permeability may also be imparted by having higher crosslinking density in the sealant (if crosslinked) as compared to the electrolyte and the redox layers.

Unconventional low permeability isocyanate cured sealants may be formed by using polyols or pre-polymers terminated by any proton reactive groups. For example, prepolymers comprising polyisobutylene, polyacrylonitrile, polyvinylidene chloride which are terminated with hydroxy groups may be used to form low permeability urethanes.

Generally, for conventional polyurethanes with equivalent properties but only varying the type of polyol chemistry, e.g., polyester polyols have lower gas permeability than polyethers and polycarbonate polyols. Thus, for conventional urethane sealants with low permeability polyester polyols are preferred. Since the polyester sealants have also lower hydrolytic stabilities, it is preferred to have a secondary sealant which may be selected from a variety of materials including silicones, butyls, polysulfides, etc.

In one embodiment, permeability may also be decreased by using additives which provide a torturous diffusion path. For example, nanoparticles with functionalized surfaces as discussed in the electrolyte section may be used here. Further, one may also use nanoparticles with a plate like structure which are more effective in providing a torturous path. An example of such inorganic additives are layered silicates or clays (e.g., montmorillonites) incorporated in an exfoliated state. These clays can be exfoliated using the matrix polymer and are also called organically modified layered silicates, e.g., these materials (e.g., Nanocor 1.30TC) are available from Nanocor (Arlington Heights, IL). These clays are introduced in a volume fraction of about 0.01 to 8% range, and in another embodiment in about 0.1 to about 4% range by weight of the sealant. There are two methods to incorporate the nanoclays in polyurethane sealants. In one method clays are added to the polyol (or the mixture of polyols) and mixed under high shear, so that the clays are exfoliated and intimately blended with the polyol, with polyol chains going between the layers of the exfoliated clay additive particles (this is an example of surface functionalizing the nanoclays). This mixture is then used to prepare the urethane adhesive by adding the desired isocyanate and the catalysts and conducting the polymerization after dispensing around the perimeter for thermosetting adhesives or preparing thermoplastic urethane tapes to be used for sealants. In another method the clay particles are introduced in a formed polymer (e.g., a thermoplastic urethane). In this method the polymer is dissolved in a solvent and mixed with the clay under high shear (unless the polymer is low in molecular weight and can be processed without a solvent). The solvent is removed and this mixture is then blended with urethane polymer, or the solution is first blended with a batch of thermoplastic urethane polymer and then the solvent is removed, so that the resulting material may be processed as above. The clay in thermoplastic urethane may also be added and exfoliated by melt blending (e.g., by using high shear such as twin-screw extruder compounding).

Windows Incorporating Electrochromic Elements

Windows incorporating EC elements such as in insulated glass units (IGUs) are discussed in published patent applications WO/2018/009645 and WO/2018/128906, which are incorporated herein by reference in their entireties. However, as discussed below, improvements in IGU construction can lead to even higher performing windows from energy perspective. The EC elements discussed here may be those as discussed above in FIGS. 1 through 5, or those produced differently. In the IGU units of this invention, other technologies where the glass tint is varied by electrical voltage may also substitute the EC element, for example using liquid crystal panels as those used in Eyrise™ s350 from Merck (Darmstadt, Germany). In addition to the IGU windows providing energy efficiency by modulating the transmission of solar radiation, it is also important that the IGU windows have low thermal conductivity properties i.e., high thermal resistance or higher "R" value (sometimes for thermal conductivity of glass, "U" value of glass is stated which is its thermal conductance or reciprocal of R value, i.e., R=1/U, and in that case U should be smaller for providing high thermal resistance). The IGU windows may be constructed by using an EC element with substrates of different optical properties, and also combined with another glass with different optical attributes giving rise to different SHGC range (discussed below) or different R value even when using the same type of EC element. The R values listed in this document have units of BTU/(h·° F.·ft$^2$), to convert the R values to SI units W/(m$^2$K), i.e., to $R_{SI}$ the following equation may be used, $R_{SI}$=R×0.176.

The Solar modulation of a window with an EC element is also an important parameter which defines its efficiency as measured using Solar Heat Gain Coefficient (SHGC), where SHGC is a dimensionless factor between 0 and 1. A value of 1 means that the window is transmitting all of the solar energy. Since EC panels have variable transmission, it is possible to have windows for buildings and other uses which have a variable SHGC depending on the tint state of the EC element.

Both the SHGC and R for a complete IGU window is not only dependent on the glass properties but also the framing, type of spacer material used to separate the various panes, etc. Thus, for the purpose of this invention the R and SHGC values of windows used are those which are measured or calculated at the center of the glass (or window), i.e., away from the frame. A highly energy efficient electrochromic IGU window will have a high R value and be constructed for a SHGC of 0.15 or lower (in another embodiment lower than about 0.1) when the EC element is in the darkest state. The increase in SHGC when the EC element is clear (or untinted) should be large. As discussed earlier the SHGC in the clear state should be greater by a factor of 3 or higher for some embodiments while in others it may be greater by a factor of 4 or higher, when compared to the SHGC in the fully tinted EC state.

Figure 6:
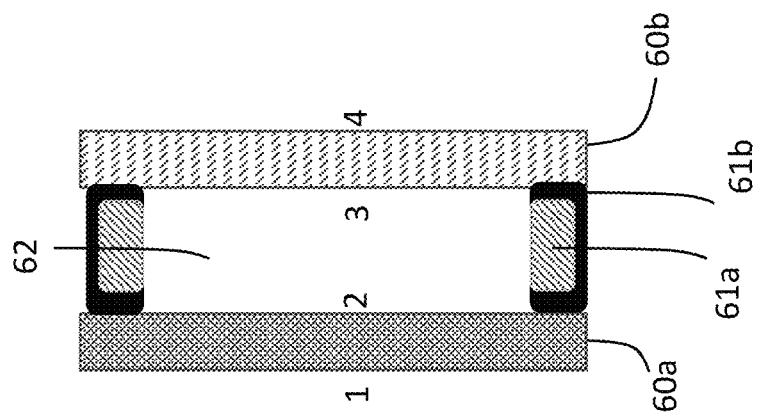
FIG. 6 illustrates an EC window in a double glass IGU construction.

An IGU window construction with an EC element is shown in FIG. 6. An EC element 60*a* is combined with a passive glass 60*b* to form the IGU. The spacer channel 61*a* and the adhesive 61*b* which run around the window perimeter is also shown. The spacer may be made out of metal or plastic or fiber reinforced plastic. The latter two provide superior thermal insulation. The space 62 between these two panels may be filled with a gas such as dry air or for better thermal performance with an insulating gas such as argon, krypton, SF$_6$, etc. Desiccants may also be added in the space and/or the adhesive to ensure there is no condensation of water vapor between the panes. Typically, the gap between the two panes is in the range of about 1 to 2 cm. The four surfaces of the IGU unit are marked with numbers 1 through 4. Where surface 1 faces outside and surface 4 faces the building interior. Surfaces 2 and 3 face inside the gap. To make the windows efficient from a SHGC and thermal impact one of the surfaces (2, 3 or 4) is coated with a low-e (low emissivity) coating (not shown). In all subsequent figures, i.e., FIGS. 7, 8 and 9, this surface numbering convention is used where surface 1 faces outside and the others are sequentially numbered. Please note that it is preferred that the EC element is located so that it is located facing outside of the building in order to maximize energy efficiency.

Typically, IGU windows with EC elements with a maximum SHGC in a range of about 0.25 to 0.55 are desired (i.e., the EC element is in the clearest state or is least tinted), and the lower range of SHGC is between 0.03 to 0.15 (i.e., the EC element is in the darkest or most tinted state). The range in the SHGC for a window in the clear state (and concomitant range in the most tinted state) arises due to the optical properties of the substrates used to make the EC panel, and/or the optical properties of the other glass used in the IGU construction (e.g., 60*b* in FIG. 6) and also the properties of the low-e coating. Since windows are building elements which connect inside to outside, there is always a desire to maximize visible light transmittance, but there are situations where low light transmission is needed for glare control, privacy and reduced energy use. Generally, the ratio of SGHC of a window with a variable light transmission element in its clear to dark state should be ≥3, and in another embodiment this should be ≥4. Typically, most conventional IGU constructions using double pane will have R values of about 2 to 4. The R values of these may be extended to about 5 by introducing extra spectrally selective coatings. The higher numbers are achieved by using insulating gases such as argon in the unit. In general walls of most homes will have R values of 15 and higher. This shows that a significant improvement in windows is needed to have good thermal insulation to be able to increase the overall building energy efficiency.

Figure 7:
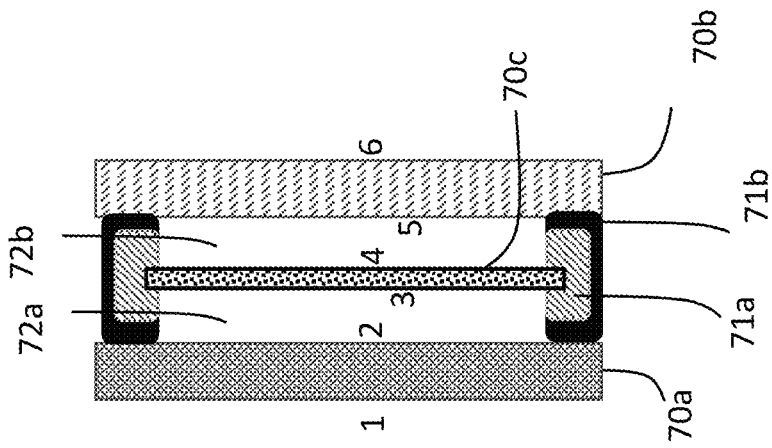
FIG. 7 illustrates an EC window in a triple glass IGU construction

Triple glazing is used to increase the R value. Typically, triple glazed units can increase the R value to up to 7 to 8, but it comes with a significant cost and increased weight of the glass. As shown for dual glazing in FIG. 6, the triple glaze unit has two sets of spacer channels parallel to each other separating the three panels and having two compartments. FIG. 7 shows a novel combination of EC with triple glazing. In this case the EC element is shown as 70*a* and is combined with another glass 70*b* to form an IGU. The spacer 71 a accommodates another thin clear optical element (70*c*). Since there is an additional element the total number of surfaces are numbered from 1 to 6, where surfaces 3 and 4 are on the central element. To decrease the weight, the central element is thin, and could be made out of glass. Its thickness ranges from about 0.3 mm to about 2 mm, and in another embodiment from about 0.5 mm to 1.1 mm. The glass element 70*b* is generally thicker than 2 mm, more typically thicker than 3.2 mm. This has several advantages. First the increase in weight is negligible, second, the gap between the double glazing shown in FIG. 6 is simply divided in two chambers which does not result in increased window thickness as in a conventional triple glazing, where each chamber has a width of about 1 to 2 cm. Third, the chamber 72*a* and 72*b* are not sealed from each other, i.e., gas can leak from one chamber to the other, thus always equalizing the pressure in the two chambers due to differential heating effects. The element 72*c* is simply held in place by a slot in the spacer 71*a*. Any of the surfaces 2, 3, 4, 5 or 6 may have a low-e coating. Typically, surface 3 or 4 have a low-e coating. Optionally another low-e coating may also be placed on surfaces 5 or 6. In this construction spectrally selective reflective coatings may also be introduced on surface 1. Triple glazings with EC elements of this construction can achieve R values of 7 or more without the drawbacks of typical triple glaze constructions as mentioned above.

Figure 9:
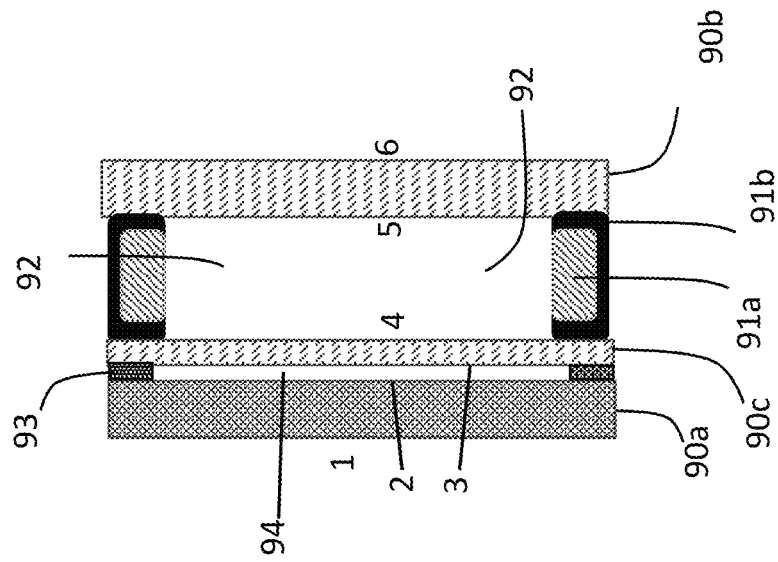
FIG. 9 illustrates an EC window in an IGU construction where the EC element is combined with a VIG glass.
Figure 8:
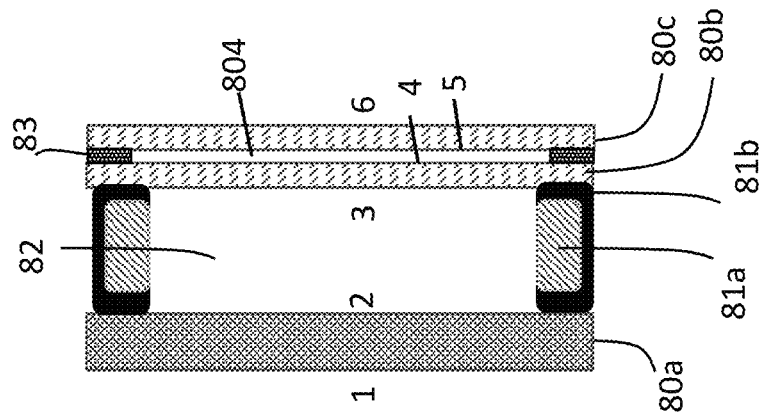
FIG. 8 illustrates an EC window in an IGU construction combined with a vacuum insulated glass (VIG).

One can further enhance the energy efficiency of glazing by incorporating a vacuum insulated glazing (VIG) with an EC element in an IGU construction. Along with the benefits of variable SHGC, R value of such glazing can exceed 10 and start approaching R15. FIGS. 8 and 9 show some of these concepts which are particularly useful for EC elements.

FIG. 8 shows an EC panel 80a which forms an IGU unit with a VIG element, wherein the VIG element is formed by glass 80b and 80c. the gap 82 is separated by a separator 81a and adhesive 81b. The panels in the VIG element (also referred to as a VIG unit) are separated by a small space 84, usually less than about 1 mm and this cavity is evacuated and sealed. The perimeter sealant for the VIG unit is shown by 83. So that the two pieces of glass 80b and 80c do not collapse from the outside air pressure, there are spacers (particles or walls) or pillars placed throughout this cavity (which are not shown) at a distance of about 1 cm to 6 cm grid pattern. The low-e coating may be placed on any of the surfaces numbered from 2 to 6. However, 3, 4 and 5 are most preferred. Surface 1 may have a spectrally selective reflective coating.

FIG. 9 shows another concept with VIG where the VIG element is formed using the EC element 90a and another piece of glass 90c separated by a small gap 94 as in FIG. 8 the small gap is evacuated and is sealed at the perimeter by using the sealant. The pillars and spacers in this gap are not shown. The IGU is formed using 90b which is separated from the EC+VIG element by gap 92 and is sealed by spacer and the adhesive 91a and 91b. Low-e coating may be on any of the surfaces from 2 to 6. The surfaces most preferred are 3 to 5. Spectrally selective reflective coating may be placed on surface 1.

There may be variations on the concepts presented in FIGS. 8 and 9. For example, a thin glass element may be placed in the gaps 82 and 92 as shown in FIG. 7 by 70c. Also glazing with high R value may be obtained by only combining 90a and 90c to form a thin VIG construction (integrated EC/VIG unit). Elements 91a, 91b and 90b are not used. In this low-e coating on any of the surfaces 2, 3 or 4, although a preferred surface is 3. For the purpose of this patent, the integrated VIG/EC construction will also be considered as an IGU construction as it has an insulative element due to the presence of VIG. To fabricate an integrated VIG/EC unit, it is desirable to fabricate a VIG unit first, where one of its outer surface is coated with a transparent conductive layer and then build the EC device (90a) using this conductive surface as one of the conductors.

Since EC windows tint to a dark state but still maintain visual clarity, one may combine EC elements with dynamic privacy elements, such as those which use liquid crystals so that windows can provide privacy at night when the interior of the buildings are brighter than outside. As an example, elements 60b, 70b and 90b in FIGS. 6, 7 and 9 respectively could be replaced by windows which reversibly switch from clear to opaque (hazy) by applying an electrical voltage (e.g., Eyrise™ i350 from Merck, Darmstadt, Germany). In these figures, one of the surfaces of the EC or the privacy element facing the gap may have a Low-E coating.

Beyond optical and thermal properties, use of laminated EC devices such as those described in this invention may also assist with lowering of sound transmission through the windows. Sound transmission through the windows is typically measured in a frequency range of about 100 to 5,000 Hz. Use of laminated EC device constructions could increase the sound transmission loss (or decrease sound transmission) by 2-10 dB in this range, where typically the larger increases are seen at the higher frequencies. The composition of the electrolyte layer in the EC device may be tuned so that it provides higher damping (tan S) of the vibrations in this frequency range. The measurements for determining the sound dampening are carried out at about 25° C.

Many of the EC devices of this invention may be made using flexible polymeric substrates, so that these can be used for retrofit-window applications. For this the outside surface of one of the substrates is coated with an adhesive which is protected by a release layer. The adhesive layer and the substrate composition should protect other layers in the device from UV radiation. Typically, such films are bonded to the interior surface of a building window. At the time of application, the release layer is removed so that the EC device is bonded to an existing window. The film surface facing the inside of the building should have a low-E coating, with an emissivity of lower than about 0.4, e.g., as low as 0.1 and in another embodiment as low as 0.04. Optionally, the outside surface of the other substrate may be coated with a scratch resistant coating, and it is also desirable that this coating also has low-e properties to provide superior energy efficiency. For flexible EC devices which are bonded to the outside surface of the building window, the scratch resistant coating should not have low-e properties.

The present disclosure includes the following any one of or any combination of any of items:

1. A polymeric ion-conductive electrolyte sheet comprising:
   i) thermoplastic polymer formed using at least three monomers;
   ii) a melting point or a flow point in excess of about 90° C. and less than about 170° C.;
   iii) optical haze less than 5%; and
   iv) and at least one electrochromic dye.
2. The polymeric ion-conductive electrolyte sheet of item 1, having an ion-conductivity in a range of about $10^{-2}$ to $10^{-5}$ S per square cm of the sheet area when measured at 25° C.
3. The polymeric ion-conductive electrolyte sheet of any one or combination of items 1-2, wherein the thermoplastic polymer comprises a fluoropolymer, polyurethane, polyvinyl butyral, acrylic, polyester, polyether, polyurea, polycarbonate, polyvinyl acetate, or a combination thereof.
4. The polymeric ion-conductive electrolyte sheet of any one or combination of items 1-3, wherein the electrolyte sheet further comprises a plasticizer.
5. The polymeric ion-conductive electrolyte sheet of any one or combination of items 1-4, wherein the said plasticizer solubilizes at least one monomer used to form the said thermoplastic polymer.
6. The polymeric ion-conductive electrolyte sheet of any one or combination of items 1-5, further comprising a ultraviolet (UV) stabilizer.
7. The polymeric ion-conductive electrolyte sheet of any one or combination of items 1-6, wherein the said UV stabilizer imparts an optical absorbance level of at least 1 at 395 nm to the said electrolyte film.
8. The polymeric ion-conductive electrolyte sheet of any one or combination of items 1-7, wherein the UV stabilizer imparts an optical absorbance level of at least 1 at 405 nm to the said electrolyte film.
9. The polymeric ion-conductive electrolyte sheet of any one or combination of items 1-8, wherein the polymeric ion conductive sheet contains at least one unreacted monomer which is not polymerized in said thermoplastic polymer.

10. The polymeric ion-conductive electrolyte sheet of any one or combination of items 1-9, wherein the polymeric ion conductive sheet contains a catalyst capable of polymerizing at least one additional monomer by radiation.

11. The polymeric ion-conductive electrolyte sheet of any one or combination of items 1-10, wherein the plasticizer is present in a weight fraction of about 10% to 70% based on the weight of the thermoplastic polymer.

12. The polymeric ion-conductive electrolyte sheet of any one or combination of items 1-11, wherein the composition further comprises a dissociable salt.

13. An electrochromic product comprising the polymeric ion-conductive electrolyte sheet of any one or combination of items 1-12.

14. The electrochromic product of item 13, further protected with a polymeric film, laminate or a glass cover wherein the polymeric film imparts an optical absorbance of at least 1 at 395 nm to the said electrochromic product when the absorbance is measured in the bleached state of the electrochromic product.

15. The electrochromic product of item 13, further protected with a polymeric film, laminate or a glass cover wherein the polymeric film imparts an optical absorbance of at least 1 at 410 nm to the said electrochromic product when the absorbance is measured in the bleached state of the electrochromic product.

16. The polymeric ion-conductive electrolyte sheet of any one or combination of items 1-12, wherein the electrolyte further comprises a reversible oxidizer.

17. A polymeric ion-conductive electrolyte sheet comprising:
i) a thermoplastic polymer
ii) a melting point or a flow point in excess of about 90° C. and less than about 170° C.;
iii) at least one electrochromic dye; and
iv) a UV stabilizer in a concentration that imparts an optical absorbance level of at least 1 at 400 nm to the said polymeric ion-conductive electrolyte sheet.

18. An electrochromic product comprising the polymeric ion-conductive electrolyte sheet of item 17.

19. The polymeric ion-conductive electrolyte sheet of item 17 or item 18, wherein the electrolyte further comprises a reversible oxidizer.

20. The polymeric ion-conductive electrolyte sheet of any one or combination of items 17-19, further comprising a monomer capable of forming crosslinks with the said thermoplastic polymer.

21. The polymeric ion-conductive electrolyte sheet of any one or combination of items 17-20, further comprising a plasticizer.

22. A thermoplastic ion-conductive polymeric electrolyte sheet comprising a melting point or a flow point in excess of about 90° C. and less than about 170° C.; and comprising:
i) at least one electrochromic dye; and
ii) a UV stabilizer in a concentration that imparts an optical absorbance level of at least 1 at 400 nm to the said thermoplastic ion-conductive polymeric electrolyte sheet.

23. An electrochromic product comprising the thermoplastic ion-conductive polymeric electrolyte sheet of item 22.

24. The thermoplastic ion-conductive polymeric electrolyte sheet of any one or combination of items 22-23, further comprising a reversible oxidizer.

25. The thermoplastic ion-conductive polymeric electrolyte sheet of any one or combination of items 22-24, further comprising a plasticizer.

26. A polymeric ion-conductive electrolyte sheet for use in an electrochromic device, comprising:
i) thermoplastic polymer formed using at least three monomers;
ii) a melting point or a flow point in excess of about 90° C. and less than about 170° C.;
iii) optical haze less than 5%; and
iv) a UV stabilizer in a concentration that imparts an optical absorbance level of at least 1 at 400 nm to the said electrolyte film.

27. The polymeric ion-conductive electrolyte sheet of item 26, further comprising a reversible oxidizer.

28. The polymeric ion-conductive electrolyte sheet of item 26, further comprising a plasticizer.

29. A polymeric ion-conductive electrolyte sheet comprising:
i) a thermoplastic polymer
ii) a melting point or a flow point in excess of about 90° C. and less than about 170° C.;
iii) a plasticizer content of 70% or less; and
iv) at least three electrochromic dyes.

30. An electrochromic product comprising the polymeric ion-conductive electrolyte sheet of item 29.

31. The polymeric ion-conductive electrolyte sheet of item 29, further comprising a reversible oxidizer.

The present also disclosure includes the following any one of or any combination of any of items:

1. An electrochromic device, comprising: a first substantially transparent substrate having an electrically conductive material associated therewith; a second substrate having an electrically conductive material associated therewith; and an electrochromic medium comprising: at least one solvent; at least one anodic electroactive material; at least one cathodic electroactive material; wherein at least one of the anodic and cathodic electroactive materials is electrochromic; and one or more UV stabilizer, wherein the type and concentration of the said stabilizer is adjusted to provide an optical absorption edge to the device at a wavelength of 400 nm or higher when the said device is in the bleached state.

2. The electrochromic device of item 1, wherein the optical absorption edge is at 405 nm or higher.

3. The electrochromic device of any one or combination of items 1-2, wherein the optical absorption edge is at 415 nm or higher.

4. The electrochromic device of any one or combination of items 1-3, wherein the cathodic material is a viologen.

5. The electrochromic device of any one or combination of items 1-4, wherein the electrochromic medium contains a polymeric material.

6. The electrochromic device of any one or combination of items 1-5, wherein the polymeric material is crosslinked.

7. The electrochromic device of any one or combination of items 1-6, which is selected from a variable transmissive device or a variable reflective device.

8. The electrochromic device of any one or combination of items 1-7, wherein the polymeric material is a:

i) thermoplastic polymer formed using at least three monomers; and
ii) has melting point or a flow point in excess of about 90° C. and less than about 170° C.

9. The electrochromic device of any one or combination of items 1-8, wherein the polymer is selected from at least one of fluoropolymer, polyurethane, polyvinyl butyral, acrylic, polyester, polyether, polyurea, polycarbonate and polyvinyl acetate.

10. The electrochromic device of any one or combination of items 1-9, wherein the electrochromic medium contains at least three electrochromic dyes.

11. An electrochromic device, comprising: a first substantially transparent substrate having an electrically conductive material associated therewith; a second substrate having an electrically conductive material associated therewith; and a polymeric electrochromic sheet placed between the substrates and facing the conductive material, comprising: at least one solvent; at least one anodic electroactive material; at least one cathodic electroactive material; wherein at least one of the anodic and cathodic electroactive materials is electrochromic; and one or more UV stabilizer, wherein the type and concentration of the said stabilizer is adjusted to provide an optical absorption edge to the device at a wavelength of 400 nm or higher when the said device is in the bleached state.

12. The electrochromic device of item 11, wherein the optical absorption edge is at 405 nm or higher.

13. The electrochromic device of item 11, wherein the optical absorption edge is at 415 nm or higher.

14. The electrochromic device of any one or combination of items 11-13, wherein the cathodic material is a viologen.

15. The electrochromic device of any one or combination of items 11-14, wherein the polymer is selected from at least one of fluoropolymer, polyurethane, polyvinyl butyral, acrylic, polyester, polyether, polyurea, polycarbonate and polyvinyl acetate.

16. An electrochromic device, comprising: a first substantially transparent substrate having an electrically conductive material associated therewith; a second substrate having an electrically conductive material associated therewith; and an electrochromic medium comprising: a viologen electrochromic dye; and one or more UV stabilizer, wherein the type and concentration of the said stabilizer is adjusted to provide an optical absorption edge to the device at a wavelength of 400 nm or higher when the said device is in the bleached state.

17. The electrochromic device of item 16, wherein the electrochromic medium contains a polymeric material.

22. The electrochromic device of item 17, wherein the polymeric material is crosslinked.

EXAMPLES

Example 1: Electrochromic Device Containing a Tungsten Oxide Electrode and a Dye Containing Solid Electrode Separated by an Electrolyte Layer Preparation of Dye Containing Layer
A list of Materials is shown in Table 1 below.

TABLE 1

| Material | Comments | Supplier |
|---|---|---|
| Isocyanate Desmodur N3800 | Aliphatic isocyanate with a functionality of 3.8 | Covestro LLC Pittsburgh PA |
| Propylene Carbonate | Anhydrous | Sigma Aldrich Chemical Company Milwaukee, WI |
| Lithium bis(trifluoromethanesulfonyl)imide | Anhydrous salt | Sigma Aldrich Chemical Company Milwaukee, WI |
| α-Methylferrocene methanol | 97% | Sigma Aldrich Chemical Company Milwaukee, WI |
| Carbon Nanotubes | Few walled. Diameter 2.5 to 3 nm Length 2.6 µm | Sigma Aldrich Chemical Company Milwaukee, WI |
| Diol Desmophen C1100 | Linear aliphatic polycarbonate polyester | Covestro LLC Pittsburgh PA |
| Dibutyltin Dilaurate Catalysts | Liquid catalysts | Sigma Aldrich Chemical Company Milwaukee, WI |

Isocyanate monomer formulation with dye: To a reaction vessel under nitrogen and fitted with a stir bar was added 0.840 g of isocyanate N3800 and 0.101 g of α-methylferrocene methanol (anodic dye). This mixture was stirred overnight to form a clear viscous yellow solution to react the two. To this was added 0.805 g of a solution of 0.2M Lithium bis(trifluoromethanesulfonyl)imide in propylene carbonate. The mixture was stirred for 30 minutes.

Diol monomer formulation: Few walled electrically conductive carbon nanotubes were added to the diol C1100 to give a concentration of 0.1 wt %. These carbon nanotubes were dispersed in the diol by a three roll mill process where the minimum gap between the rollers was 5 µm. To this dispersion was added the catalysts dibutyltin dilaurate to give a final concentration of catalysts based on total resin (N3800+ C1100) of 0.01 wt %. This mixture was stirred for one hour to form a black viscous liquid.

Coating resin formulation with dye: 1.106 g of the diol monomer formulation was added to 1.746 g of the isocyanate monomer formulation and stirred by hand for five minutes. The mixture was degassed under vacuum for ten minutes to form the dye layer coating solution.

Dye coating deposition and curing: The dye layer coating solution was deposited onto pre-cleaned ITO (15 Ω/sq.) using a Mayer rod. The rod wire spacing was such to provide a gap of 33 µm. The deposited coating was cured at 65° C. for 15 minutes under ambient atmosphere. The thickness of the cured coating was 19 µm and was transparent with a slight green tint. The cured coating contained 28.3 wt % of the plasticizer propylene carbonate.

Device Preparation and characterization: The dye layer on ITO was made into an electrochromic window by assembling this with another substrate which had an ITO coating followed by a lithium oxide/tungsten oxide coating (lithium tungstate), as the counter electrode. The ratio of Lithium to tungsten was 0.3:1. The thickness of the tungsten oxide layer was 320 nm and was deposited from a liquid solution. Details of the coating deposition are provided in Example 1 of U.S. Pat. No. 6,373,618. The two substrates were positioned with the coatings facing each other in a parallel configuration a distance (or gap) of 225 µm. The gap was filled with electrolyte composed of 0.2M lithium bis(trifluoromethanesulfonyl)imide in propylene carbonate and the perimeter was sealed. At 550 nm the cell had an optical transmission of 70% and when colored at 1.3V (tungsten oxide being negative) for 330 seconds a transmission of 21%. Applying a reverse potential of 1V (i.e., reversing the polarity) the cell bleached back to 70% T in 262 seconds. In the colored state the cell was a deep blue color.

Example 2: Electrochromic Device Containing a Tungsten Oxide Electrode and a Dye Containing Solid Electrode Separated by a Laminated Polymeric Electrolyte Layer A solid thermoplastic urethane film was cast from the solution as follows. 6.72 g thermoplastic polyurethane PUL446-107 (obtained from Huntsman Corporation, Woodlands, TX) was dissolved in 70 ml of tetrahydrofuran (THF), to this was added two plasticizers 1.568 ml (2.2 g) of 1 butyl 1 methyl pyrrodolinium bis 9trifluoro methyl sulfonyl imide), and 6.272 ml of propylene carbonate (7.46 g) and 2 g of lithium trifluoromethane sulfonate. After a colorless solution was obtained by stirring overnight, it was heated to 65 C in a vacuum oven and degassed. The temperature was gradually increased in the vacuum oven to 95 C over several hours. This resulted in degassing and removal of THF. A rubbery solid of slightly yellow color was obtained. This was converted to a sheet in a thickness of 400 microns by compressing the material between hot plates at 125 C. Polyester film as release sheets and film spacers were used to form this film.

Substrates coated with a dye layer and tungsten oxide as described in Example 1 were used and the electrolyte film was laminated between these with the coatings touching the electrolyte. Lamination was done in a diaphragm laminator (model L036A from P.Energy, Italy) at 145° C. The laminate was first subjected to vacuum in order to remove air bubbles prior to applying the pressure. The sample was cooled under pressure and removed. The sample size was 5.5 cm×3 cm where the substrates were slightly offset in the longer direction from where after lamination coatings of tungsten oxide and the dye layer were removed from the exposed (offset) area to attach the busbars. The active device area which was laminated was 3 cm×4 cm. Conductive busbars were applied at one edge of each of the substrate and powered at 2V with tungsten oxide side being negative. The sample colored from 72% optical transmission colorless sample down to 14.5% optical transmission in 1,000 s to a blue color. Optical transmission was measured at 550 nm.

Example 3: Optical Characterization of an EC Cell and Determination of Solar

Heat Gain Coefficient (SHGC) at the center of the window in an IGU.

An electrochromic cell was fabricated by using two conductively coated pieces of soda-lime glass in a thickness of 2.3 mm. These had a fluorine doped tin oxide coating with a surface resistance of 15 ohms/square (TEC™15 glass obtained from NSG in Toledo, Ohio). The glass size was about 14 cm×9 cm. One of the conductive coatings was further coated with a tungsten oxide coating containing about 30 mole % of lithium oxide. The tungsten oxide coating was still further coated with 125 nm thick layer of $LiAlF_4$. The substrate perimeter (about 1 cm wide) was cleaned to remove the tungsten oxide and the LiAlF4 coating. This was assembled with the second piece of TEC™15 glass with the coated sides facing each other by a perimeter epoxy sealant which had 300 micron sized glass spherical spacers to control the distance between the two and form a cavity. The uncoated TEC™15 had two holes about 2 mm in diameter drilled near the diagonal corners so that electrolyte could be introduced into the cavity. The cavity was filled with an electrolyte containing a redox dye and the holes were plugged and sealed. The electrolyte was 0.2M lithium bis(trifluoromethanesulfonyl)imide in propylene carbonate and further comprised of 0.025M phenothiazine (dye) and 4 wt % of polymethylmethacrylate (Elvacite™ from <Lucite International, Cordova, TN).

Figure 10:
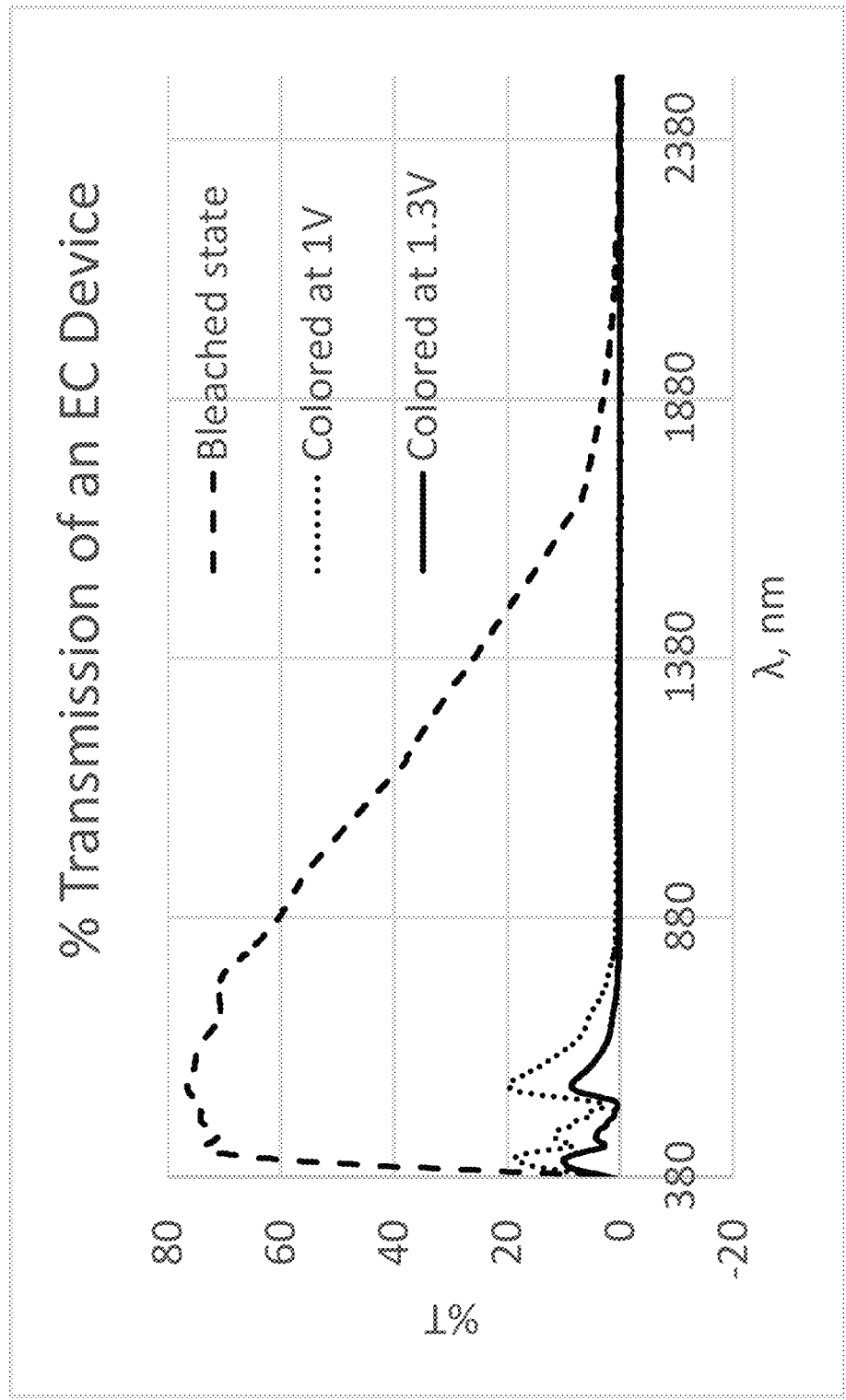
FIGS. 10 and 11 show the transmission and reflection characteristics of an EC glass.
Figure 11:
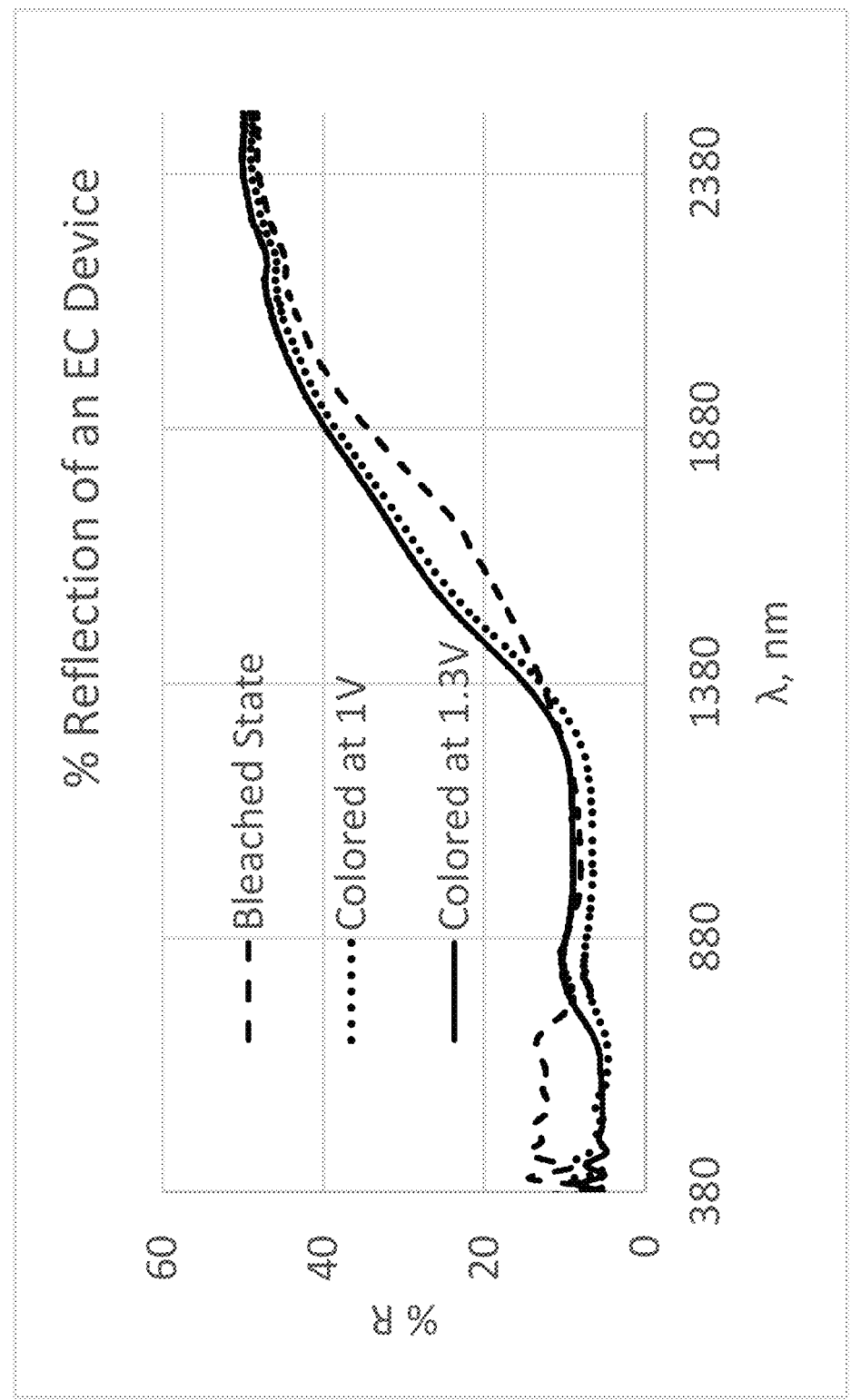

The optical spectra of the cell was noted in the bleached (not colored) and the colored state by coloring first at 1V and then coloring deeper (fully colored) at 1.3V. This measurement was made both in transmission and reflection and is shown in FIGS. 10 and 11. The reflection data was collected from both sides and was quite similar, however, the reported data in FIG. 11 has been taken from the surface which is located closer to the tungsten oxide coating in the EC device. The SHGC of an IGU formed with this EC glass and another piece of passive glass (see FIG. 6, where EC glass is 60a and the passive glass is 60b) was calculated at the center of the window. The tungsten oxide coating in EC element 60a was placed so that it was closer to surface 1. The passive glass was 4 mm thick Optiwhite Energy Advantage™ from NSG. This glass had a Low-E coating on surface 3. The SHGC in the bleached state was 51.4% (or 0.514) and in fully colored state was 7.0% (or 0.07). The visible light transmission in these two states through the IGU was 64.5 and 4.1% respectively.

Figure 12:
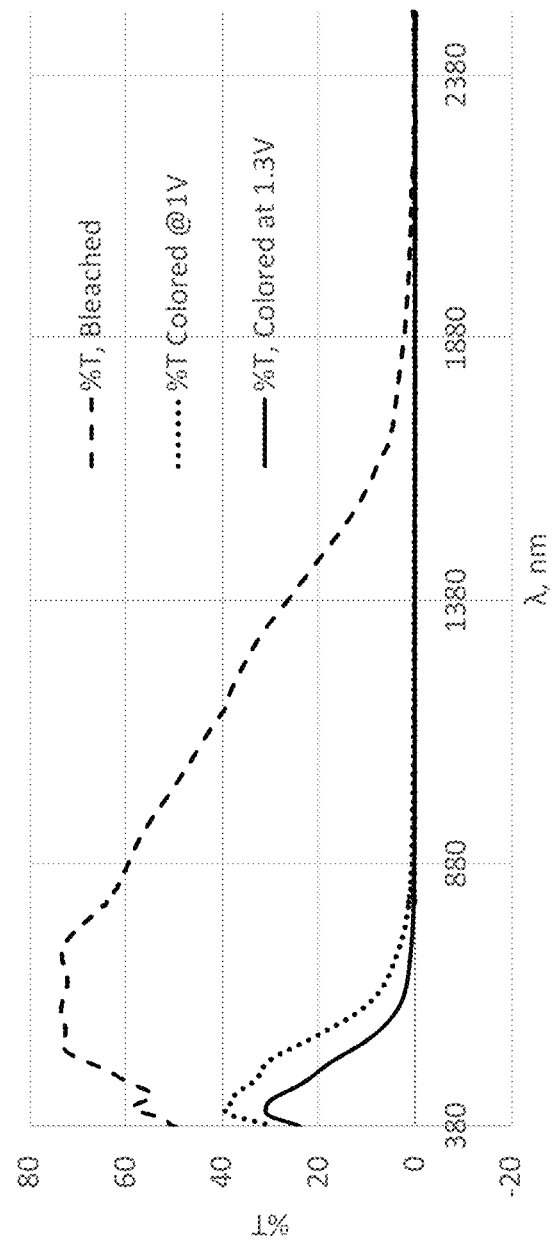
FIGS. 12 and 13 show transmission and reflection characteristics of an EC glass with different optical characteristics.
Figure 13:
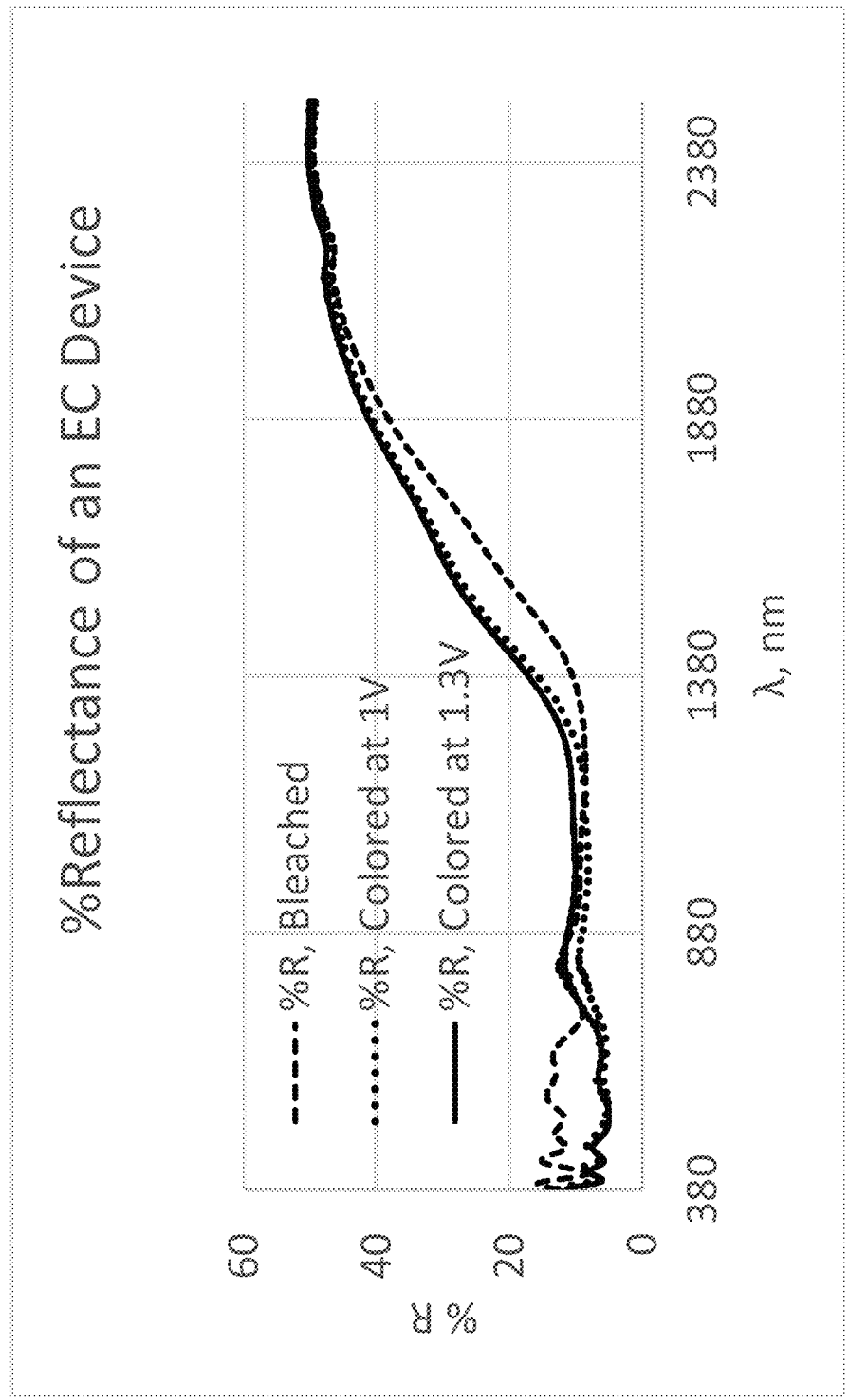

Another EC cell was made in a similar fashion where the dye was changed to 1-(ferrocenylmethyl)-1'-methyl-4,4'-Bipyridinium bis(trifluoromethanesulfonoyl)imide (Fc-V, bridged dye). The optical transmission and reflection spectra for this EC cell are shown in FIGS. 12 and 13 respectively in bleached (clear), partially colored (colored at 1V) and in fully colored (colored at 1.3V) states. This was similarly modelled for SHGC in an IGU configuration by changing the passive glass element. The results are shown in the Table 2 below for bleached and the fully colored states. The Optiwhite™ and Suncool™ glasses from NSG have a Low-e coating and is configured to be located on surface 3 of the IGU as shown in FIG. 6.

TABLE 2

| Passive element | SHGC in Bleached state, % | SHGC in the Colored state, % | Visible light Transmission, bleached, % | Visible light transmission. Colored, % |
|---|---|---|---|---|
| 4 mm clear soda-lime glass (mid-iron) | 54.0 | 16.3 | 66.5 | 12.2 |
| 4 mm Optiwhite ™ Energy Advantage | 51.3 | 12.3 | 62.4 | 12.5 |
| 4 mm Suncool ™ 70/40 Pro T | 40.7 | 11.6 | 59.7 | 12.0 |

Example 4: Comparison of UV Stabilizers

In preparation for electrolytic compositions, various UV stabilizers solutions were dissolved in propylene carbonate as shown in Table 3 below. It is to be noted that Tinuvin PE described in U.S. Pat. No. 6,433,914, is equivalent to Tinuvin 1130. In this table the materials 4-methoxy-2-hydroxybenzophenone, Uvinul 3035 and Tinuvin 326 were obtained from Sigma Aldrich (St. Louis, MO), SX80 Solar Gard film was obtained from Saint Gobain Solar Gard (Tempe, AZ) and all of the other materials were obtained from BASF Corporation (Florham Park, NJ). Tinuvin and Uvinul are trademarks of BASF corporation. The compositions UV1, UV4 and UV5 are compositions which have been used in the prior art EC devices.

TABLE 3

Composition of UV stabilizer solutions

Various UV stabilizers and concentration in g/liter

| Composition | 1$^{st}$ UV Stabilizer | 2$^{nd}$ UV Stabilizer | 3$^{rd}$ UV Stabilizer | 4$^{th}$ UV Stabilizer |
|---|---|---|---|---|
| Solvent only (propylene carbonate | | | | |
| UV-1 | Uvinul 3035, 37.1 g/L | | | |
| UV-2 | Tinuvin Carboprotect, 3.2 g/L | | | |
| UV-3 | Tinuvin 326, 3.2 g/L | | | |
| UV-4 | Solar Gard SX80 Film | | | |
| UV-5 | Tinuvin 384-2, 6.8 g/L | Tinuvin 1130, 29.3 g/L | 4-methoxy-2-hydroxybenzo-phenone (or Uvinul 3040), 38.8 g/L | |
| UV-6 | Tinuvin 384-2, 6.8 g/L | Tinuvin 1130, 29.3 g/L | 4-methoxy-2-hydroxybenzo-phenone (or Uvinul 3040), 38.8 g/L | Tinuvin Carbo-protect, 3.2 g/L |
| UV-7 | Tinuvin Carboprotect, 3.2 g/L | Tinuvin 326, 3.2 g/L | | |
| UV-8 | Tinuvin Carboprotect, 3.2 g/L | Tinuvin 292, 3.2 g/L | | |
| UV-9 | Tinuvin Carboprotect, 3.2 g/L | Tinuvin 249, 3.2 g/L | | |

These UV stabilizers belong to several classes of UV stabilizers, e.g., Uvinul 3035 belongs to cyanoacrylate group, Uvinul 3040 is benzophenone, some of the Tinuvin products Caboprotect, 326, 384-2 and 1130 are benzotriazoles, Tinuvin 292 and 249 are hindered amine light stabilizers or HALS. It should be noted that the above table only represents a limited number of combinations, and HALS class of stabilizers may be further added to UV1, UV3 to UV 7 to yield new compositions, and the concentrations may be further adjusted to give desired UV absorption and protection. Additional classes of UV stabilizers or with different structures may also be used in combination with the above or otherwise.

Figure 15:
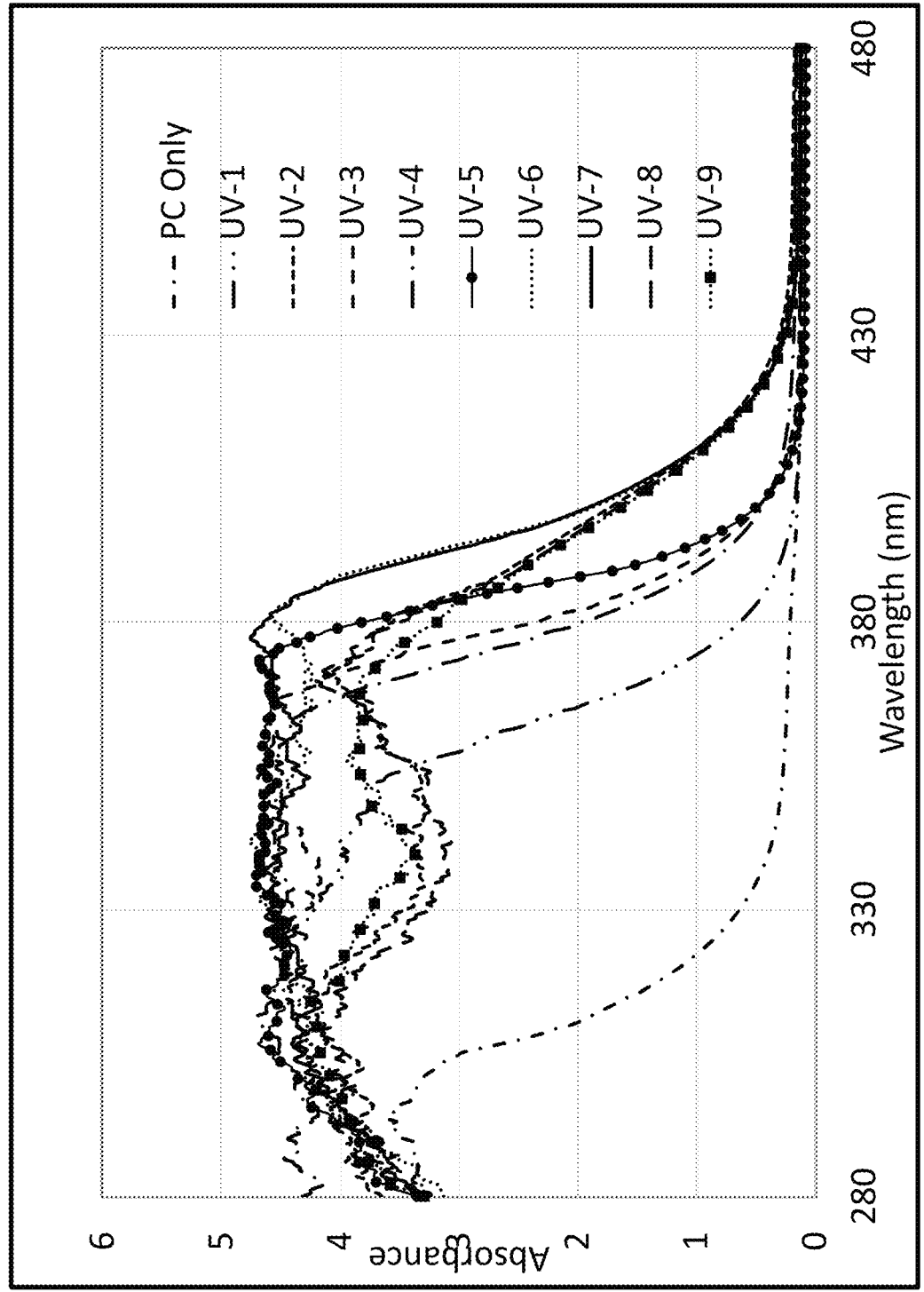
FIG. 15 (See Example 4, ABS 280-480 nm region of UV stabilizers.

The compositions in Table 3 were evaluated by placing them in cells which were made using two conductive substrates (TEC15) which were placed in a parallel configuration with the conductive sides facing each other and separated by a distance of 330 μm forming a cavity. This cavity was filled with the various UV stabilizer solutions listed in Table 3 and sealed at the perimeter. The transmission of these was measured in a wavelength range of 280 to 480 nm covering the UV range and extending into the visible spectrum. It is to be noted that UV4 is not a solution, but rather a UV blocking film SX 80 placed on the outside surface of a cell similarly constructed containing only propylene carbonate. The spectra of these are shown in FIG. 15. The wavelengths at which the optical absorbance edges as absorbance rises from the visible to the UV region and reaches absorbance of 1 and 2 are shown in Table 4.

TABLE 4

| | 250 μm thick | | 330 μm thick | | 430 μm thick | |
|---|---|---|---|---|---|---|
| Composition | A = 1 | A = 2 | A = 1 | A = 2 | A = 1 | A = 2 |
| Solvent only | 322.5 nm | 311 nm | 322 nm | 310 nm | 325 nm | 311.5 nm |
| UV-1 | 370 nm | 362 nm | 374 nm | 365 nm | 377.5 nm | 369.5 nm |
| UV-2 | 406.5 nm | 391 nm | 410 nm | 396.5 nm | 414.5 nm | 403.5 nm |
| UV-3 | 388.5 nm | 379 nm | 391 nm | 382 nm | 395.5 nm | 386 nm |

TABLE 4-continued

|  | 250 μm thick | | 330 μm thick | | 430 μm thick | |
|---|---|---|---|---|---|---|
| Composition | A = 1 | A = 2 | A = 1 | A = 2 | A = 1 | A = 2 |
| UV-4 | 389 nm | 380 nm | 388.5 nm | 379.5 nm | 388.5 nm | 379.5 nm |
| UV-5 | 392.5 nm | 386.5 nm | 393.5 nm | 387.5 nm | 395.5 nm | 389.5 nm |
| UV-6 | 407.5 nm | 396 nm | 409.5 nm | 399 nm | 413.5 nm | 403.5 nm |
| UV-7 | 408 nm | 396 nm | 410 nm | 399 nm | 415 nm | 404.5 nm |
| UV-8 | 406.5 nm | 390 nm | 409.5 nm | 395.5 nm | 413 nm | 401.5 nm |
| UV-9 | 405.5 nm | 388.5 nm | 409 nm | 395 nm | 413 nm | 401.5 nm |

FIG. 15 shows that the absorbance is low in the longer wavelength region (about 0.1 to 0.2, average of about 0.15) and then rises as a sharp edge in the UV region, the characteristics of which are captured in Table 4. The Table shows the impact of the cell (electrolyte thickness) on the changes in the absorption edge, which with increase in thickness shifts towards the longer wavelength, which would also be seen when the concentration of the UV stabilizer is increased. The absorbance due to the UV stabilizer at a given wavelength is proportional to its concentration and cell thickness. The amount of UV stabilizer has to be minimized at which the desired UV protection is obtained and does not interfere with the cell electrochemistry and other characteristics including cost, precipitation and undesirable interactions with the other components. FIG. 15 and Table 4 show that the absorption edge can be shifted in a wide range of wavelengths in the UV region to ensure that adequate protection can be obtained for different materials as discussed below. It is to be noted that with increasing cell thickness, the absorption edge shifts to a higher wavelength for a given absorbance. For example, the absorbance edges listed for 430 μm will be lower as compared to, e.g., 600 μm. As a further illustration a graph plotted between wavelength (ordinate) and thickness (abscissa) from the data in Table 4 for UV5 stabilizer shows that for A=1, y=0.0168x+388.18 and for A=2 this was y=0.0168x+382.18, these when extrapolated to 600 μm resulted in wavelengths of 398.3 nm and 392.3 for A=1 and A=2 respectively. This shows that the UV stabilizer UV5 does not meet the criteria that at 600 nm, the wavelength at which A=1 is 400 nm or more or at the wavelength at which A=2 is 395 nm or more.

Figure 16:
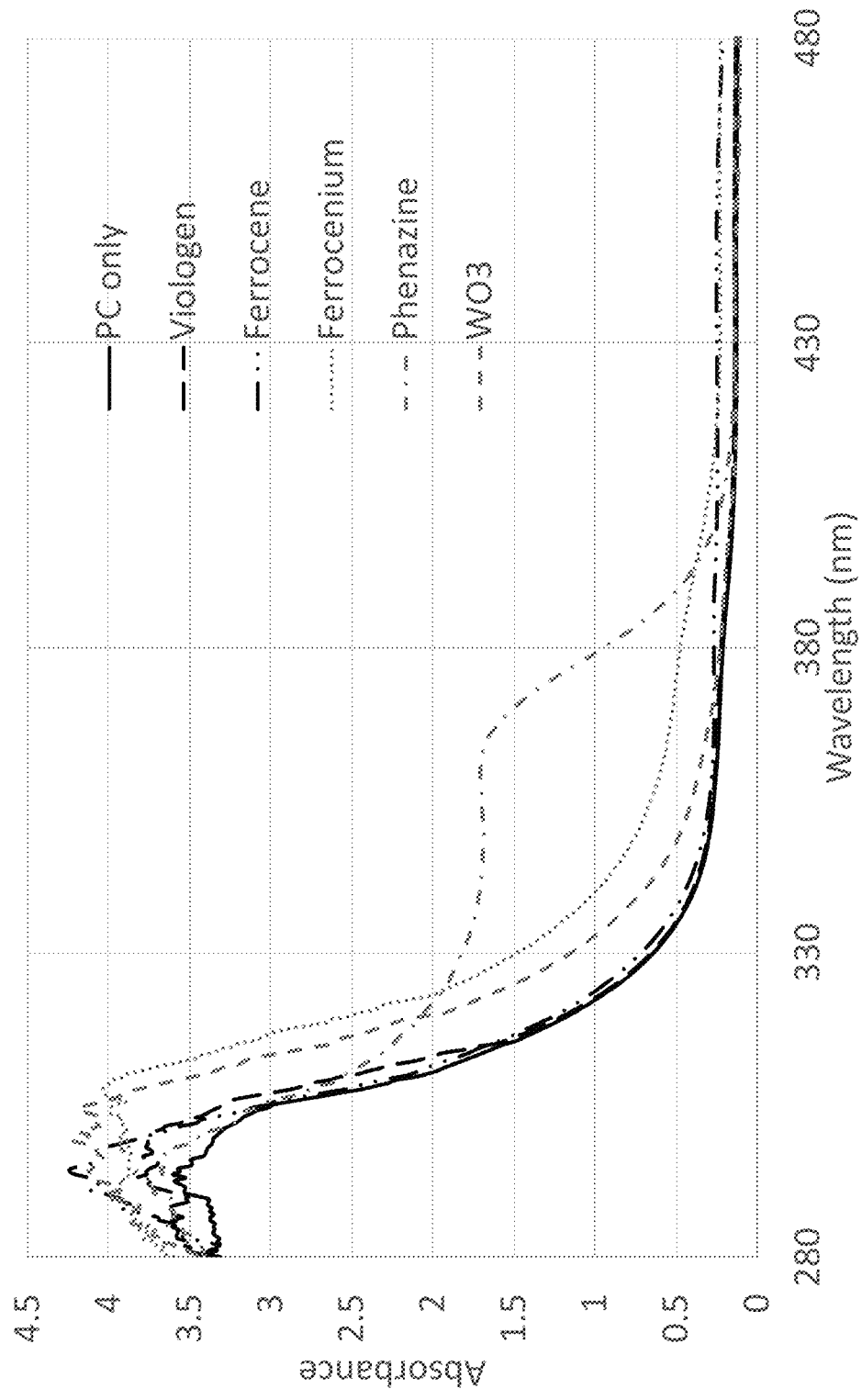
FIG. 16 Example 5, UV region of EC materials (Abs 280 to 480).

Example 5: UV Absorption of Electrochromic Materials and Devices without UV Protection In this example the UV absorption of the various electrochromic (EC) materials was evaluated. This was done for EC dyes as well as for EC coatings. Table 5 shows 330 μm thick cells made as in Example 4, but instead of adding UV stabilizers to the PC various EC dyes were added in a concentration of 0.025 molar in PC. In one of the examples in this table a cell was constructed having a lithium oxide doped tungsten oxide coating (see Example 1) deposited on the conductive side of the TEC15 glass in a thickness of 360 nm. This was then used to construct a cell with a cavity as described above with the coatings facing inwards and the cavity was filled with propylene carbonate without any UV stabilizers. Table 5 lists the UV absorption edge of these materials in the UV region at an absorbance of 1 and 2. FIG. 16 shows the spectrum of these materials as measured in these cells in a range of 280 to 480 nm. For example, Phenazine has an absorption edge of 379 nm in the UV region. For ferrocene this absorption edge is 323.5 nm. This means that if a UV additive is added to the electrolytes in these devices or a UV blocking film is placed, then the UV absorption edge (e.g., at A=1) of the UV stabilizer should be red-shifted beyond 379 nm so that the UV radiation is preferentially absorbed by the UV stabilizer rather than being absorbed by an EC material, which can then be damaged over a long exposure time.

TABLE 5

UV Absorbance (A) edge of various EC materials in the UV region

| Composition | Wavelength (nm) at the absorbance levels given below | |
|---|---|---|
|  | A = 1 | A = 2 |
| Solvent only (propylene carbonate) | 322 nm | 310 nm |
| Viologen (ethyl viologen diperchlorate) | 322.5 nm | 312.5 nm |
| Ferrocene | 323.5 nm | 311 nm |
| Ferrocenium (ferrocenium tetrafluoroborate) | 339.5 nm | 323 nm |
| Phenazine (Dimethyl dihydro phenazine) | 379 nm | 321.5 nm |
| Tungsten oxide (lithium oxide doped) | 332.5 nm | 319.5 nm |

Further, the UV absorption edge of the EC materials shift in different states of coloration (or different oxidation states). For example, from Table 5 we see that the ferrocene absorption edge (A=1) is at 323.5 nm and for ferrocenium (oxidized state of ferrocene) this red-shifts to 339.5 nm. This would mean that a UV stabilizer to protect ferrocene in a device should be based on ferrocenium absorption edge so that the UV stabilizer will protect both states of this material. Therefore, when several EC materials are present in a device, then the UV absorption edge should be established for all of these and a UV protection selected so that it is more red-shifted in terms of its absorption edge as compared to the EC materials present.

Table 6 shows the data on EC devices made using the materials listed in Table 5 in their colored and in the bleached state. It also includes a device made using a bridged dye having Fc-V dye as the one used in Example 3. All of the dyes are present in a concentration of 0.025M and the electrolyte thickness is 330 μm, and TEC15 is used as conductive substrate.

Figure 17:
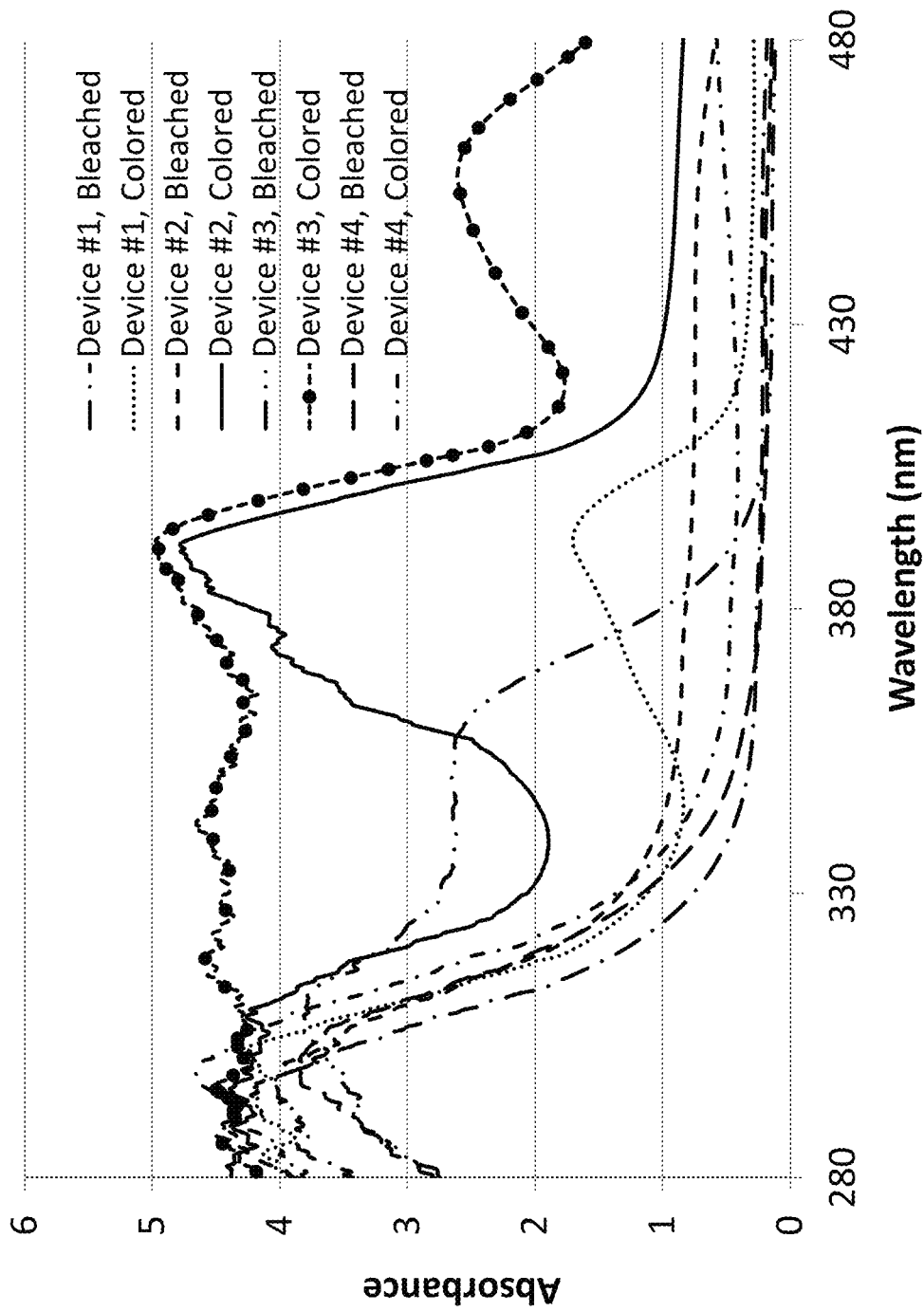
FIG. 17, Example 5, UV region of EC devices, colored and bleached ABS (280-480).
Figure 18:
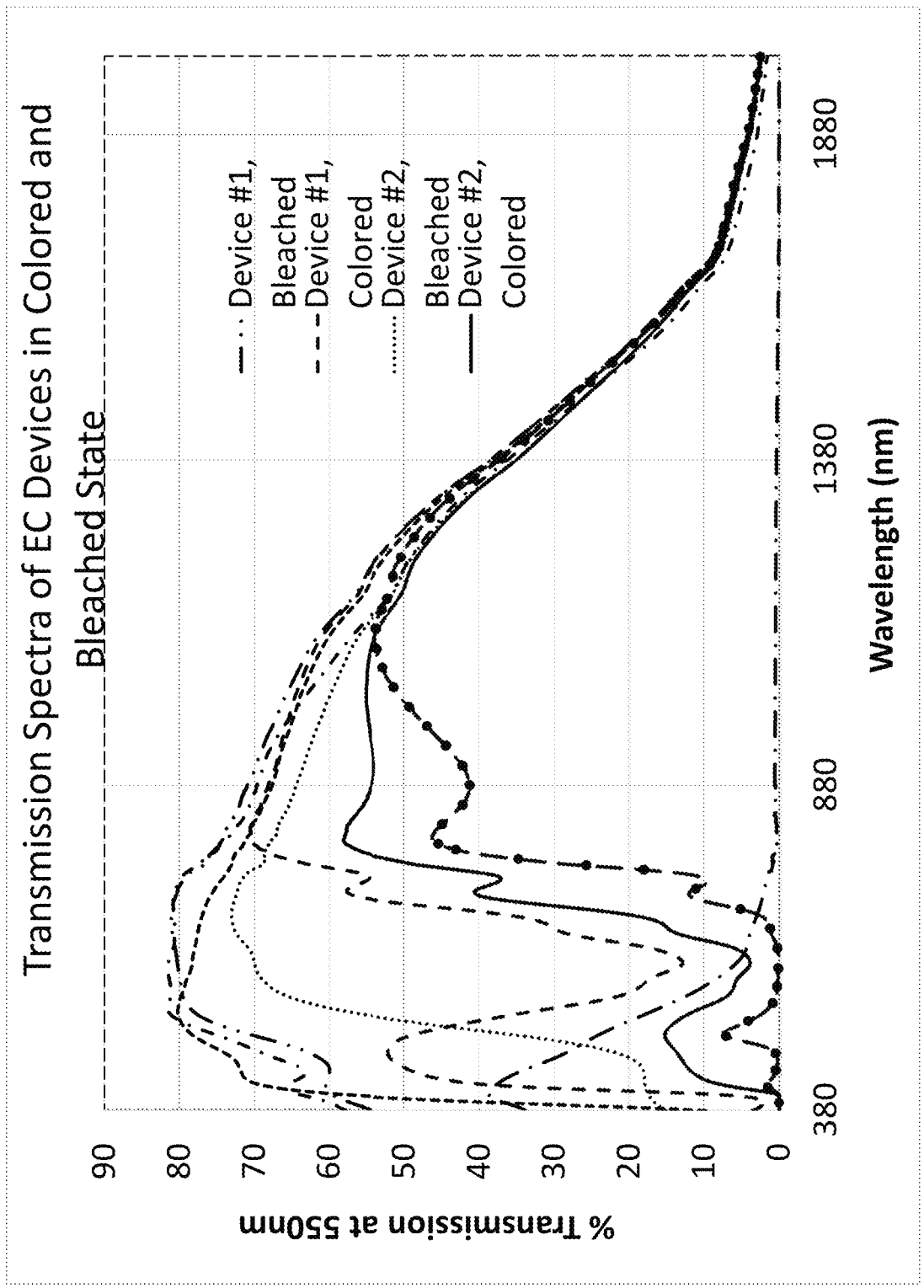
FIG. 18, Example 5, Transmission spectra 380 to 2000 nm of EC devices in colored and bleached state.

Device 1 has bridged dye Fc-V in the electrolyte, Device 2 has separate ferrocene and viologen dyes in the electrolyte (Fc+V), Device 3 has separate phenazine and viologen dyes in the electrolyte (Ph+V) and Device 4 has a tungsten oxide coating on the conductive side of one substrate and the electrolyte only has ferrocene in the electrolyte (WO3+Fc). These EC devices were colored by applying +1.3 V and bleached by shorting. It is to be noted that these EC devices do not have a UV stabilizer (either external film or as an additive to the electrolyte). FIG. 17 shows the spectrum of these devices in the bleached and the colored state (in absorbance) between 280 and 480 nm, and FIG. 18 shows the colored and bleached spectrum of the EC devices in transmission between the wavelengths of 380 and 2000 nm.

TABLE 6

EC properties of devices and absorption edge (nm) in
the UV at various absorbance (A) levels Optical properties of EC devices without UV protection

| Device # | Coloration range @550 nm, % T | Time to color 80% of range | Wavelength, nm bleached | | Wavelength, nm, colored | |
|---|---|---|---|---|---|---|
| | | | A = 1 | A = 2 | A = 1 | A = 2 |
| Device 1 (Fc − V) | 75.5% | 9.5 sec | 324.5 nm | 312.5 nm | 401 nm* | |
| Device 2 (Fc + V) | 78.8% | 9.5 sec | 343 nm* | 319 nm* | 409* | 403.5 nm* |
| Device 3 (Ph + V) | 71.1% | 6 sec | 380 nm | 368.5 nm | 407 nm* | 402 nm* |
| Device 4 (WO3 + Fc) | 65.2% | 26 sec | 332.5 nm | 319.5 nm | 332 nm* | 320 nm* |

*Devices 1 colored, 2 colored, 2 bleached, 3 colored and 4 colored baseline absorbance was respectively adjusted to 0.29, 0.84, 0.57, 1.77 and 0.41 and then 0.85 absorbance units were added to arrive at an equivalent of A = 1, and for A = 2 another 1.0 absorbance units were added (see FIG. 17)

These data show that all of the devices containing viologen have a large red-shift in the UV edge when they color from the clear (bleached) to the dark (colored) state. Further, these devices show the absorption edge in the range of about 400 to 410 nm. For any EC device it is desired to protect the devices from the highest red-shifted UV stabilizer or film which has an absorption edge past the absorption edge of the EC materials used. For devices containing viologen it is important that the UV stabilization be carried out by stabilizers that have a UV absorption edge which is about at least the same as the device in the colored state and preferably more red-shifted. Thus, suitable UV stabilizer compositions from Example 4 would be UV2, and UV6 to UV9 as they have absorption edges (look at the edge values of A=1) in the desired range.

Example 6: UV Absorption of Electrochromic Devices with UV Protection

Figure 19A:
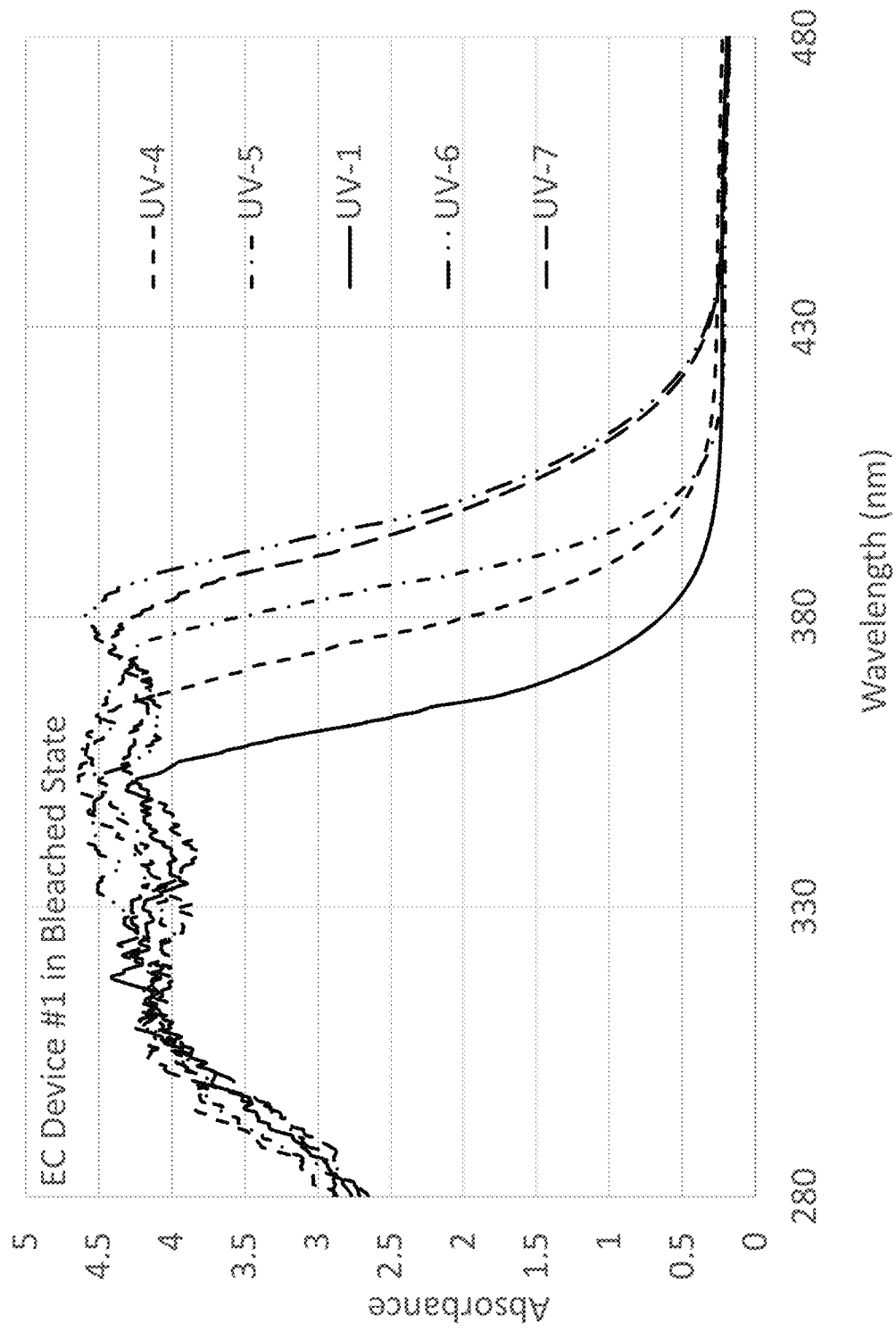
FIGS. 19a and 19b: Example 6, Abs 280-480 of protected EC Device 1 (with different protections) in the (FIG. 19a) bleached and the (FIG. 19b) colored state.
Figure 19B:
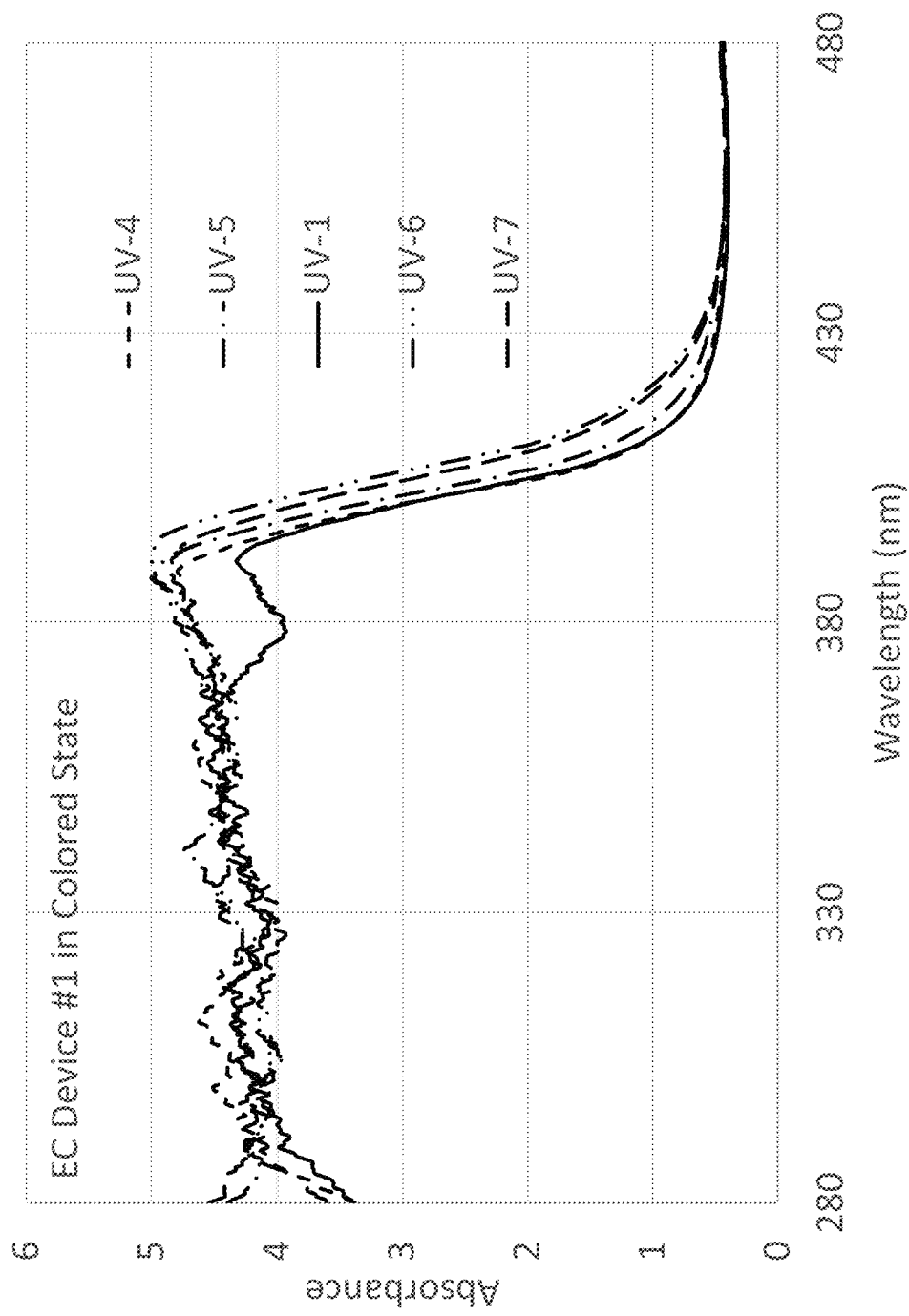
Figure 20A:
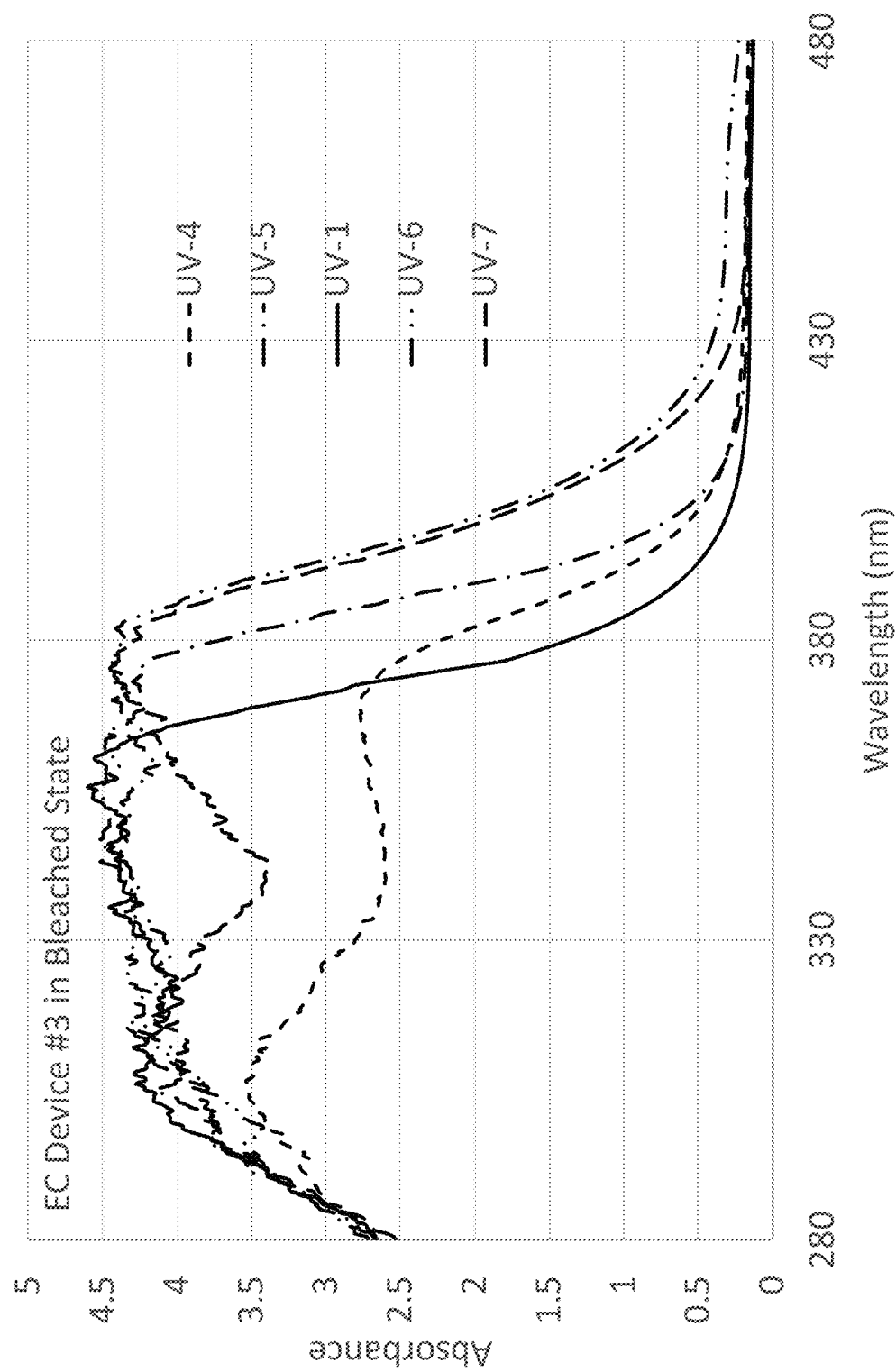
FIGS. 20a and 20b: Example 6, Abs 280-480 of protected EC Device 3 (with different protections) in the (FIG. 20a) bleached and the (FIG. 20b) colored state.
Figure 20B:
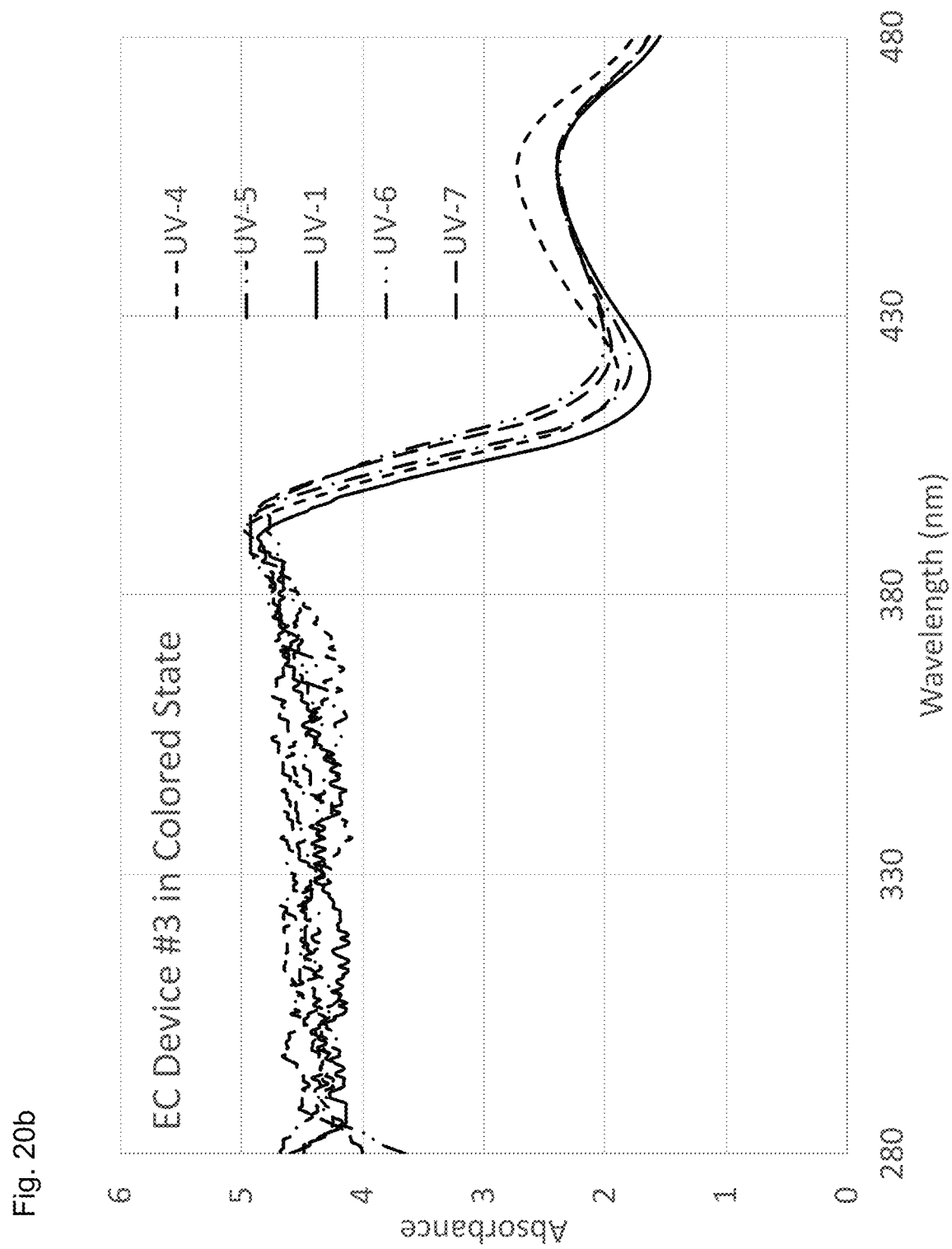
Figure 21A:
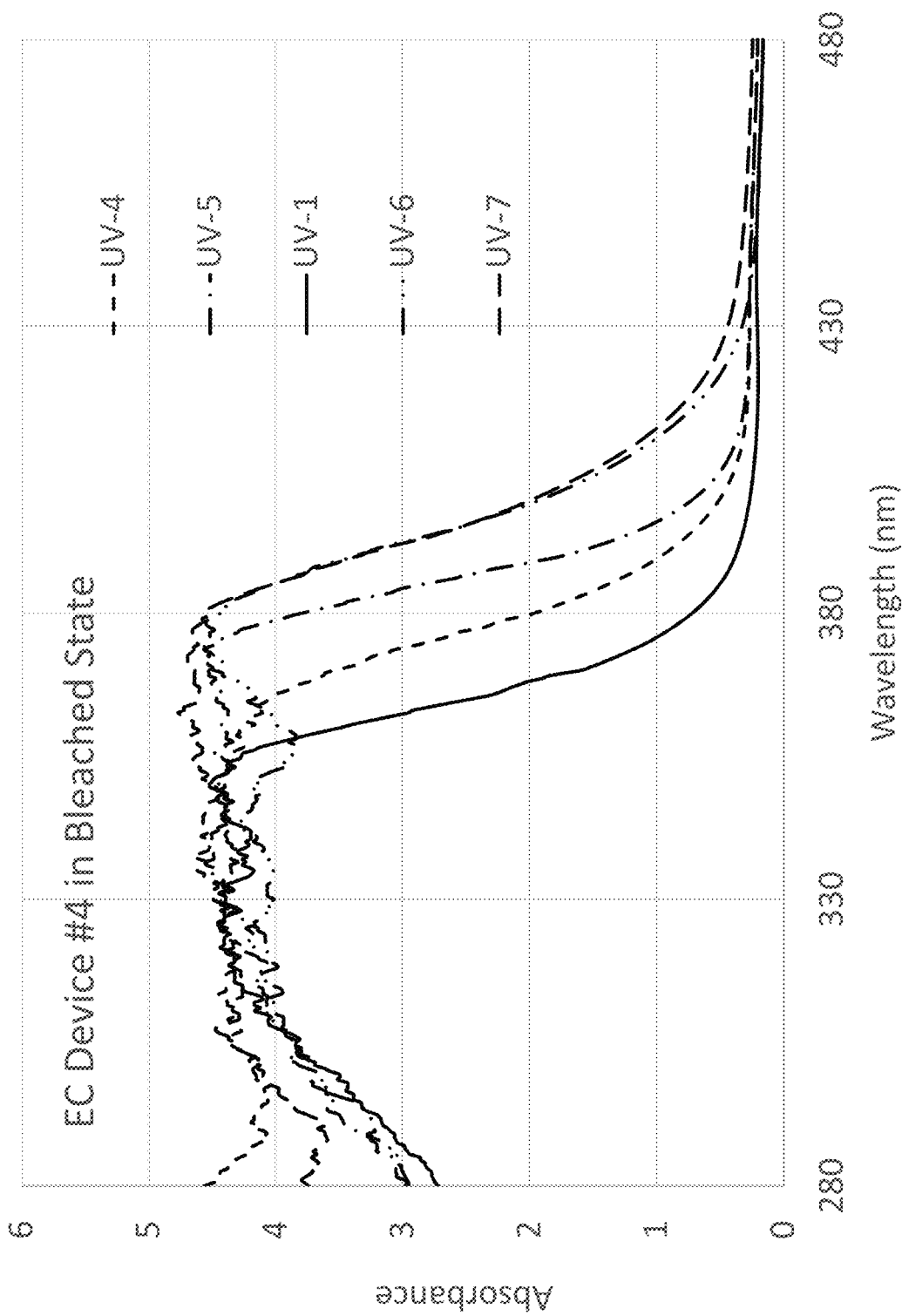
FIGS. 21a and 21b: Example 6, Abs 280-480 of protected EC Device 4 (with different protections) in the (FIG. 21a) bleached and the (FIG. 21b) colored state.
Figure 21B:
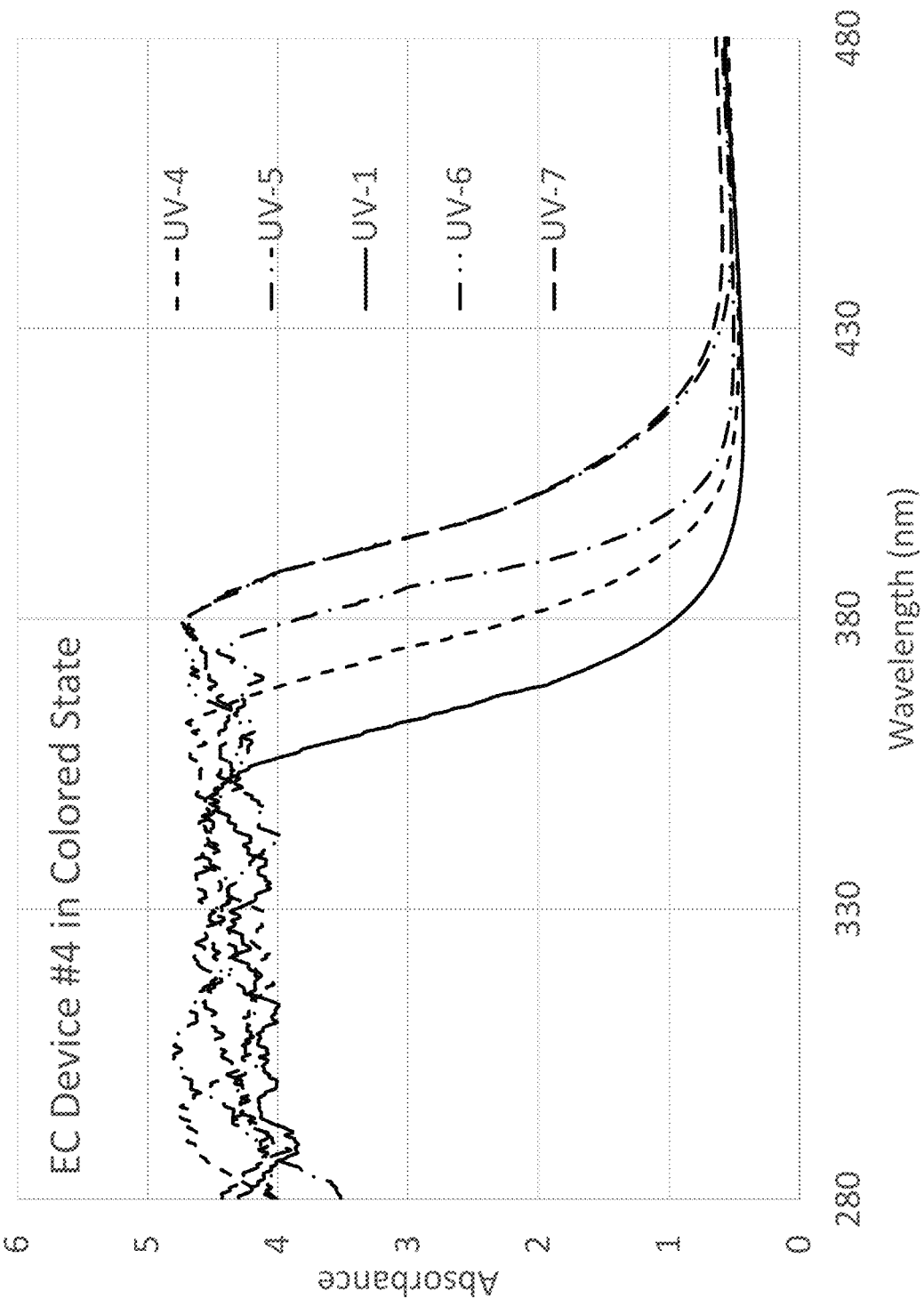

Devices 1, 3 and 4 from the previous examples were made again with the same concentration of the dyes and the electrolyte thickness, but after adding the UV stabilizers UV-1, UV-5, UV-6 and UV-7 to the electrolyte and in one case without the UV stabilizer in the electrolyte, but by putting a film (UV-4) on the outside surface of the cell as shown in Table 7. The EC devices were colored by applying 1.3 V and bleached by shorting. FIGS. 19a, 19b, 20a, 20b, 21a, and 21b show the spectrum of Devices 1, 3 and 4 respectively in the bleached and the colored state (in absorbance) between 280 and 480 nm with different types of UV protection. FIGS. 19a, 20a and 21a show the spectrum in the bleached state and FIGS. 19b, 20b and 21b show the same in the colored state. Table 7 shows the values of the absorption edge for these devices in both states. The values in parenthesis for some of the cases is the baseline absorbance correction that was used. For example, for Device 4 with UV4, the baseline absorbance number in the colored state was used as 0.5 (see FIG. 21b). This means that the wavelength corresponding to A=1, would now be equivalent to the wavelength at which the absorbance is 0.5+0.85=1.35, and similarly for absorbance corresponding to A=2 the absorbance number would be equivalent to 2.35. For device 3 in the colored state the minimum is being reached at about 420 nm (FIG. 20b) in the colored state thus the absorbance corresponding to A=1 is in the range of 1.6+0.85=2.45 to 2.2+0.85=2.95, and for A=2 these numbers are 3.45 and 3.95 respectively.

TABLE 7

EC properties of devices and absorption edge (nm) in the UV at
various absorbance (A) levels after they are protected from UV

| Device # | UV Protection | Coloration range @550 nm, % T | Time to color 80% of range | Wavelength, nm, Bleached | | Wavelength, nm, Colored | |
|---|---|---|---|---|---|---|---|
| | | | | A = 1 | A = 2 | A = 1 | A = 2 |
| Device 1 | UV-4 | 66.8% | 11.5 sec | 389 nm | 379.5 nm | 411.5 nm | 404.5 nm |
| Device 3 | UV-4 | 66.7% | 5 sec | 392 nm | 382 nm | 407 nm (1.9) | 401.5 nm (1.9) |
| Device 4 | UV-4 | 52.5% | 29.5 sec | 389 nm | 379.5 nm | 387 nm (0.5) | 378.5 (0.5) |
| Device 1 | UV-5 | 73.4% | 10.5 sec | 394.5 nm | 387.5 nm | 414.5 nm | 406 nm |
| Device 3 | UV-5 | 76.5% | 6 sec | 396 nm | 389.5 nm | 408.5 (1.8) | 401.5 nm (1.8) |
| Device 4 | UV-5 | 59.9% | 29.5 sec | 395.5 nm | 388.5 nm | 394 nm (0.5) | 388 nm (0.5) |
| Device 1 | UV-1 | 73% | 20 sec | 373.5 nm | 365 nm | 412 nm | 404.5 nm |
| Device 3 | UV-1 | 75.4% | 8 sec | 383.5 nm | 375.5 nm | 406.5 nm (1.6) | 401 m (1.6) |

TABLE 7-continued

EC properties of devices and absorption edge (nm) in the UV at
various absorbance (A) levels after they are protected from UV

| Device # | UV Protection | Coloration range @550 nm, % T | Time to color 80% of range | Wavelength, nm, Bleached | | Wavelength, nm, Colored | |
|---|---|---|---|---|---|---|---|
| | | | | A = 1 | A = 2 | A = 1 | A = 2 |
| Device 4 | UV-1 | 59.7% | 30.5 sec | 375.5 nm | 368 nm | 374 nm (0.5) | 366.5 (0.5) |
| Device 1 | UV-6 | 72.5% | 13 sec | 411.5 nm | 400 nm | 420.5 nm | 410.5 nm |
| Device 3 | UV-6 | 76.3% | 5.5 sec | 409.5 nm (0.3) | 399 nm (0.3) | 409.5 (2.2) | 403 (2.2) |
| Device 4 | UV-6 | 53% | 36.5 sec | 410 nm | 398.5 nm | 409.5 nm (0.5) | 398.5 nm (0.5) |
| Device 1 | UV-7 | 73.7% | 14 sec | 410.5 nm | 398.5 nm | 419.5 nm | 409 nm |
| Device 3 | UV-7 | 73.7% | 9 sec | 410 nm | 399 nm | 409 nm (2.2) | 403.5 nm (2.2) |
| Device 4 | UV-7 | 61.6% | 22.5 sec | 412 nm | 399.5 nm | 410 (0.5) | 398 (0.5) |

As seen in the above table when UV 6 and UV 7 stabilizers are used in the devices the bleached state UV absorbance about exceeds the absorbance edge of all of the devices (without the UV stabilizer) in the colored state that are listed in Table 6. Particularly the devices with viologen in Table 6 show the most red-shifted UV absorption in the colored state.

Another observation is that EC devices which are stabilized using UV stabilizers from prior art for this purpose (i.e., UV1, UV4 and UV5) do not result in EC devices which show that in the bleached state the absorption edge A=1 is at or more than 400 nm, or an absorption edge at A=2 at or greater than 395 nm. However, these conditions are met when compositions UV6 and UV7 are used as disclosed herein.

Example 7: Laminatable Thermoplastic Electrolyte with a Bridged Electrochromic Dye and an EC Device Containing the Same A thermoplastic solid film had the following composition, 0.8088 g of a proprietary solid aliphatic thermoplastic polyurethane containing a UV stabilizer, 0.432 g of propylene carbonate, 0.475 g of ethylene carbonate, 0.1011 g of Lithium bis(trifluoromethanesulfonyl)imide, 0.140 g of Fc-Viologen bridged dye (see Example 3 about the dye details), 0.0059 g of ferrocenium tetrafluoroborate, which was all added to 9.19 g of tetrahydrofuran (THF). The above solution was cast in a well which was constructed from a fluorinated polymer with a well diameter of 993 mm$^2$ to allow THF to evaporate at room temperature for 18 hours. The film was analyzed for residual THF by infra-red analysis and none was detected with this method. The material from the well was reformed into a film by pressing it in between conductive substrates (TEC™10 glass (about 4 cm×5 cm)) with a slight offset to be able to make electrical connections. This was heated to 120° C. for about two minutes for a targeted film thickness of 400 microns. This was then moved to a diaphragm laminator (Model SPL2828, made by Bent River Machine, Cottonwood, AZ). Lamination temperature was 120 degrees Celsius. The laminate was then cooled under pressure. After lamination, the film thickness in the electrochromic cell was calculated to be 383 microns and electrical connectors were attached to the two conductive sides of the offsets. The cell was colored by applying a potential of 1.3V across the two connectors and then was bleached by electrically shorting the two electrodes. The transmission of the cell at 550 nm when colored at room temperature changed from 58% T in the bleached state to 0.4% T in the colored state in 54 s. The cell was also bleached at room temperature and it bleached completely in 180 s.

Example 8: Electrochromic Cell with Crosslinked Electrolyte

An electrochromic cell was fabricated by using two conductively coated pieces of soda-lime glass in a thickness of 2.3 mm. These were fluorine doped tin oxide coating with a surface resistance of 15 ohms/square (TEC™15 glass obtained from NSG in Toledo, Ohio). The substrate size was about 14 cm×9 cm. These were assembled with the coated sides facing each other by a perimeter epoxy sealant which had 300 micron sized glass spherical spacers to control the distance between the two and form a cavity. One of the substrates had two holes about 2 mm in diameter drilled near the diagonal corners so that electrolyte could be introduced into the cavity. The cavity was filled with an electrolyte containing the following proportion of the materials; 12 g of propylene carbonate, 0.718 g of lithium bis(trifluoromethanesulfonyl)imide, 0.243 g of Fc-V dye (see Example 3), 0.418 g of Uvinul 3035™, 0.237 g of Desmodour N3800™ (an aliphatic isocyanate with a functionality of 3.8), 0.320 g of Desmophin C1100™ (a polycarbonate polyol with a functionality of 2) and 0.0359% of dibutyltindilaurate (a catalyst for reaction between an isocyanate and polyol, the % weight based on the total weight of Desmodour N3800™ and Desmophin C1100™). Desmodour N3800™ and Desmophen C1100™ were obtained from Covestro LLC (Pittsburgh, PA). After filling the device the material gelled (crosslinked) to form a polyurethane solid in two days at room temperature. The polymer content of the electrolyte was about 4%.

The cell was colored by coloring at 1.3V and bleached by shorting the two terminals. At 550 nm, the bleach state transmission was 77% and the colored state transmission was 3.9%, the coloration time was 2 minutes and bleaching time was 3.5 minutes.

Although in Example 7, no additional UV stabilizers were added, but any of the UV stabilizer compositions could have been added to these and to the device in Example 8 keeping with the teachings of the UV stabilizers in this disclosure.

The foregoing description of the invention has been presented for purposes of illustration and description and is not intended to be exhaustive or to limit the invention to the precise form disclosed, and obviously, many modifications and variations are possible considering the above teaching. The embodiments were chosen and described to best explain the principles of the invention and its practical application to thereby enable others skilled in the art to best utilize the invention in various embodiments and with various modifications as are suited to the use contemplated. It is intended that the scope of the invention be defined by the claims appended hereto.

We claim:

1. A polymeric ion-conductive electrolyte sheet comprising:
   i) thermoplastic polymer formed using at least three monomers;
   ii) a melting point or a flow point in excess of about 90° C. and less than about 170° C.;
   iii) optical haze less than 5%; and
   iv) and at least one electrochromic dye.

2. The polymeric ion-conductive electrolyte sheet of claim 1, having an ion-conductivity in a range of about $10^{-2}$ to $10^{-5}$ S per square cm of the sheet area when measured at 25° C.

3. The polymeric ion-conductive electrolyte sheet of claim 1, wherein the thermoplastic polymer comprises a fluoropolymer, polyurethane, polyvinyl butyral, acrylic, polyester, polyether, polyurea, polycarbonate, polyvinyl acetate, or a combination thereof.

4. The polymeric ion-conductive electrolyte sheet of claim 1, wherein the electrolyte sheet further comprises a plasticizer.

5. The polymeric ion-conductive electrolyte sheet of claim 4, wherein the said plasticizer solubilizes at least one monomer used to form the said thermoplastic polymer.

6. The polymeric ion-conductive electrolyte sheet of claim 1, further comprising a ultraviolet (UV) stabilizer.

7. The polymeric ion-conductive electrolyte sheet of claim 6, wherein the said UV stabilizer imparts an optical absorbance level of at least 1 at 395 nm to the said electrolyte film.

8. The polymeric ion-conductive electrolyte sheet of claim 6, wherein the UV stabilizer imparts an optical absorbance level of at least 1 at 405 nm to the said electrolyte film.

9. The polymeric ion-conductive electrolyte sheet of claim 1, wherein the polymeric ion conductive sheet contains at least one unreacted monomer which is not polymerized in said thermoplastic polymer.

10. The polymeric ion-conductive electrolyte sheet of claim 9, wherein the polymeric ion conductive sheet contains a catalyst capable of polymerizing at least one additional monomer by radiation.

11. The polymeric ion-conductive electrolyte sheet of claim 4, wherein the plasticizer is present in a weight fraction of about 10% to 70% based on the weight of the thermoplastic polymer.

12. The polymeric ion-conductive electrolyte sheet as in claim 11, wherein the composition further comprises a dissociable salt.

13. An electrochromic product comprising the polymeric ion-conductive electrolyte sheet of claim 1.

14. The electrochromic product of claim 13, further protected with a polymeric film, laminate or a glass cover wherein the polymeric film imparts an optical absorbance of at least 1 at 395 nm to the said electrochromic product when the absorbance is measured in the bleached state of the electrochromic product.

15. The electrochromic product of claim 13, further protected with a polymeric film, laminate or a glass cover wherein the polymeric film imparts an optical absorbance of at least 1 at 410 nm to the said electrochromic product when the absorbance is measured in the bleached state of the electrochromic product.

16. The polymeric ion-conductive electrolyte sheet of claim 1, wherein the electrolyte further comprises a reversible oxidizer.

17. A polymeric ion-conductive electrolyte sheet for use in an electrochromic device, comprising:
   i) thermoplastic polymer formed using at least three monomers;
   ii) a melting point or a flow point in excess of about 90° C. and less than about 170° C.;
   iii) optical haze less than 5%; and
   iv) a UV stabilizer in a concentration that imparts an optical absorbance level of at least 1 at 400 nm to the said electrolyte film.

18. The polymeric ion-conductive electrolyte sheet of claim 17, further comprising a reversible oxidizer.

19. The polymeric ion-conductive electrolyte sheet of claim 17, further comprising a plasticizer.

* * * * *